US010948648B2

(12) United States Patent
Ihas et al.

(10) Patent No.: US 10,948,648 B2
(45) Date of Patent: Mar. 16, 2021

(54) BACKLIGHTS HAVING STACKED WAVEGUIDE AND OPTICAL COMPONENTS WITH DIFFERENT COEFFICIENTS OF FRICTION

(71) Applicant: RealD Spark, LLC, Beverly Hills, CA (US)

(72) Inventors: Benjamin Ihas, Boulder, CO (US); Robert A. Ramsey, Boulder, CO (US); Graham J. Woodgate, Henley-on-Thames (GB); Jonathan Harrold, Leamington Spa (GB)

(73) Assignee: RealD Spark, LLC, Beverly Hills, CA (US)

( * ) Notice: Subject to any disclaimer, the term of this patent is extended or adjusted under 35 U.S.C. 154(b) by 0 days.

(21) Appl. No.: 16/651,277

(22) PCT Filed: Sep. 28, 2018

(86) PCT No.: PCT/US2018/053328
§ 371 (c)(1),
(2) Date: Mar. 26, 2020

(87) PCT Pub. No.: WO2019/067846
PCT Pub. Date: Apr. 4, 2019

(65) Prior Publication Data
US 2020/0225402 A1 Jul. 16, 2020

Related U.S. Application Data

(60) Provisional application No. 62/565,973, filed on Sep. 29, 2017, provisional application No. 62/582,052, (Continued)

(51) Int. Cl.
*G02F 1/13357* (2006.01)
*F21V 8/00* (2006.01)

(52) U.S. Cl.
CPC .......... *G02B 6/0046* (2013.01); *G02B 6/005* (2013.01); *G02B 6/0053* (2013.01); *G02B 6/0055* (2013.01); *G02B 6/0088* (2013.01)

(58) Field of Classification Search
CPC ......... G02F 1/133615; G02F 1/133608; G02F 2013/454; G02F 2013/049;
(Continued)

(56) References Cited

U.S. PATENT DOCUMENTS 4,621,898 A 11/1986 Cohen
4,974,941 A 12/1990 Gibbons et al.
(Continued)

FOREIGN PATENT DOCUMENTS

CA 2222313 A1 6/1998
CN 104133292 A 11/2014
(Continued)

OTHER PUBLICATIONS

Brudy et al., "Is Anyone Looking? Mitigating Shoulder Surfing on Public Displays through Awareness and Protection", Proceedings of the International Symposium on Persuasive Displays (Jun. 3, 2014), pp. 1-6.
(Continued)

*Primary Examiner* — Ismael Negron
(74) *Attorney, Agent, or Firm* — Penny L. Lowry

(57) ABSTRACT

A backlight includes a directional waveguide and a light source array, for providing large area directed illumination from localized light sources. Interfaces are provided between the directional waveguide and optical components adjacent the directional waveguide such that the coefficient of friction at the waveguide interfaces is greater than the coefficient of friction at least one outer interface on each side of the waveguide in the stack. Damage from compressive forces on the optical stack may be reduced, achieving
(Continued)

improved optical performance and lifetime. Privacy display, low stray light display and autostereoscopic display may be provided with high uniformity, long lifetime and reduced cost mechanical components.

20 Claims, 39 Drawing Sheets

Related U.S. Application Data filed on Nov. 6, 2017, provisional application No. 62/592,085, filed on Nov. 29, 2017, provisional application No. 62/634,168, filed on Feb. 22, 2018, provisional application No. 62/641,657, filed on Mar. 12, 2018, provisional application No. 62/673,359, filed on May 18, 2018, provisional application No. 62/699,914, filed on Jul. 18, 2019.

(58) Field of Classification Search
CPC ............ G02B 66/0011; G02B 66/0073; G02B 66/0076; G02B 66/0086; G02B 66/0088; G09F 2013/0445
See application file for complete search history.

(56) References Cited

U.S. PATENT DOCUMENTS

| | | |
|---|---|---|
| 5,005,108 A | 4/1991 | Pristash et al. |
| 5,035,491 A | 7/1991 | Kawagishi et al. |
| 5,658,490 A | 8/1997 | Sharp et al. |
| 5,808,784 A | 9/1998 | Ando et al. |
| 5,835,166 A | 11/1998 | Hall et al. |
| 5,894,361 A | 4/1999 | Yamazaki et al. |
| 6,055,103 A | 4/2000 | Woodgate et al. |
| 6,099,758 A | 8/2000 | Verrall et al. |
| 6,144,433 A | 11/2000 | Tillin et al. |
| 6,204,904 B1 | 3/2001 | Tillin et al. |
| 6,222,672 B1 | 4/2001 | Towler et al. |
| 6,392,727 B1 | 5/2002 | Larson et al. |
| 6,437,915 B2 | 8/2002 | Moseley et al. |
| 7,067,985 B2 | 6/2006 | Adachi |
| 7,163,319 B2 * | 1/2007 | Kuo ........................ F21S 8/00 349/60 |
| 7,524,542 B2 | 4/2009 | Kim et al. |
| 7,528,893 B2 | 5/2009 | Schultz et al. |
| 7,528,913 B2 | 5/2009 | Kobayashi |
| 7,633,586 B2 | 12/2009 | Winlow et al. |
| 7,660,047 B1 | 2/2010 | Travis et al. |
| 7,766,534 B2 * | 8/2010 | Iwasaki ................ G02B 6/0073 362/632 |
| 7,970,246 B2 | 6/2011 | Travis et al. |
| 7,991,257 B1 | 8/2011 | Coleman |
| 8,154,686 B2 | 4/2012 | Mather et al. |
| 8,237,876 B2 | 8/2012 | Tan et al. |
| 8,249,408 B2 * | 8/2012 | Coleman ............ B29D 11/0073 385/129 |
| 8,262,271 B2 | 9/2012 | Tillin et al. |
| 8,646,931 B2 * | 2/2014 | Choi ................ G02F 1/133615 362/97.1 |
| 8,801,260 B2 * | 8/2014 | Urano .................... G02B 6/009 362/612 |
| 8,939,595 B2 * | 1/2015 | Choi ....................... F21V 29/85 362/97.1 |
| 8,973,149 B2 | 3/2015 | Buck |
| 9,195,087 B2 * | 11/2015 | Terashima ........... H04N 5/7408 |
| 9,274,260 B2 * | 3/2016 | Urano .................. G02B 6/0073 |
| 9,304,241 B2 * | 4/2016 | Wang .................. G02B 6/0085 |
| 9,324,234 B2 | 4/2016 | Ricci et al. |
| 9,448,355 B2 * | 9/2016 | Urano .................. G02B 6/0011 |
| 9,501,036 B2 | 11/2016 | Kang et al. |
| 9,519,153 B2 | 12/2016 | Robinson et al. |
| 10,054,732 B2 | 8/2018 | Robinson et al. |
| 10,126,575 B1 | 11/2018 | Robinson et al. |
| 10,303,030 B2 | 5/2019 | Robinson et al. |
| 10,401,638 B2 | 9/2019 | Robinson et al. |
| 10,488,705 B2 * | 11/2019 | Xu ........................ G02B 6/0073 |
| 10,649,248 B1 | 5/2020 | Jiang et al. |
| 10,649,259 B2 * | 5/2020 | Lee .................. G02F 1/133308 |
| 2002/0024529 A1 | 2/2002 | Miller et al. |
| 2002/0171793 A1 | 11/2002 | Sharp et al. |
| 2003/0089956 A1 | 5/2003 | Allen et al. |
| 2003/0107686 A1 | 6/2003 | Sato et al. |
| 2004/0015729 A1 | 1/2004 | Elms et al. |
| 2004/0100598 A1 | 5/2004 | Adachi et al. |
| 2004/0125430 A1 | 7/2004 | Kasajima et al. |
| 2004/0145703 A1 | 7/2004 | O'Connor et al. |
| 2004/0240777 A1 | 12/2004 | Woodgate et al. |
| 2005/0117186 A1 | 6/2005 | Li et al. |
| 2005/0157225 A1 | 7/2005 | Toyooka et al. |
| 2005/0190326 A1 | 9/2005 | Jeon et al. |
| 2005/0190329 A1 | 9/2005 | Okumura |
| 2005/0219693 A1 | 10/2005 | Hartkop et al. |
| 2006/0082702 A1 | 4/2006 | Jacobs et al. |
| 2006/0203162 A1 | 9/2006 | Ito et al. |
| 2006/0215244 A1 | 9/2006 | Yosha et al. |
| 2006/0244884 A1 | 11/2006 | Jeon et al. |
| 2006/0262258 A1 | 11/2006 | Wang et al. |
| 2006/0262558 A1 | 11/2006 | Cornelissen |
| 2006/0285040 A1 | 12/2006 | Kobayashi |
| 2007/0035964 A1 | 2/2007 | Olczak |
| 2007/0047254 A1 | 3/2007 | Schardt et al. |
| 2007/0064163 A1 | 3/2007 | Tan et al. |
| 2007/0139772 A1 | 6/2007 | Wang |
| 2007/0223251 A1 | 9/2007 | Liao |
| 2007/0285775 A1 | 12/2007 | Lesage et al. |
| 2008/0068329 A1 | 3/2008 | Shestak et al. |
| 2008/0158491 A1 | 7/2008 | Zhu et al. |
| 2008/0285310 A1 | 11/2008 | Aylward et al. |
| 2008/0316198 A1 | 12/2008 | Fukushima et al. |
| 2009/0040426 A1 | 2/2009 | Mather et al. |
| 2009/0085894 A1 | 4/2009 | Gandhi et al. |
| 2009/0086509 A1 | 4/2009 | Omori et al. |
| 2009/0128735 A1 | 5/2009 | Larson et al. |
| 2009/0174843 A1 | 7/2009 | Sakai et al. |
| 2009/0213298 A1 | 8/2009 | Mimura et al. |
| 2009/0213305 A1 | 8/2009 | Ohmuro et al. |
| 2009/0244415 A1 | 10/2009 | Ide |
| 2010/0002296 A1 | 1/2010 | Choi et al. |
| 2010/0128200 A1 | 5/2010 | Morishita et al. |
| 2010/0149459 A1 | 6/2010 | Yabuta et al. |
| 2010/0177113 A1 | 7/2010 | Gay et al. |
| 2010/0205667 A1 | 8/2010 | Anderson et al. |
| 2010/0283930 A1 | 11/2010 | Park et al. |
| 2010/0289989 A1 | 11/2010 | Adachi et al. |
| 2010/0295755 A1 | 11/2010 | Broughton et al. |
| 2010/0328438 A1 | 12/2010 | Ohyama et al. |
| 2011/0018860 A1 | 1/2011 | Parry-Jones et al. |
| 2011/0241983 A1 | 10/2011 | Chang |
| 2011/0286222 A1 | 11/2011 | Coleman |
| 2011/0321143 A1 | 12/2011 | Angaluri et al. |
| 2012/0002121 A1 | 1/2012 | Pirs et al. |
| 2012/0127573 A1 | 5/2012 | Robinson et al. |
| 2012/0147280 A1 | 6/2012 | Osterman et al. |
| 2012/0294037 A1 | 11/2012 | Holman et al. |
| 2012/0299913 A1 | 11/2012 | Robinson et al. |
| 2012/0314145 A1 | 12/2012 | Robinson |
| 2012/0327101 A1 | 12/2012 | Blixt et al. |
| 2013/0128165 A1 | 5/2013 | Lee et al. |
| 2013/0242231 A1 | 9/2013 | Kurata et al. |
| 2013/0278544 A1 | 10/2013 | Cok |
| 2013/0300985 A1 | 11/2013 | Bulda |
| 2013/0307831 A1 | 11/2013 | Robinson et al. |
| 2013/0321340 A1 | 12/2013 | Seo et al. |
| 2013/0328866 A1 | 12/2013 | Woodgate et al. |
| 2014/0009508 A1 | 1/2014 | Woodgate et al. |
| 2014/0022619 A1 | 1/2014 | Woodgate et al. |
| 2014/0071382 A1 | 3/2014 | Scardato |
| 2014/0111760 A1 | 4/2014 | Guo et al. |
| 2014/0132887 A1 | 5/2014 | Kurata |
| 2014/0211125 A1 | 7/2014 | Kurata |
| 2014/0232960 A1 | 8/2014 | Schwartz et al. |
| 2014/0240344 A1 | 8/2014 | Tomono et al. |

(56) References Cited

U.S. PATENT DOCUMENTS

| | | |
|---|---|---|
| 2014/0240828 A1 | 8/2014 | Robinson et al. |
| 2014/0268358 A1 | 9/2014 | Kusaka et al. |
| 2014/0286043 A1 | 9/2014 | Sykora et al. |
| 2014/0289835 A1 | 9/2014 | Varshaysky et al. |
| 2014/0361990 A1 | 12/2014 | Leister |
| 2015/0055366 A1 | 2/2015 | Chang et al. |
| 2015/0116212 A1 | 4/2015 | Freed et al. |
| 2015/0177447 A1 | 6/2015 | Woodgate et al. |
| 2015/0177563 A1 | 6/2015 | Cho et al. |
| 2015/0185398 A1 | 7/2015 | Chang et al. |
| 2015/0205157 A1 | 7/2015 | Sakai et al. |
| 2015/0268479 A1 | 9/2015 | Woodgate et al. |
| 2015/0286061 A1 | 10/2015 | Seo et al. |
| 2015/0301400 A1 | 10/2015 | Kimura et al. |
| 2015/0346417 A1 | 12/2015 | Powell |
| 2015/0346532 A1 | 12/2015 | Do et al. |
| 2015/0378085 A1 | 12/2015 | Robinson et al. |
| 2016/0103264 A1 | 4/2016 | Lee et al. |
| 2016/0132721 A1 | 5/2016 | Bostick et al. |
| 2016/0147074 A1 | 5/2016 | Kobayashi et al. |
| 2016/0154259 A1 | 6/2016 | Kim et al. |
| 2016/0216420 A1 | 7/2016 | Gaides et al. |
| 2016/0216540 A1 | 7/2016 | Cho et al. |
| 2016/0238869 A1 | 8/2016 | Osterman et al. |
| 2016/0349444 A1 | 12/2016 | Robinson et al. |
| 2016/0356943 A1 | 12/2016 | Choi et al. |
| 2016/0357046 A1 | 12/2016 | Choi et al. |
| 2017/0003436 A1 | 1/2017 | Inoue et al. |
| 2017/0031206 A1 | 2/2017 | Smith et al. |
| 2017/0090103 A1 | 3/2017 | Holman |
| 2017/0092229 A1 | 3/2017 | Greenebaum et al. |
| 2017/0115485 A1 | 4/2017 | Saito et al. |
| 2017/0123241 A1 | 5/2017 | Su et al. |
| 2017/0168633 A1 | 6/2017 | Kwak et al. |
| 2017/0205558 A1 | 7/2017 | Hirayama et al. |
| 2017/0236494 A1 | 8/2017 | Sommerlade et al. |
| 2017/0269283 A1 | 9/2017 | Wang et al. |
| 2017/0269285 A1 | 9/2017 | Hirayama et al. |
| 2017/0339398 A1 | 11/2017 | Woodgate et al. |
| 2017/0343715 A1 | 11/2017 | Fang et al. |
| 2018/0052346 A1 | 2/2018 | Sakai et al. |
| 2018/0082068 A1 | 3/2018 | Lancioni et al. |
| 2018/0095581 A1 | 4/2018 | Hwang et al. |
| 2018/0113334 A1 | 4/2018 | Fang et al. |
| 2018/0188576 A1 | 7/2018 | Xu et al. |
| 2018/0188603 A1 | 7/2018 | Fang et al. |
| 2018/0196275 A1 | 7/2018 | Robinson et al. |
| 2018/0210243 A1 | 7/2018 | Fang et al. |
| 2018/0252949 A1 | 9/2018 | Klippstein et al. |
| 2018/0259812 A1 | 9/2018 | Goda et al. |
| 2018/0321523 A1 | 11/2018 | Robinson et al. |
| 2018/0321553 A1 | 11/2018 | Robinson et al. |
| 2018/0329245 A1 | 11/2018 | Robinson et al. |
| 2018/0364526 A1 | 12/2018 | Finnemeyer et al. |
| 2019/0086706 A1 | 3/2019 | Robinson et al. |
| 2019/0154896 A1 | 5/2019 | Yanai |
| 2019/0196236 A1 | 6/2019 | Chen et al. |
| 2019/0227366 A1 | 7/2019 | Harrold et al. |
| 2019/0250458 A1 | 8/2019 | Robinson et al. |
| 2019/0293858 A1 | 9/2019 | Woodgate et al. |

FOREIGN PATENT DOCUMENTS

| | | |
|---|---|---|
| CN | 204740413 U | 11/2015 |
| CN | 209171779 U | 7/2019 |
| GB | 2418518 A | 3/2006 |
| GB | 2428100 A | 1/2007 |
| GB | 2482065 A | 1/2012 |
| GB | 2486935 B | 9/2013 |
| JP | H101130783 U | 9/1989 |
| JP | 2007273288 A | 10/2007 |
| KR | 20120011228 A | 2/2012 |
| KR | 101990286 B1 | 6/2019 |
| TW | M537663 U | 3/2017 |
| WO | 2005071449 A2 | 8/2005 |
| WO | 2010021926 A2 | 2/2010 |
| WO | 2015040776 A1 | 3/2015 |
| WO | 2015143227 A1 | 9/2015 |
| WO | 2015157184 A1 | 10/2015 |
| WO | 2015190311 A1 | 12/2015 |
| WO | 2018035492 A1 | 2/2018 |
| WO | 2018208618 A1 | 11/2018 |
| WO | 2019055755 A1 | 3/2019 |
| WO | 2019067846 A1 | 4/2019 |
| WO | 2019147762 A1 | 8/2019 |

OTHER PUBLICATIONS

CN201780030715.3 Notification of the First Office Action dated Jan. 21, 2020.
EP-16860628.3 Extended European Search Report of European Patent Office dated Apr. 26, 2019.
EP-17799963.8 Extended European Search Report of European Patent Office dated Oct. 9, 2019.
Gass, et al. "Privacy LCD Technology for Cellular Phones", Sharp Laboratories of Europe Ltd, Mobile LCD Group, Feb. 2007, pp. 45-49.
Ishikawa, T., "New Design for a Highly Collimating Turning Film", SID 06 Digest, pp. 514-517.
Kalantar, et al. "Backlight Unit With Double Surface Light Emission", J. Soc. Inf. Display, vol. 12, Issue 4, pp. 379-387 (Dec. 2004).
PCT/US2016/058695 International search report and written opinion of the international searching authority dated Feb. 28, 2017.
PCT/US2017/032734 International search report and written opinion of the international searching authority dated Jul. 27, 2017.
PCT/US2018/031206 International search report and written opinion of the international searching authority dated Jul. 20, 2018.
PCT/US2018/031218 International search report and written opinion of the international searching authority dated Jul. 19, 2018.
PCT/US2018/051021 International search report and written opinion of the international searching authority dated Nov. 21, 2018.
PCT/US2018/051027 International search report and written opinion of the international searching authority dated Nov. 30, 2018.
PCT/US2018/053328 International search report and written opinion of the international searching authority dated Nov. 30, 2018.
PCT/US2018/059249 International search report and written opinion of the international searching authority dated Jan. 3, 2019.
PCT/US2018/059256 International search report and written opinion of the international searching authority dated Jan. 3, 2019.
PCT/US2019/014889 International search report and written opinion of the international searching authority dated May 24, 2019.
PCT/US2019/014902 International search report and written opinion of the international searching authority dated Jun. 25, 2019.
PCT/US2019/023659 International search report and written opinion of the international searching authority dated Jun. 10, 2019.
PCT/US2019/038409 International search report and written opinion of the international searching authority dated Sep. 19, 2019.
PCT/US2019/038466 International search report and written opinion of the international searching authority dated Nov. 5, 2019.
PCT/US2019/042027 International search report and written opinion of the international searching authority dated Oct. 15, 2019.
PCT/US2019/054291 International search report and written opinion of the international searching authority dated Jan. 6, 2020.
PCT/US2019/059990 International search report and written opinion of the international searching authority dated Feb. 28, 2020.
PCT/US2019/066208 International search report and written opinion of the international searching authority dated Feb. 27, 2020.
PCT/US2020/017537 International search report and written opinion of the international searching authority dated Apr. 29, 2020.
Weindorf et al., "Active Circular Polarizer OLED E-Mirror", Proceedings of the Society for Information Display 25th Annual Symposium of Vehicle Displays, Livonia, MI, pp. 225-237, Sep. 25-26, 2018.
Adachi, et al. "P-228L: Late-News Poster: Controllable Viewing-Angle Displays using a Hybrid Aligned Nematic Liquid Crystal Cell", ISSN, SID 2006 Digest, pp. 705-708.
PCT/US2020/040686 International search report and written opinion of the international searching authority dated Nov. 20, 2020.

(56) References Cited

OTHER PUBLICATIONS

PCT/US2020/044574 International search report and written opinion of the international searching authority dated Oct. 21, 2020.

* cited by examiner

BACKLIGHTS HAVING STACKED WAVEGUIDE AND OPTICAL COMPONENTS WITH DIFFERENT COEFFICIENTS OF FRICTION

TECHNICAL FIELD

This disclosure generally relates to illumination of light modulation devices, and more specifically relates to light guides for providing large area illumination from localized light sources for use in 2D display including privacy display and low stray light displays, 3D display, and/or autostereoscopic display devices.

BACKGROUND

Directional displays provide non-Lambertian luminance distributions to display viewers, that is the luminance varies with viewing direction.

Low stray light displays such as privacy displays provide image visibility to a primary user that is typically in an on-axis position and reduced visibility of image content to a snooper, that is typically in an off-axis position. A privacy function may be provided by micro-louvre optical films that transmit some light from a display in an on-axis direction with low luminance in off-axis positions. However such films have high losses for head-on illumination and the micro-louvres may cause Moiré artefacts due to beating with the pixels of the spatial light modulator. The pitch of the micro-louvre may need selection for panel resolution, increasing inventory and cost.

Switchable privacy displays may be provided by control of the off-axis optical output. Control may be provided by means of luminance reduction, for example by means of switchable backlights for a liquid crystal display (LCD) spatial light modulator.

Display backlights in general employ waveguides and edge emitting sources.

Displays comprising collimating directional waveguides are described in Ishikawa et al. "New Design for a Highly Collimating Turning Film" SID 06 Digest, pp. 514-517, 2006 and in U.S. Patent Publ. No. 2017-0269283.

Certain imaging directional backlights have the additional capability of directing the illumination through a display panel into viewing windows. An imaging system may be formed between multiple sources and the respective window images. One example of an imaging directional backlight is an optical valve that may employ a folded optical system and hence may also be an example of a folded imaging directional backlight. Light may propagate substantially without loss in one direction through the optical valve while counter-propagating light may be extracted by reflection off tilted facets as described in U.S. Pat. No. 9,519,153, which is herein incorporated by reference in its entirety. Such imaging directional backlights may be used for privacy display as well as for time multiplexed autostereoscopic display.

BRIEF SUMMARY

According to a first aspect of the present disclosure there is provided a directional backlight may comprising: plural light sources; and a stack of components, including optical components and optionally a support component, wherein one of the optical components within the stack is a directional waveguide comprising: an input end extending in a lateral direction along a side of the stack, the light sources being disposed along the input end and arranged to input input light into the waveguide; and opposed first and second guide surfaces extending across the stack from the input end for guiding light input at the input end along the waveguide, the waveguide being arranged to deflect input light guided through the waveguide to exit through the first guide surface, wherein, referring to the interfaces between the waveguide and the optical components adjacent the waveguide as waveguide interfaces and referring to the interfaces between components in the stack outside the waveguide interfaces as outer interfaces, the coefficient of friction at the waveguide interfaces is greater than the coefficient of friction at at least one outer interface on each side of the waveguide in the stack.

Translation of each side of the waveguide with respect to adjacent components may be reduced when the directional backlight has an external compressive force applied. Damage to each side of the waveguide may be reduced. Scatter from damage to the sides of the waveguide may be reduced. Advantageously artefacts that are seen in illuminated images may be reduced and the lifetime of the backlight increased. The waveguide may not have expensive coatings applied, thus cost may be reduced for a given level of tolerance to an external compressive force.

The waveguide may be arranged to image the light sources in the lateral direction so that the output light from the light sources is directed into respective optical windows in output directions that are distributed in dependence on the input positions of the light sources. Advantageously a switchable directional backlight may be provided that may be switched between wide angle operation and directional operation including switchable privacy, autostereoscopic 3D, high luminance outdoors operation and reduced stray light for night time operation.

The at least one optical component adjacent the waveguide may be transparent to at least one operating wavelength of the light sources.

Optical layers may provide a mechanical protection of the waveguide surface. Advantageously the thickness of the mechanical and optical stack of the backlight may be reduced.

Each optical component adjacent the waveguide may have a surface at the waveguide interface on one side thereof that is shaped to prevent optical coupling between the waveguide and the optical component adjacent the waveguide in the absence of an external compressive force.

Light may propagate within the waveguide when no external compressive force is applied without loss. Advantageously image artefacts are reduced during operation of the display, while surface protection is provided when the display has an external compressive force applied.

Each optical component adjacent the waveguide may have a surface at the waveguide interface on one side thereof with an RMS roughness of at least 0.05 micrometres. The interface may wet the waveguide during an external compressive force, and reduce movement at the surface, advantageously reducing damage. On release of the compressive force, the roughness of the surface may promote de-wetting of the surface, advantageously achieving no losses or image degradations from optical coupling at the interface when the display is in operation without a compressive force.

At least one of the optical components adjacent the waveguide may have differing surface properties configured to provide a coefficient of friction at the waveguide interface on one side thereof that is greater than the coefficient of friction at the outer interface on the other side thereof.

Under a compressive force, small or no relative movement of the interface adjacent the sides of the waveguide is achieved, while movement desirable to relieve shear forces is provided at different interfaces that are not susceptible to damage. Advantageously shear forces are relieved at optical interfaces that have high tolerance to rubbing by the respective surfaces of the interface, increasing optical quality.

Said at least one of the optical components adjacent the waveguide may comprise plural layers, the outer layers of which provide said differing surface properties. One of said layers may be a substrate and one or both of the outer layers may be a coating applied to the substrate. Advantageously the surface properties of the interfaces at the sides of the waveguide may be conveniently provided by elements of the optical stack with surface material properties that are adapted to minimise damage to the waveguide when the optical stack is subject to an applied compressive force.

The surface properties of at least one of the optical components at the waveguide interface are provided by the addition of asperity particles to the respective coating. The surface properties of at least one of the optical components at the waveguide interface are provided by the addition of asperity particles to the bulk of the substrate. Thus, the surface properties of, at least one of the optical components adjacent the waveguide, on one side are provided by the addition of asperity particles arranged in a surface coating layer of the optical components. Advantageously the diffusion, surface roughness and surface optical coupling may be controlled to provide reduction of damage to the waveguide when the optical stack is subject to an applied compressive force.

Said at least one of the optical components adjacent the waveguide may comprise a surface produced by an embossing process. Advantageously a surface with desirable wetting and de-wetting properties under repeated compressive external forces may be provided in a low-cost structure.

The outer layer of the optical component at the outer interface may comprise a low friction additive or coating. The surface may be arranged to slide over adjacent surfaces when an external compressive force is applied or removed. Advantageously the surface may achieve release of shear forces, and reduce damage to the waveguide.

Said plural layers include at least one layer that has an optical function. Thus said at least one layer that has an optical function that is a polariser, a retarder or a diffuser. Advantageously the number of layers in the optical system may be reduced, reducing cost.

Thus said at least one of the optical components adjacent the waveguide has at least one surface that is treated or processed to provide said differing surface properties. Thus said treatment is by chemical, plasma, flame or corona means. Thus said at least one of the optical components adjacent the waveguide has a surface at the waveguide interface on one side thereof that is chemically treated to increase its roughness.

Advantageously wetting of waveguide surfaces may be increased or sliding of outer surfaces may be enhanced.

The stack may comprise optical components outside the first guide surface of the waveguide that include an optical component adjacent the waveguide having said differing surface properties. The waveguide surface may experience small movement when an external compressive force is applied or removed so that advantageously damage is reduced. Outer surfaces may slide with respect to adjacent surfaces to advantageously release shear forces. Damage to the waveguide may be reduced.

The stack may comprise optical components outside the second guide surface of the waveguide that include: an optical component adjacent the waveguide having said differing surface properties; and a rear reflector comprising an array of reflective facets arranged to reflect light that is transmitted through the second guide surface back through the waveguide to exit through the first guide surface.

Advantageously damage to the waveguide by the rear reflector, and damage to the rear reflector may be reduced.

The stack may comprise components outside the second guide surface of the waveguide that include: a rear reflector adjacent the waveguide and comprising an array of reflective facets arranged to reflect light that is transmitted through the second guide surface back through the waveguide to exit through the first guide surface, the rear reflector having said differing surface properties; and a support component outside and adjacent the rear reflector, wherein the coefficient of friction at the waveguide interface between the waveguide and the rear reflector is greater than the coefficient of friction at the outer interface between the rear reflector and the support component. An optical stack may be provided wherein the rear reflector is in contact with the waveguide. The stack may comprise optical components outside the second guide surface of the waveguide that include: an optical component adjacent the waveguide; a rear reflector outside said optical component adjacent the waveguide and comprising an array of reflective facets arranged to reflect light that is transmitted through the second guide surface back through the waveguide to exit through the first guide surface; and a support component outside and adjacent the rear reflector, wherein both (i) the coefficient of friction at the waveguide interface and (ii) the coefficient of friction at the outer interface between the optical component adjacent the waveguide and the rear reflector are greater than the coefficient of friction at the outer interface between the rear reflector and the support component.

Advantageously thickness may be reduced. Further, damage to the rear reflector may be reduced during application or removal of an applied compressive force. Image artefacts may be reduced and lifetime of the backlight increased.

Each optical component adjacent the waveguide may have a surface at the waveguide interface having a surface hardness of not more than two pencil hardness levels different from the pencil hardness of the waveguide surface, preferably not more than one pencil hardness level different from the pencil hardness of the waveguide surface and most preferably the same pencil hardness level as the pencil hardness of the waveguide surface. Harder surfaces tend to damage softer surfaces. Advantageously damage of both the waveguide and adjacent optical surfaces may be reduced.

The waveguide further comprises a reflective end, the waveguide being arranged to deflect input light guided through the waveguide after reflection from the reflective end to exit through the first guide surface. The first guide surface is arranged to guide light by total internal reflection, and the second guide surface comprises light extraction features and intermediate regions between the light extraction features, the light extraction features being arranged to deflect input light guided through the waveguide after reflection from the reflective end to exit through the first guide surface. Either or both of the reflective end and the light extraction features have optical power in the lateral direction.

Advantageously a switchable directional display may be provided that may switch between a first wider angle of view and second lateral optical window profiles with a smaller angle of view.

The waveguide may further comprise at least one taper, the waveguide being arranged to deflect input light guided through the waveguide from the light sources to exit through the first guide surface. The at least one taper may comprise an array of tapered microstructures. One of the optical components may comprise a prism array arranged to deflect light that exits through the first guide surface of the waveguide.

Advantageously a waveguide may be provided without a reflective coating, reducing cost and complexity.

At least one of the first and second light guiding surface may comprise: a plurality of non-inclined light extraction features arranged in an array, each non-inclined light extraction feature being elongate, extending in a longitudinal direction perpendicular to the lateral direction, and having surface normal directions that vary in a plane orthogonal to the longitudinal direction and that have no component of tilt in the longitudinal direction. At least one of the first and second light guiding surfaces may comprise: a plurality of inclined light extraction features arranged in an array, each inclined light extraction feature having a surface normal direction with a tilt that has a component in the longitudinal direction, the plurality of non-inclined light extraction features and the plurality of inclined light extraction features being oriented to direct guided light through the first and second light guiding surfaces as output light. The plurality of inclined light extraction features may comprises: a first plurality of inclined light extraction features, each light extraction feature of the first plurality of inclined light extraction features having a surface normal direction that has a tilt with a component in the longitudinal direction that is away from the light input end, and a second plurality of inclined light extraction features, each light extraction feature of the second plurality of inclined light extraction features having a surface normal direction that has a tilt with a component in the longitudinal direction that is towards the light input end. The magnitude of the component in the longitudinal direction of the tilt of the surface normal direction of the first plurality of inclined light extraction features may be different from the magnitude of the component in the longitudinal direction of the tilt of the surface normal direction of the second plurality of inclined light extraction features. The plurality of non-inclined light extraction features comprises a lenticular surface or an elongate prismatic surface.

The backlight provides a luminance at lateral angles greater than 45 degrees, that is at most 20%, preferably at most 15% and most preferably at most 10% of the luminance in a direction normal to the display surface.

Advantageously a polar luminance profile may be achieved with low luminance for off-axis viewing positions. The illumination profile may be switched between a wide angle mode that is visible by multiple observers and a privacy mode that has low visibility to off-axis observers. A low stray light display may be provided.

One of the optical components may comprise a switchable polymer dispersed liquid crystal element. Advantageously an increased viewing angle may be provided.

One of the optical components may comprise a switchable optical retarder. Advantageously off-axis luminance in privacy mode may be decreased. Further the component may be provided with surfaces that achieve reduced damage of the waveguide.

According to a second aspect of the present disclosure there is provided a directional display device may comprise: a directional backlight according to the first aspect; and a spatial light modulator arranged to modulate the output light to display an image. Advantageously uniform images may be provided that are not degraded by defects in the backlight arising from damage to the waveguide or other optical layers.

According to a third aspect of the present disclosure there is provided a directional display apparatus comprising: a directional display device according to the second aspect; and a control system arranged to control the light sources. Autostereoscopic 3D display, privacy display, power savings displays, dual view displays, low stray light displays for night time operation or displays for efficient outdoors operation may be provided that are not damaged during assembly or handling.

Any of the aspects of the present disclosure may be applied in any combination.

Embodiments herein may provide an autostereoscopic display that provides wide angle viewing which may allow for directional viewing and conventional 2D compatibility. The wide angle viewing mode may be for observer tracked autostereoscopic 3D display, observer tracked 2D display (for example for privacy or power saving applications), for wide viewing angle 2D display or for wide viewing angle stereoscopic 3D display. Further, embodiments may provide a controlled illuminator for the purposes of an efficient autostereoscopic display. Such components can be used in directional backlights, to provide directional displays including autostereoscopic displays. Additionally, embodiments may relate to a directional backlight apparatus and a directional display which may incorporate the directional backlight apparatus. Such an apparatus may be used for autostereoscopic displays, privacy displays, multi-user displays and other directional display applications that may achieve for example power savings operation and/or high luminance operation.

Embodiments herein may provide an autostereoscopic display with large area and thin structure. Further, as will be described, the optical valves of the present disclosure may achieve thin optical components with large back working distances. Such components can be used in directional backlights, to provide directional displays including autostereoscopic displays. Further, embodiments may provide a controlled illuminator for the purposes of an efficient autostereoscopic display.

Embodiments of the present disclosure may be used in a variety of optical systems. The embodiment may include or work with a variety of projectors, projection systems, optical components, displays, microdisplays, computer systems, processors, self-contained projector systems, visual and/or audiovisual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

Directional backlights offer control over the illumination emanating from substantially the entire output surface controlled typically through modulation of independent LED light sources arranged at the input aperture side of an optical waveguide. Controlling the emitted light directional distribution can achieve single person viewing for a security function, where the display can only be seen by a single viewer from a limited range of angles; high electrical efficiency, where illumination is primarily provided over a small angular directional distribution; alternating left and right eye viewing for time sequential stereoscopic and autostereoscopic display; and low cost.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which.

DETAILED DESCRIPTION

It would be desirable to maintain the optical performance of display systems throughout the lifetime of operation of the device incorporating the display. Typically, displays are subjected to compressive forces, for example from operator pressure onto the display (for example by means of a touch screen operation) or during transportation or handling of the device. Such compressive forces may degrade the performance of the display as will now be described. The arrangement of surfaces for an optical stack for a directional display that is resistant to damage from a compressive load will now be described.

Figure 1:
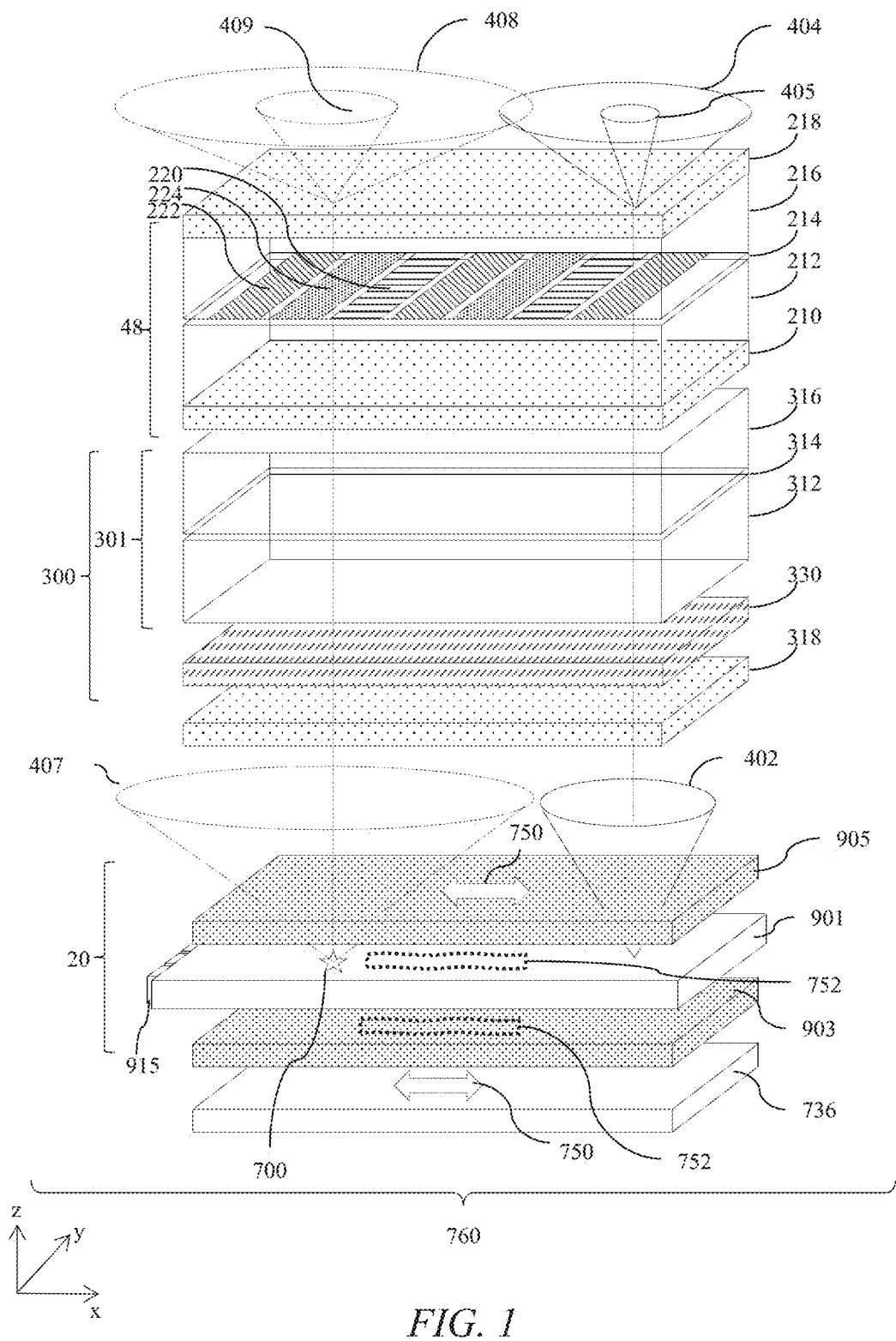
FIG. 1 is a schematic diagram illustrating in perspective view a directional display optical stack comprising a directional waveguide, a switchable retarder and a spatial light modulator.

FIG. 1 is a schematic diagram illustrating in perspective view a directional display optical stack 760 comprising a collimating directional waveguide 901, a switchable retarder 300 and a spatial light modulator 48.

A directional display device comprises an optical stack 760 comprising a spatial light modulator 48 comprising at least one display polariser that is the output polariser 218. Backlight 20 is arranged to output light and the spatial light modulator 48 comprises a transmissive spatial light modulator 48 arranged to receive output light from the backlight 20. The display device is arranged to output light 400 with angular luminance properties as will be described herein.

In the present disclosure, the spatial light modulator 48 may comprise a liquid crystal display comprising substrates 212, 216, and liquid crystal layer 214 having red, green and blue pixels 220, 222, 224. The spatial light modulator 48 has an input display polariser 210 and an output display polariser 218 on opposite sides thereof. The output display polariser 218 is arranged to provide high extinction ratio for light from the pixels 220, 222, 224 of the spatial light modulator 48. Typical polarisers 210, 218 may be absorbing polarisers such as dichroic polarisers.

Backlight 20 comprises input light sources 15, collimating directional waveguide 901, rear reflector 903 and optical stack 905 comprising diffusers, light turning films and other known optical backlight structures. Asymmetric diffusers, that may comprise asymmetric surface relief features for example, may be provided in the optical stack 5 with increased diffusion in the elevation direction in comparison to the lateral direction may be provided. Advantageously image uniformity may be increased.

In the present embodiments, the backlight 20 may be arranged to provide an angular light distribution 402 that has reduced luminance for off-axis viewing positions in comparison to head-on luminance. For example distribution 402 may indicate the full width half maximum cone size for the optical output.

Backlight 20 may optionally further comprise a switchable backlight arranged to switch the output angular luminance profile in order to provide reduced off-axis luminance in a privacy mode of operation and higher off-axis luminance in a wide angle mode of operation.

Desirably, for privacy display the backlight 20 the provides a luminance at lateral angles greater than 45 degrees, that is at most 20%, preferably at most 15% and most preferably at most 10% of the luminance in a direction normal to the display surface. Such cone angles are achieved using the directional waveguides 901 of the present disclosure as will be described further below.

It would be desirable to provide control of the output luminance distribution for various applications.

In a switchable privacy display, in a first mode a wide angle mode may be provided with the display visible for multiple users. In a second mode a privacy mode of operation may be provided by reducing off-axis luminance to undesirable image snoopers. In another display application for reduced off-axis stray light, such displays can achieve reduced cabin illumination of night time operation from automotive displays.

Some types of privacy displays are illustrated in FIG. 1 and described further in U.S. patent application Ser. No. 16/131,419 filed Sep. 14, 2018 and titled "Optical stack for switchable directional display", and in U.S. Provisional Patent Appl. No. 62/699,906 filed Sep. 18, 2018 and titled "Reflective optical stack for privacy", both of which are herein incorporated by reference in their entireties. Additional polariser 318 is arranged on the same output side of the spatial light modulator 48 as the display input polariser 210 which may be an absorbing dichroic polariser and plural retarders 300 arranged between the additional polariser 318 and input polariser 210.

Plural retarders 300 which together are referred to herein as a switchable compensated retarder 300 are arranged between the additional polariser 318 and the display polariser 218 and comprise: (i) a switchable liquid crystal retarder 301 comprising a layer 314 of liquid crystal material arranged between the display polariser 218 and the additional polariser 318; and (ii) a passive compensation retarder 330. Compensation retarder 330 may be provided to increase the viewing reduction of off-axis luminance in privacy mode while achieving wide viewing angle in wide angle mode of operation. Substrate 316 may be bonded to input polariser 210 or may be provided with an air gap.

In operation, the light cone 402 from the collimating directional waveguide 901 propagates through plural retarders 300 and the spatial light modulator 48 and typically provides light output cone 404 in wide angle mode and narrower light output cone 405 in privacy mode.

FIG. 1 further illustrates the effect of damage of surface damage feature 700 on the waveguide 901. As will be described such features 700 provide scattered light into light cones 407 that are larger in size than the cone 402 from undamaged regions. After propagation through the plural retarders 300 and spatial light modulator 48, light cones 408, 409 are provided in wide angle and privacy modes respectively. For an off-axis observer, light may be seen at off-axis angles around the region of surface damage regions 700 and not seen at other regions. Thus surface damage features 700 may be visible as undesirable non-uniformities for off-axis viewers.

In the present embodiments, referring to the interfaces between the collimating directional waveguide 901 and the optical components 905, 901 adjacent the collimating directional waveguide 901 as waveguide interfaces and referring to the interfaces between components in the stack outside the directional waveguide interfaces as outer interfaces, the coefficient of friction at the directional waveguide interfaces is greater than the coefficient of friction at an at least one outer interface on each side of the directional waveguide in the stack, that includes support component 736 such as the rear cover of the optical stack 760. Such variations of coefficient of friction are schematically illustrated by the effect on interfaces with relative surface translations 750 and interfaces with wetting regions 752.

Such interface properties may be arranged to minimise creation of surface damage regions 700 on the collimating directional waveguide 901. Advantageously display uniformity may be increased. Display lifetime may be extended. Mechanical system complexity may be reduced, advantageously reducing thickness and cost.

The structure of FIG. 1 will now be further described where the collimating directional waveguide 901 is typically termed a collimated direction waveguide 901.

Figure 2:
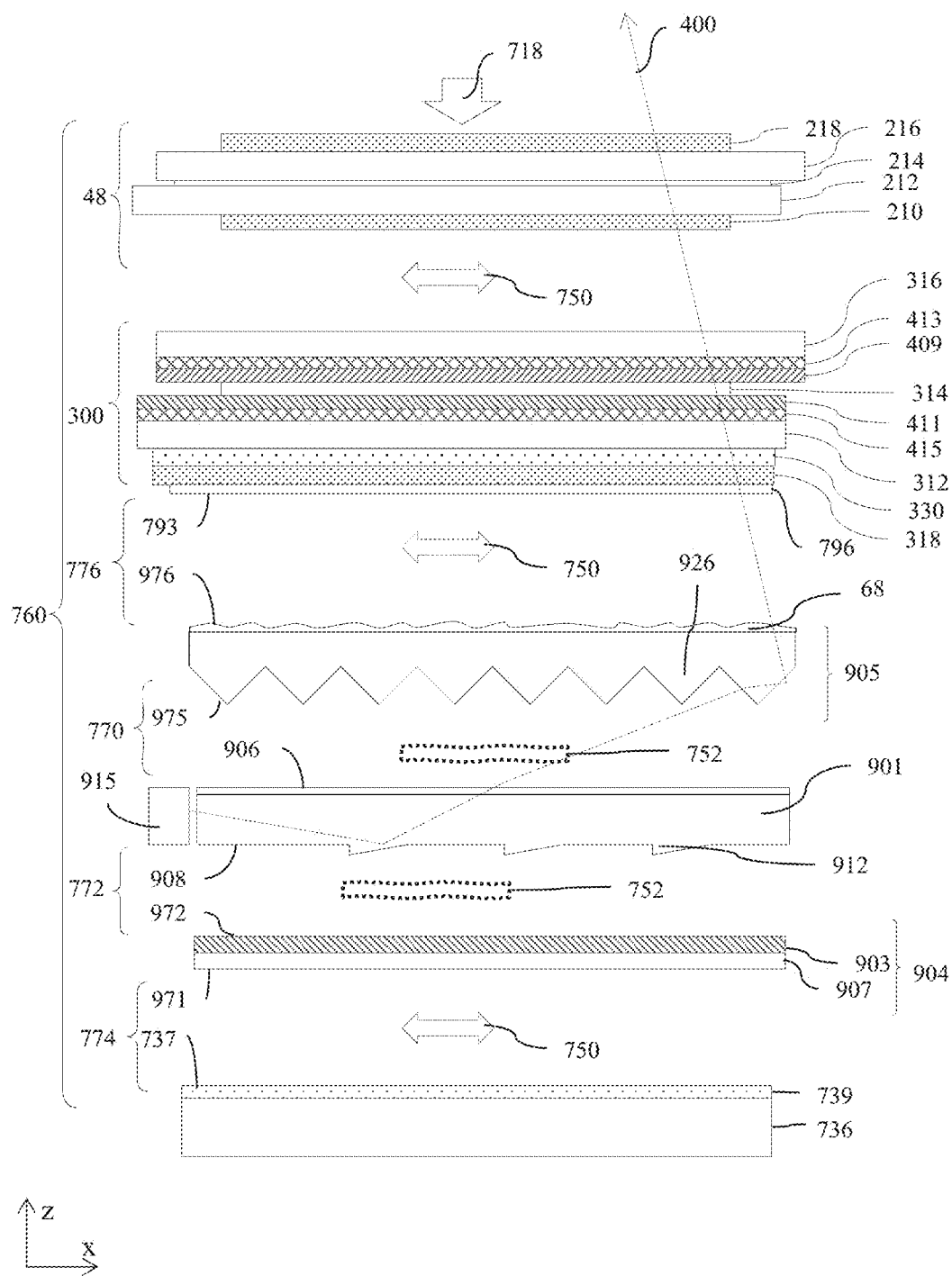
FIG. 2 is a schematic diagram illustrating in side view a directional display optical stack comprising a collimated directional waveguide, a switchable retarder and a spatial light modulator, and comprising layers to reduce damage to optical surfaces.

FIG. 2 is a schematic diagram illustrating in side view a directional display optical stack 760 comprising a collimated collimating directional waveguide 901, plural retarders 300 and a spatial light modulator 48, and comprising layers to reduce damage to optical surfaces.

Collimated directional waveguides 901 are different from the imaging waveguides described below in that they provide narrow cone angles 402, but the direction of the maximum luminance is typically the same across the collimating directional waveguide 901 so that no optical window is provided. Further the light cone is not provided by imaging of light sources, but is provided by refraction of guided light at the surfaces 906, 908 of the waveguide and light turning film 905.

The interface 776 will now be described. Additional polariser 318 may comprise an optional layer 796 on the lower surface such that the lower surface 793 has the properties of high damage resistance, low coefficient of friction and reduced wetting sensitivity.

The optical element 905 may comprise a prism array 926 that is arranged to redirect light rays 400 that are output from waveguide 901 in directions around normal direction of the spatial light modulator 48. The element 905 may further comprise a surface relief diffuser 68 on a side facing the prism array 926. In an illustrative example the layer 796 may be provided with a silicon oxide coating to provide surface 793 with 9H pencil hardness and surface energy arranged to minimise wetting in cooperation with the roughness of diffuser 68 surface and surface 793.

During application of compressive force 718 to the optical stack 760, the interface 776 is thus arranged to provide relative surface translation 750 (or sliding), that is the surfaces 793, 976 are free to move with respect to each other.

The interface 774 will now be described. A support component 736 may be provided outside and adjacent the rear reflector 903. The rear reflector 903 may comprise a polymer sheet such as ESR™ from 3M and may have an optional coating or substrate 907 that has a surface 971. Further the support component 736 which may for example comprise aluminium or stainless steel may have an optional coating 739 and surface 737. The properties of the surfaces 971, 737 at interface 774 are arranged to enable relative surface translation 750.

The interfaces 770, 772 will now be described. By way of comparison with the interfaces 774, 776, interfaces 770, 772 are arranged to provide wetting regions 752 during application of compressive force 718 to the optical stack 760. Thus the surface 975 of the prism array 926 and the surface 972 of the rear reflector 903 are arranged to provide temporary wetting in at least some regions to the surfaces 906, 908 of the collimated collimating directional waveguide 901.

The present embodiments have interfaces 770, 772, 774, 776 that advantageously achieve reduced damage to the waveguide and adjacent optical components as will be described further below.

Figure 3A:
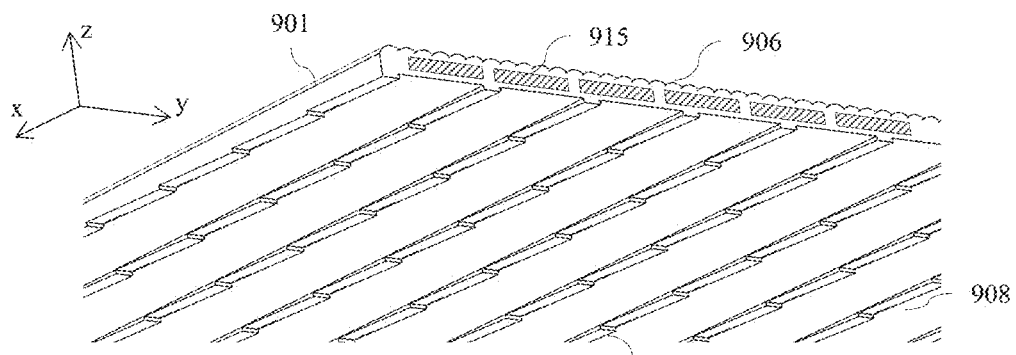
FIG. 3A and FIG. 3B are schematic diagrams illustrating in perspective views a collimated directional waveguide.
Figure 3B:
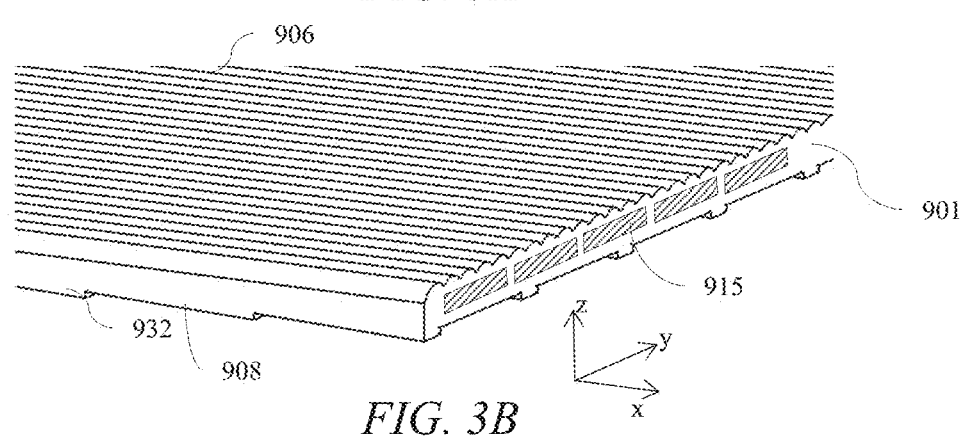

FIGS. 3A-3B are schematic diagrams illustrating in perspective views a collimated collimating directional waveguide 901.

The first light guiding surfaces 906, 908 comprises a plurality of non-inclined light extraction features arranged in an array. In the present embodiment, the non-inclined light extraction features comprises a lenticular surface or an elongate prismatic surface arranged on the array.

Each non-inclined light extraction feature is elongate, extending in a longitudinal direction (x-axis) perpendicular to the lateral direction (y-axis), and having surface normal directions that vary in a plane orthogonal to the longitudinal direction and have no component of tilt in the longitudinal direction The second light guiding surface comprises: a plurality of inclined light extraction features 912 arranged in an array, each inclined light extraction feature 912 having a surface normal direction with a tilt that has a component in the longitudinal direction. In operation, the plurality of non-inclined light extraction features and the plurality of inclined light extraction features are oriented to direct guided light through the first and second light guiding surfaces as output light.

Collimated directional waveguides are described further in International Appl. No. PCT/US18/51027 filed in the U.S. receiving office Sep. 14, 2018 and herein incorporated by reference in its entirety.

The plurality of inclined light extraction features 912 comprises: a first plurality of inclined light extraction features, each light extraction feature of the first plurality of inclined light extraction features having a surface normal direction that has a tilt with a component in the longitudinal direction that is away from the light input end; and a second plurality of inclined light extraction features, each light extraction feature of the second plurality of inclined light extraction features having a surface normal direction that has a tilt with a component in the longitudinal direction that is towards the light input end. The magnitude of the component in the longitudinal direction of the tilt of the surface normal direction of the first plurality of inclined light extraction features is different from the magnitude of the component in the longitudinal direction of the tilt of the surface normal direction of the second plurality of inclined light extraction features.

Thus the light extraction features 912 may be prismatic. The light extraction features may provide high pressure points in contact with the rear reflector 903. Further the points of the prism array 926 may provide high pressure points in contact with the collimated collimating directional waveguide 901. During application of compressive force 718 to the optical stack 760 such high pressure points may be origins of damage to each of the respective components.

Figure 4:
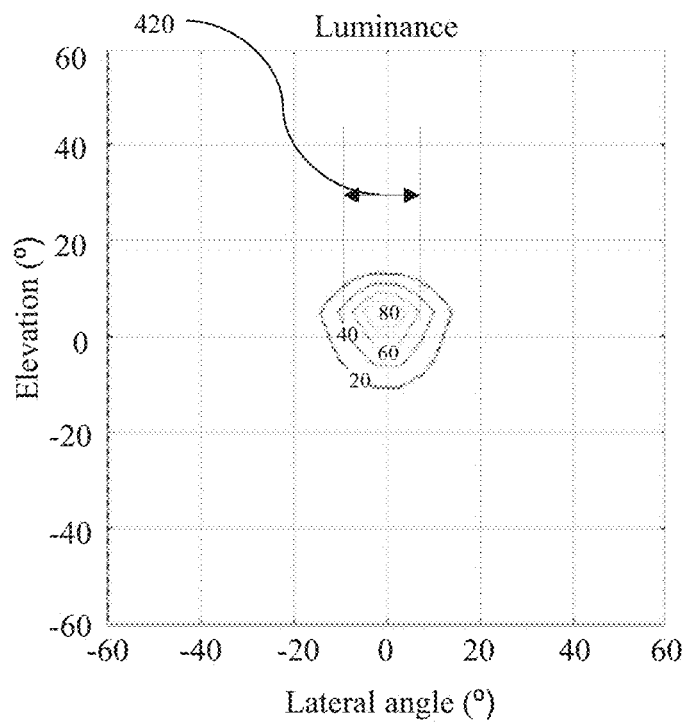
FIG. 4 is a schematic graph illustrating polar luminance profile for a collimated directional waveguide and turning film.

FIG. 4 is a schematic graph illustrating the polar luminance profile for a collimated collimating directional waveguide 901 and turning film comprising prismatic array 926. Desirably for a privacy display with high visual security level, the backlight 20 provides a luminance at lateral angles greater than 45 degrees, that is at most 20%, preferably at most 15% and most preferably at most 10% of the luminance in a direction normal to the display surface. Such a backlight may cooperate with the plural retarders 300 of FIG. 1 to achieve a luminance at 45 degrees of less than 1% of head-on luminance and preferably less than 0.5% of head-on luminance. Advantageously a high performance privacy display may be provided.

The FWHM 420 in the lateral direction is further indicated in FIG. 4.

Figure 5:
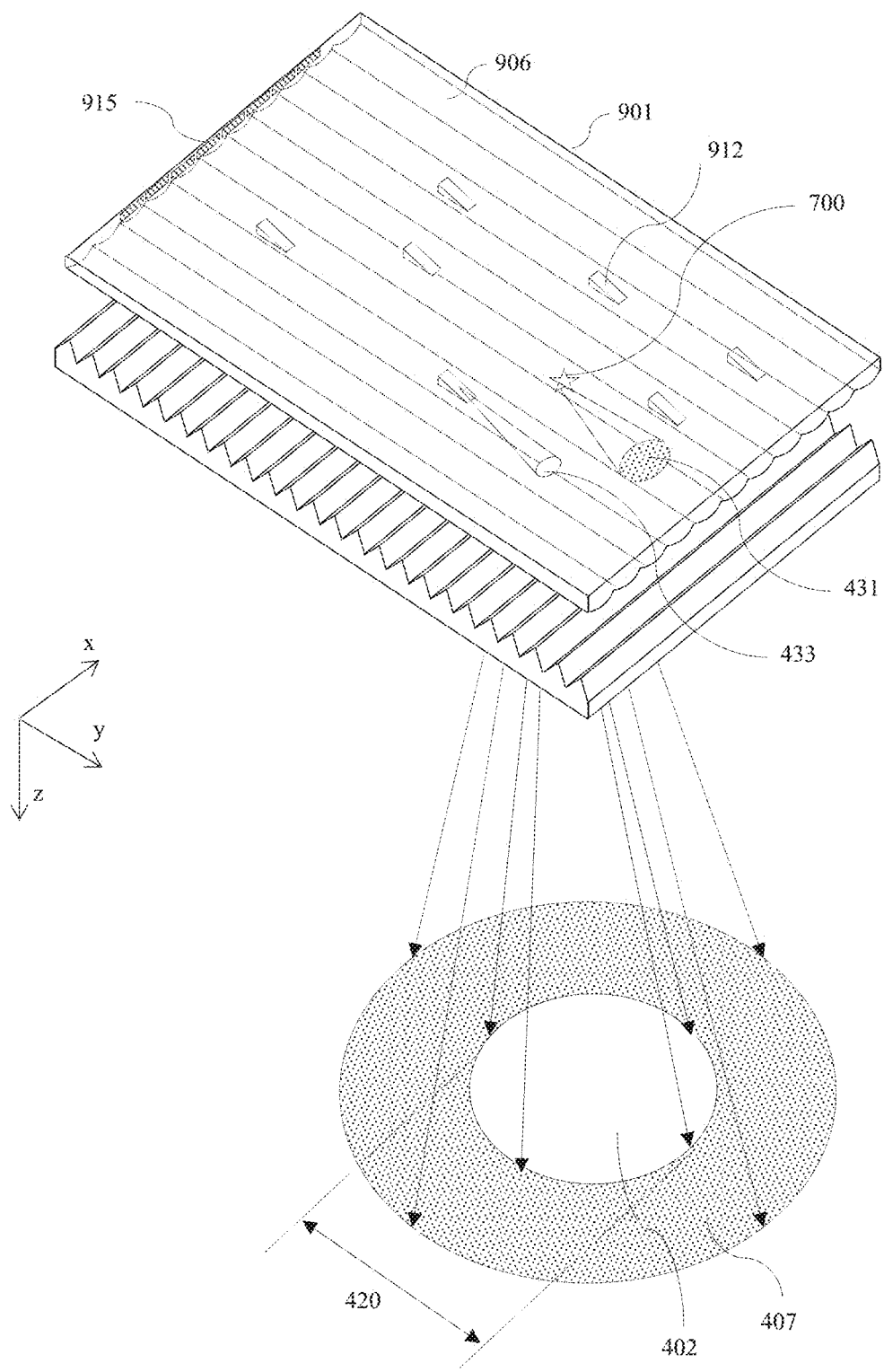
FIG. 5 is a schematic diagram illustrating in perspective view the variation of output luminance profile from a collimated directional waveguide with a surface damage feature 700.

FIG. 5 is a schematic diagram illustrating in perspective view the variation of output luminance profile from a collimated collimating directional waveguide 901 with a surface damage feature 700.

In undamaged regions, light extraction features 912 contribute to providing an output light cone 433 that after propagation through the prismatic array 926 and diffuser 68 provides a desirable output light cone 402 with FWHM 420 such as illustrated in FIG. 4. However, in regions of damage features 700, light is scattered into cone 431 that propagates as light cone 407 with a larger cone angle than FWHM 420.

In operation, an off-axis viewer sees a different luminance from the point of damage than from the undamaged collimated collimating directional waveguide 901. Undesirably, visual non-uniformities are provided. It would be desirable to minimise the formation of damage features 700.

A display comprising another type of directional waveguide will now be described.

Figure 6:
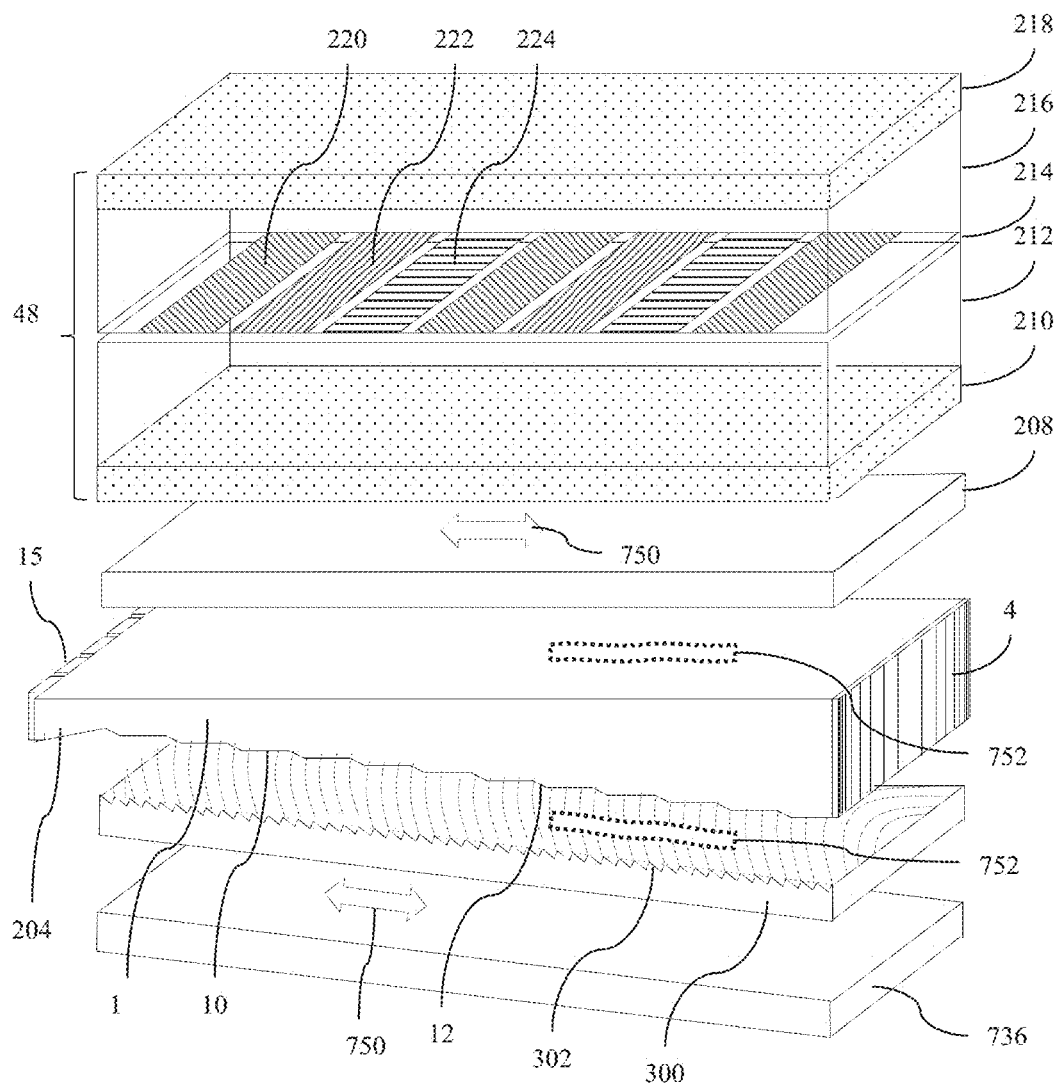
FIG. 6 is a schematic diagram illustrating a perspective view of a directional display apparatus optical stack comprising a directional waveguide with light input at a side that is opposite a reflective side.

FIG. 6 is a schematic diagram illustrating a perspective view of a directional display apparatus optical stack comprising an imaging directional waveguide 1 with light input at a side that is opposite a reflective side.

Reflective end 4 may be provided by a Fresnel mirror. The input surface 2 may be an end of the imaging directional waveguide 1 and may be opposite to the reflective end.

Further taper region 204 may be arranged at the input to the imaging directional waveguide 1 to increase input coupling efficiency from the light sources 15a-15n of the array of illuminator elements 15 and to increase illumination uniformity. Rear reflector 300 may comprise facets 302 that are curved and arranged to provide viewing windows from groups of optical windows provided by imaging light sources of the array 15 to the window plane. An optical stack 208 may comprise reflective polarizers, retarder layers and diffusers. Rear reflectors 300 and optical stack 208 are described further in U.S. Pat. No. 10,054,732, incorporated herein by reference in its entirety.

It would be desirable to protect the imaging directional waveguide 1 during application of compressive force 718 to the optical stack of a directional display to achieve increased image quality, extend display lifetime and increase display ruggedness.

Figure 7:
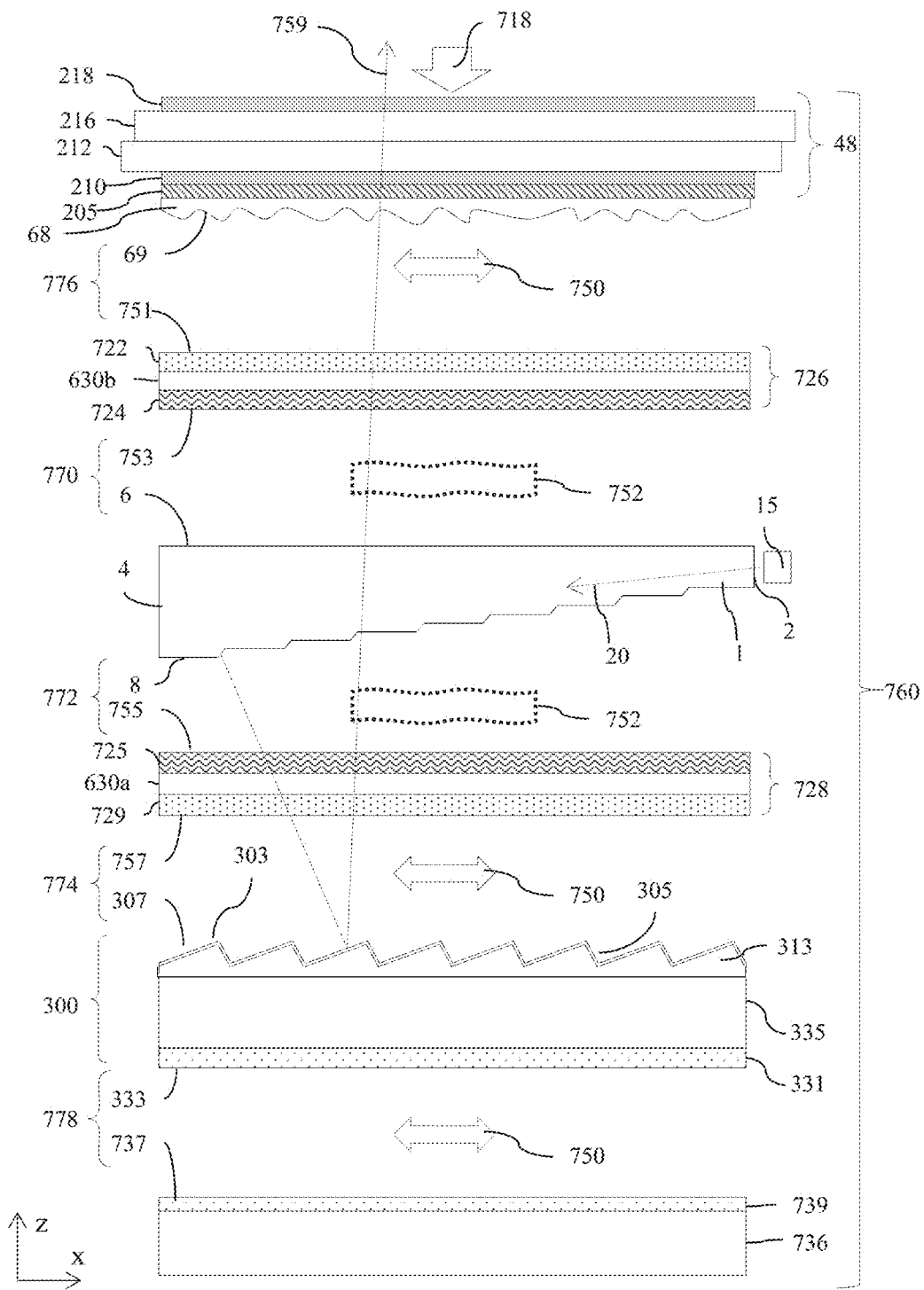
FIG. 7 is a schematic diagram illustrating a side view of a directional display apparatus optical stack comprising a directional waveguide, to which an external compressive force is repeatedly applied, and layers arranged to (i) reduce damage to optical surfaces in and (ii) provide optical light control.

FIG. 7 is a schematic diagram illustrating a side view of a directional display apparatus optical stack 760 comprising a directional waveguide 1, waveguide protection elements 726, 728 and surrounding optical components comprising spatial light modulator 48, diffuser layer 68, and rear reflector 300, to which an external compressive force 718 is repeatedly applied. Layers of optical stack 760 are arranged to (i) provide optical light control and (ii) to achieve reduced damage to optical surfaces as will be described.

Thus a directional backlight may comprise: plural light sources 15; and a stack 760 of components, including optical components 1, 48, 68, 300, 726, 728, and optionally a support component 736, wherein one of the optical components 1, 48, 68, 300, 726, 728 within the stack 760 is a directional waveguide 1 comprising: an input end 2 extending in a lateral direction (y-axis) along a side of the stack 760, the light sources 15 being disposed along the input end 2 and arranged to input input light 20 into the imaging directional waveguide 1; and opposed first and second guide sides 6, 8 extending across the stack 760 from the input end 2 for guiding light 20 input at the input end 2 along the imaging directional waveguide 1, the imaging directional waveguide 1 being arranged to deflect input light 20 guided through the imaging directional waveguide 1 to exit through the first guide side 6, and being arranged to image the light sources 15 in the lateral direction so that the output light 20 from the light sources 15 is directed into respective optical windows 26 in output directions that are distributed in dependence on the input positions of the light sources 15, wherein, referring to the interfaces between the imaging directional waveguide 1 and the optical components 726, 728 adjacent the imaging directional waveguide 1 as waveguide interfaces 770, 772 and referring to the interfaces between components 726, 68 and 728, 300 in the stack 760 outside the waveguide interfaces 770, 772 as outer interfaces 776, 778, the coefficient of friction at the waveguide interfaces 770, 772 is greater than the coefficient of friction of at least one outer interface 776 or 778 on each side 6, 8 of the imaging directional waveguide 1 in the stack 760.

The stack 760 may comprise optical components outside the second guide surface 8 of the imaging directional waveguide 1 that include: an optical component 728 adjacent the imaging directional waveguide 1 having said differing surface properties and differing surfaces properties of surfaces 755, 757; and a rear reflector 300 comprising an array of reflective facets 303, 305 arranged to reflect light rays 759 that are transmitted through the second guide surface 8 back through the imaging directional waveguide 1 to exit through the first guide surface 6.

The optical components 726, 728 may be passive optical components and may for example comprise retarder films such as polycarbonate materials.

A support component 736 may be provided outside and adjacent the rear reflector 300, wherein both (i) the coefficient of friction at the waveguide interface 772 and (ii) the coefficient of friction at the outer interface 774 between the optical component adjacent the waveguide and the rear reflector are greater than the coefficient of friction at the outer interface 778 between the rear reflector 300 and the support component 736.

Figure 8:
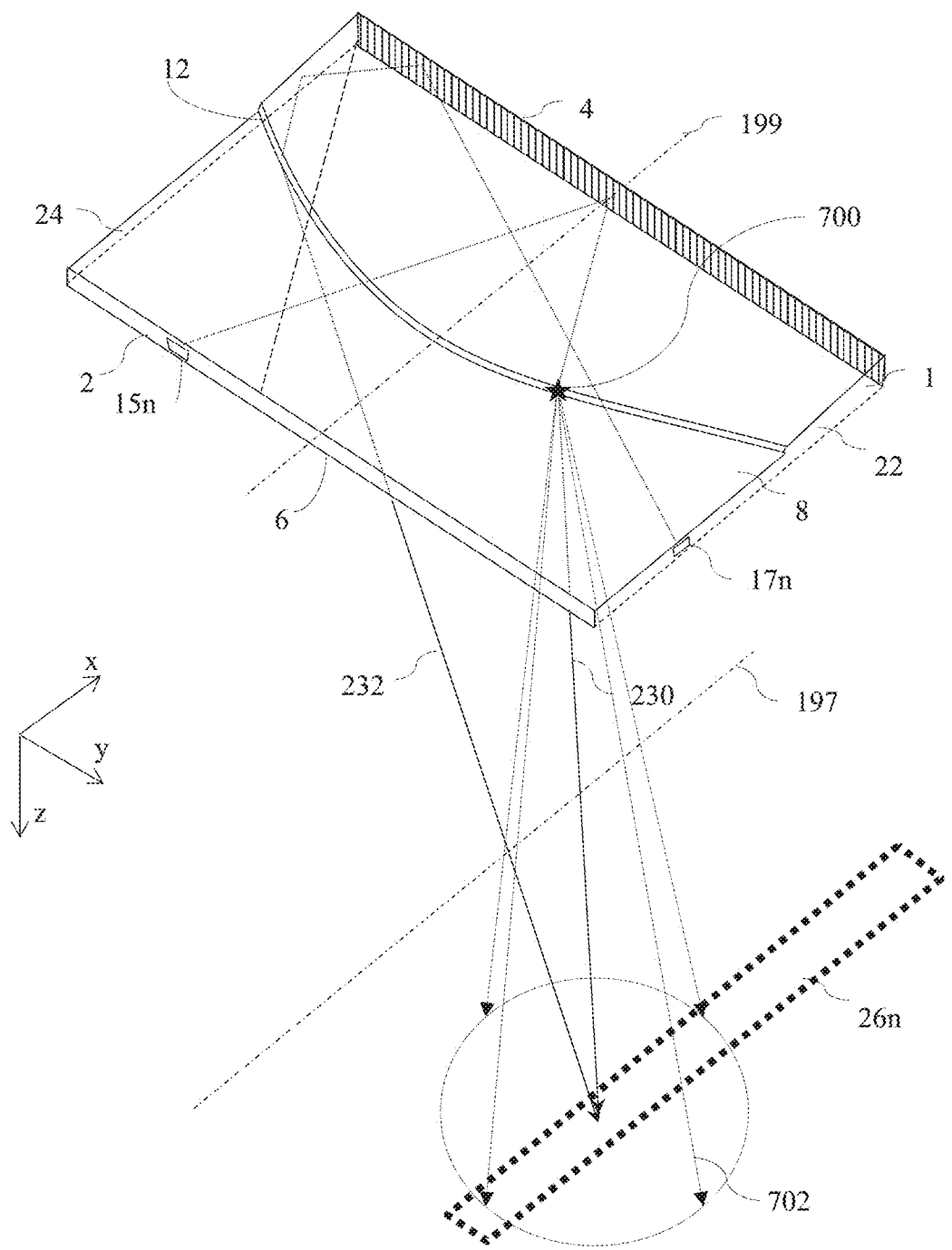
FIG. 8 is a schematic diagram illustrating a perspective view of the formation of optical windows by a directional display apparatus comprising a directional waveguide with light input at a side that is opposite a reflective side with surface damage providing scattered light.

FIG. 8 is a schematic diagram illustrating a perspective view of the formation of optical windows 26n by a directional display apparatus comprising a directional waveguide 1 with light input at a side 2 that is opposite a reflective side 4 with surface damage features 700 providing scattered light rays 702. Thus rays 702 may be provided by damage feature 700 that are undesirably outside of the optical window 26n. Such light rays contribute to non-uniformities of output illumination and degrade privacy performance of the display.

It would be desirable to minimise the features 700 to optimise display quality, extend display lifetime and increase display ruggedness. Further it would be desirable to use known materials for waveguide 1 to optimise transmission efficiency and minimise scatter, to achieve high image quality.

Figure 9A:
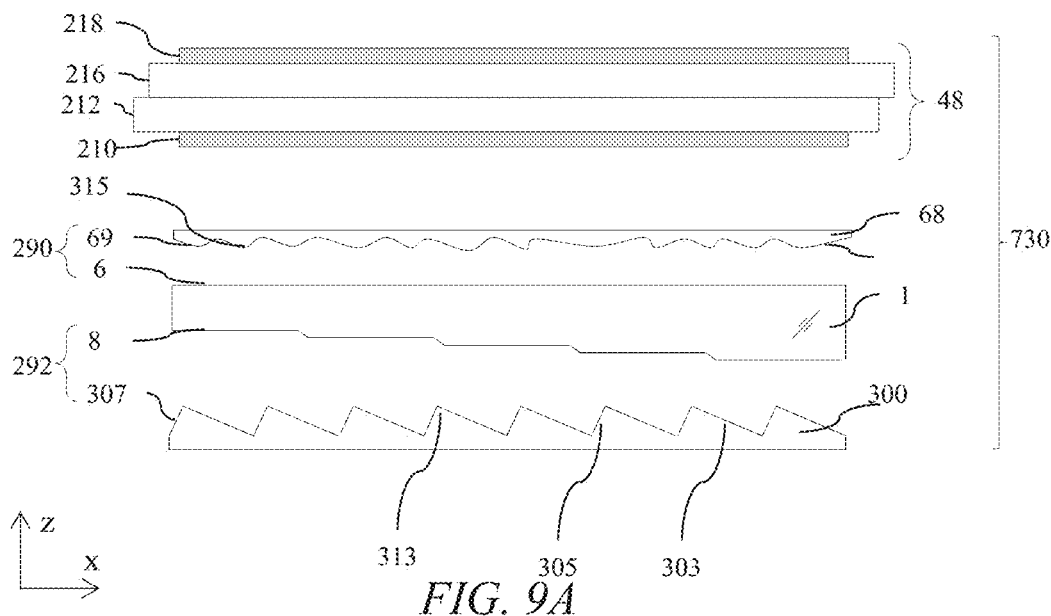
FIG. 9A is a schematic diagram illustrating a side view of a directional display apparatus optical stack comprising a directional waveguide and adjacent structured surfaces.

FIG. 9A is a schematic diagram illustrating a side view of a directional display apparatus optical stack 730 comprising a directional waveguide 1 and adjacent structured surfaces of optical components such as diffuser 68 with high points 315 or rear reflector 300 with sharp asperities 313.

In the present disclosure, surface hardness refers to the resistance a solid material possesses to permanent shape change once a compressive force is applied. A hard material, such as metal, will typically experience very little shape change or surface damage when a given compressive force is applied. In comparison, a soft material, such as plastic, may experience deflection or surface scratching provided the application of that same force. Due to the wide range of solid material hardness that may be encountered, several different scales are used. For the case of polymers and films, it is common to employ the pencil hardness scale.

During dynamic contact such as under shear forces or compressive forces, a harder material will typically scratch a softer material resulting in surface damage to the softer material. Damage between two surfaces may be desirably reduced by matching hardness for the two surfaces, for example using similar pencil hardness levels.

In an illustrative example, the imaging directional waveguide 1 may be formed by means of injection molding which may provide high transparency and high surface quality for first and second guiding surfaces 6, 8. The imaging directional waveguide 1 may be formed from PMMA material that may have a pencil hardness of 1H for example.

The diffuser 68 may be formed from a UV cast material with pencil hardness of 3H for example and the rear reflector 300 may be formed from a UV case material that is coated by a metal layer and a inorganic SiOx evaporated protection layer to reduce metal oxidation and increase reflectivity of the facets 303, 305 of the rear reflector 300. The protection layer may have a pencil hardness of 9H for example.

Without a compressive load, the pressure between adjacent surfaces 6, 8 of the imaging directional waveguide 1 and the diffuser 68, and rear reflector 300 respectively may be low or zero.

Image degradation mechanisms after the application of compressive force and particularly repetitive compressive force will now be described.

Figure 9B:
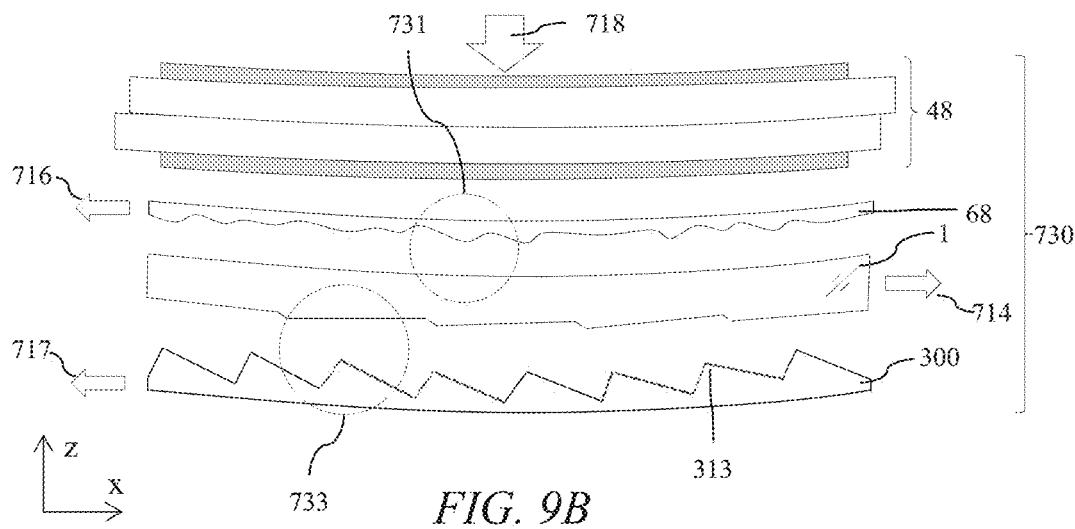
FIG. 9B is a schematic diagram illustrating a side view of the directional display apparatus optical stack of FIG. 9A under an external compressive force.
Figure 10A:
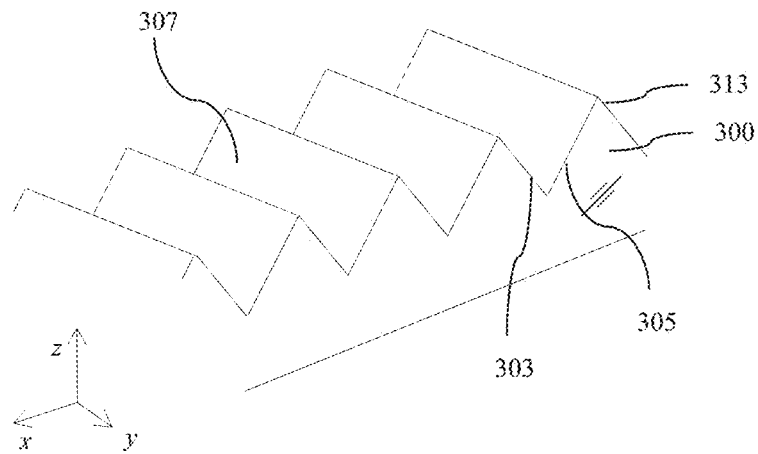
FIG. 10A is a schematic diagram illustrating a perspective view of a faceted rear reflector.
Figure 10B:
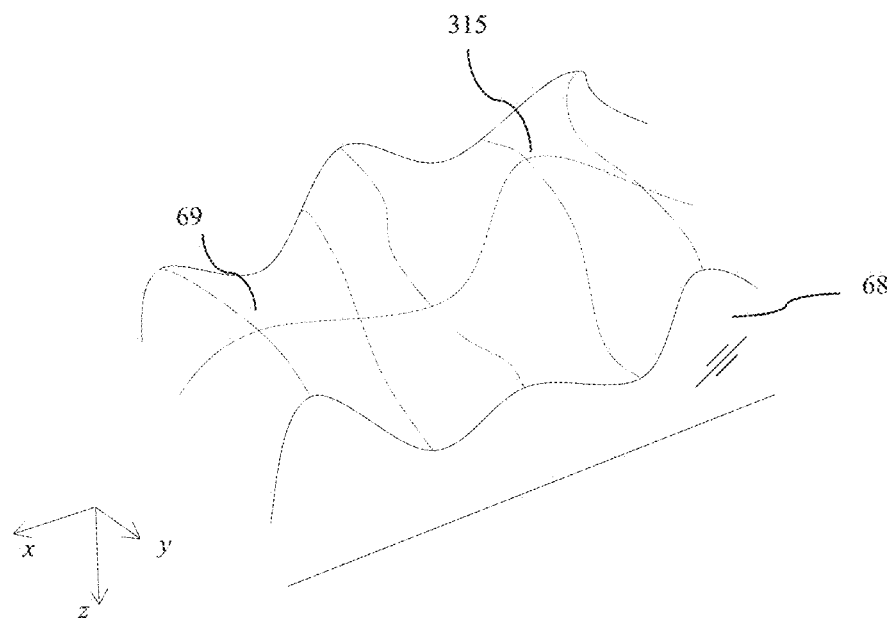
FIG. 10B is a schematic diagram illustrating a perspective view of a surface diffuser with randomly dispersed features.

FIG. 9B is a schematic diagram illustrating a side view of the directional display apparatus optical stack of FIG. 9A under an external compressive force 718. FIG. 10A is a schematic diagram illustrating a perspective view of the surface 307 of a faceted rear reflector 300 comprising reflective facets 303, 305 tips 313; and FIG. 10B is a schematic diagram illustrating a perspective view the surface 69 of a surface relief diffuser 68 with randomly dispersed features. Surface properties of example layers of the optical stack of FIG. 9A are described in TABLE 1.

TABLE 1

| Interface | Surface | Pencil hardness | Example RMS roughness $R_{rms}/\mu m$ |
|---|---|---|---|
| 290 | Acrylate diffuser 68 lower surface 69 | 4H | 0.4 |
|  | Waveguide 1 first guiding surface 6 | 1H | 0.025 |
| 292 | Waveguide 1 second guiding surface 8 | 1H | 0.5 |
|  | Rear reflector protection layer surface 307 | 9H | 2.5 |

Under compressive force 718, parts of the display may be bent more than others, providing relative motion between optical components. Waveguide 1 may thus move in the direction 714 with respect to the adjacent components 68, 300 that may move relatively in different directions 716, 717. Such relative motion may thus provide shear forces between the adjacent surfaces, for example in regions 731, 733.

Figure 11A:
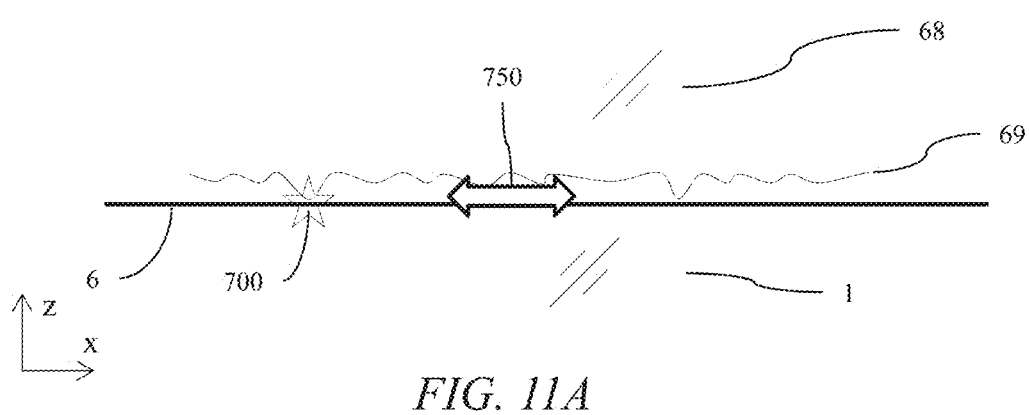
FIG. 11A and FIG. 11B are schematic diagrams illustrating a side view of mechanisms to provide damage to the guiding surfaces of a waveguide from shear forces that are provided under an external compressive force.
Figure 11B:
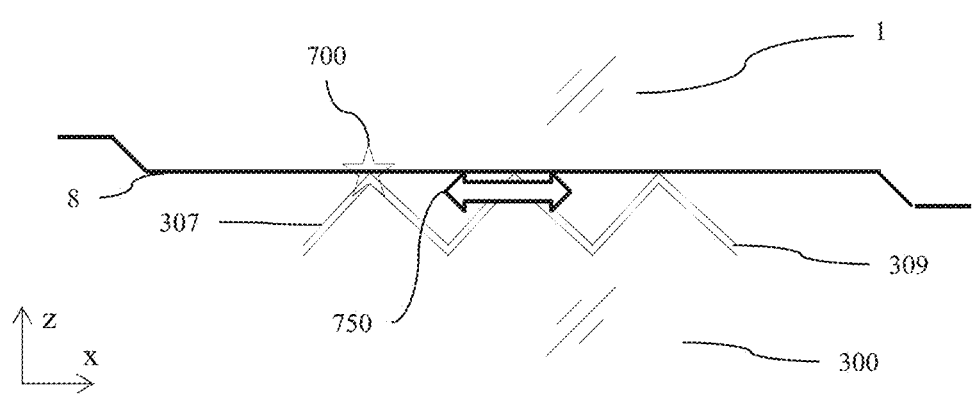

FIGS. 11A-11B are schematic diagrams illustrating a side view of mechanisms to provide damage to the guiding surfaces of a waveguide 1 from shear forces that are provided under an external compressive force 718.

As illustrated in TABLE 1, waveguide 1 surfaces 6, 8 may have a lower hardness and lower roughness than adjacent surfaces 69, 307, and under such shear forces may be more susceptible to damage than the adjacent surfaces; that is the imaging directional waveguide 1 may be subjected to grinding by the adjacent surfaces that also have high asperities 313, 315.

The material of the imaging directional waveguide 1 may be optimised for optical quality for guiding light with low loss and scatter. The material of the imaging directional waveguide 1 and/or the material of the diffuser 68 may have an undesirable friability such that particulate material may be released into the interface between the imaging directional waveguide 1 surface 6 and diffuser 68 surface 69 under an external compressive force 718. Such particulate material may undesirably contribute to grinding at the interface and degrade surface quality.

In the present disclosure, friability refers to the tendency of a solid substance to break into smaller pieces under duress or contact, especially by rubbing or compressive force. If a friable material, such as waveguide 1, is rubbed by a material of nominally higher hardness and surface roughness, such as rear reflector 300 or diffuser 68, the imaging directional waveguide 1 will tend to lose macroscopic particles from its bulk structure. Such damage 700 is shown in FIG. 12A.

Figure 12A:
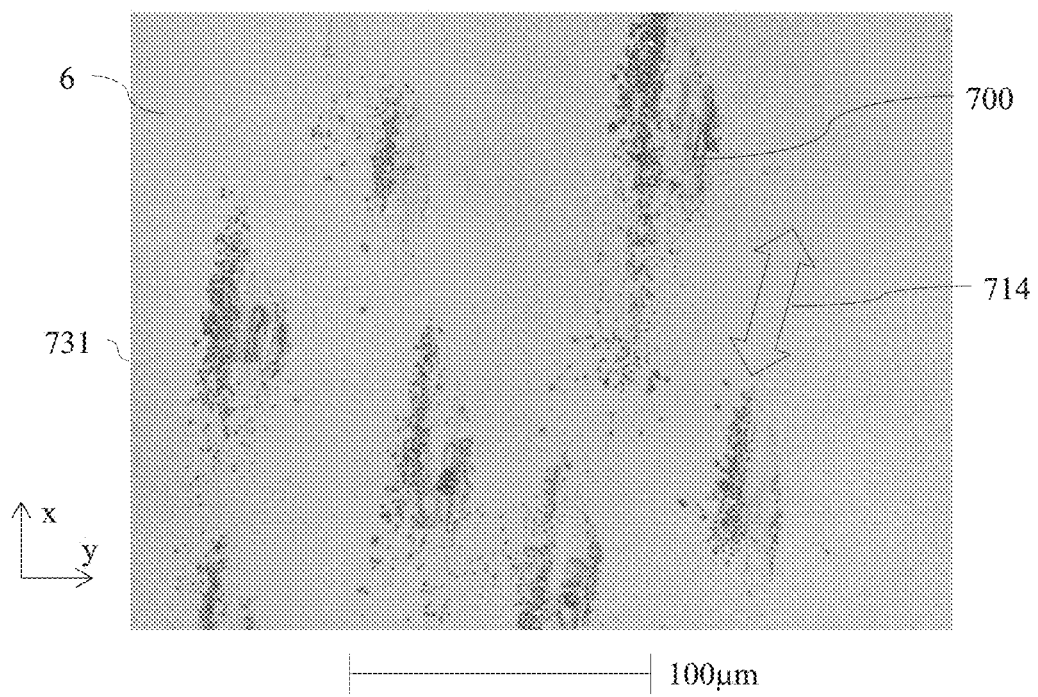
FIG. 12A is a photomicrograph illustrating damage to the first guiding surface of a directional waveguide following repeated external compressive force to an optical stack comprising the waveguide.

FIG. 12A is a photomicrograph illustrating damage to the first guiding surface 6 of a directional waveguide 1 in region 731 following repeated external compressive force to an optical stack 730 comprising the imaging directional waveguide 1, and diffuser layer 68 arranged adjacent to the first guiding surface 6 of the imaging directional waveguide 1.

Figure 12B:
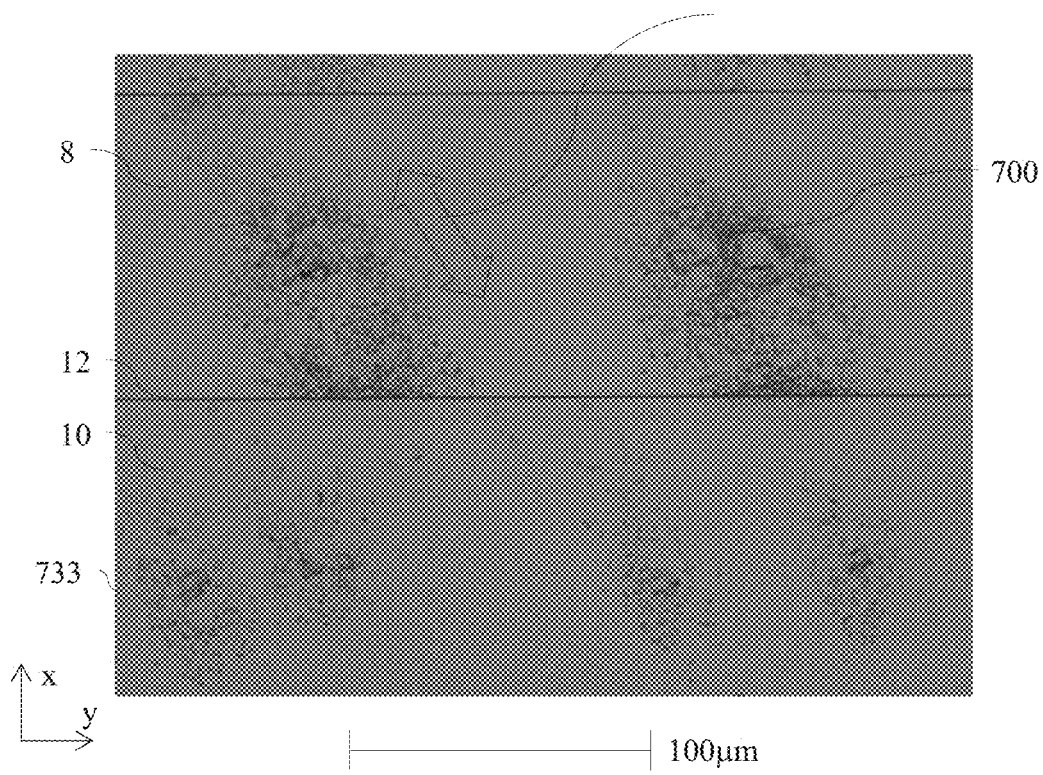
FIG. 12B is a photomicrograph illustrating damage to the second guiding surface of a directional waveguide following repeated external compressive force to an optical stack comprising the waveguide.

FIG. 12B is a photomicrograph illustrating damage to the second guiding surface of a directional waveguide following repeated external compressive force to an optical stack comprising the imaging directional waveguide 1, and a diffuser layer arranged adjacent to the second guiding surface 8 of the imaging directional waveguide 1.

Damage features 700 may be formed by friable materials of the imaging directional waveguide 1, (or diffuser 69 or rear reflector 300) breaking and creating particulates that are ground against the surface of the imaging directional waveguide 1 and further creating pits in the surfaces 6,8 of the waveguide.

Thus damage features 700 are provided on both surfaces of the imaging directional waveguide 1. The effect of damage features 700 on the optical performance will now be described.

Figure 13:
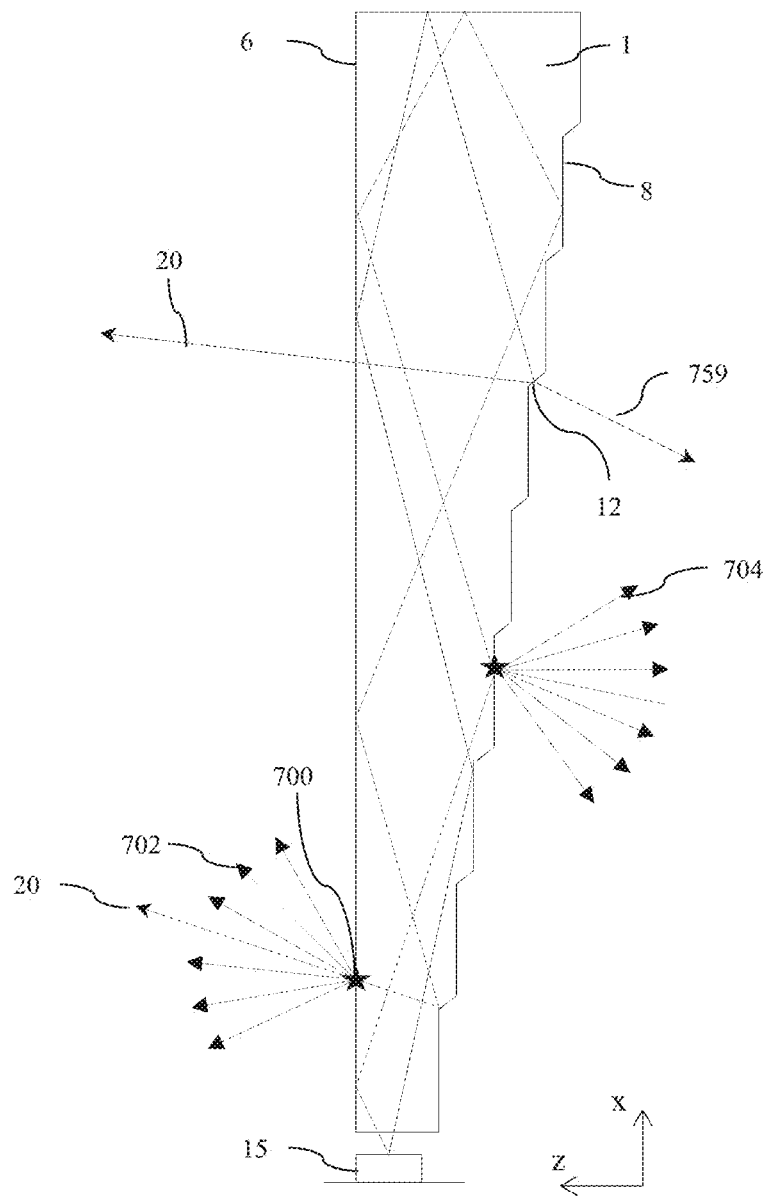
FIG. 13 is a schematic diagram illustrating a side view of light propagation in a waveguide with surface damage and resulting scattered light in one embodiment of the directional display device of FIG. 31A.

FIG. 13 is a schematic diagram illustrating a side view of light propagation in a waveguide 1 with surface damage features 700 and resulting scattered light 702, 704. By way of comparison it would be desirable that the light rays that are output from the waveguide are only by means of light rays 20 that are reflected at the light extraction features 12 or light rays 759 that are transmitted by the features 12.

The wetting of the surfaces 6, 8 of the imaging directional waveguide 1 by adjacent layers will now be described.

Figure 14:
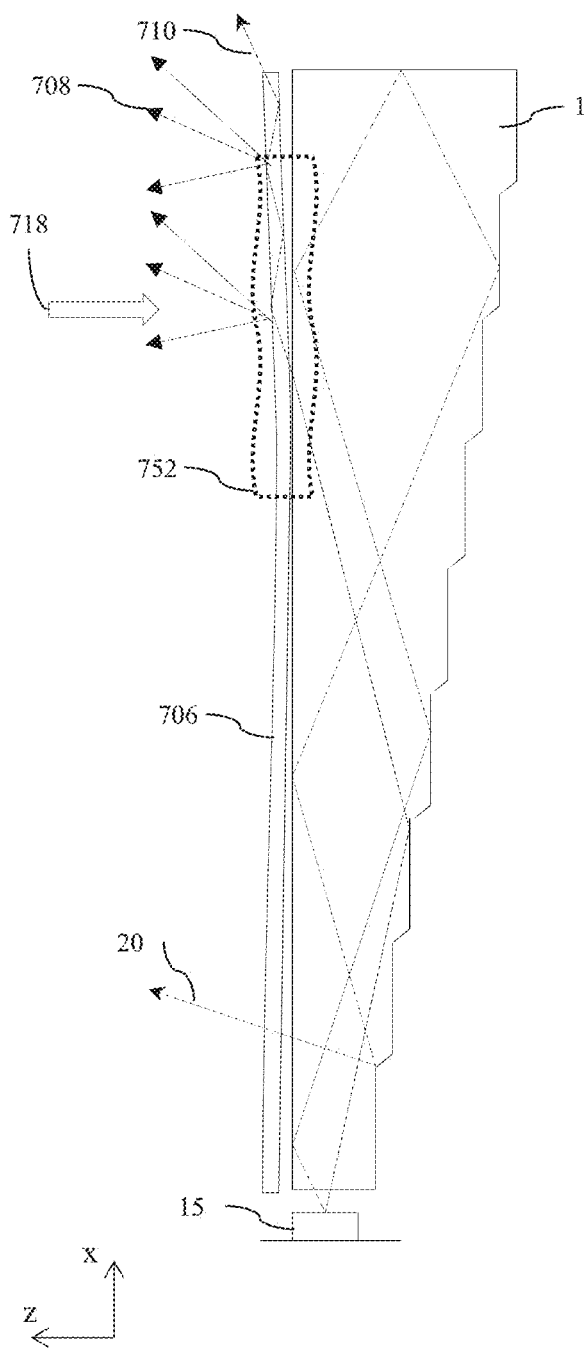
FIG. 14 is a schematic diagram illustrating a side view of light propagation with an optically contacting (wetting) film resulting in lost and scattered light in one embodiment of the directional display device of FIG. 31A.

FIG. 14 is a schematic diagram illustrating a side view of light propagation in a directional waveguide 1 with an optically contacting film 706 that provides wetting regions 752. Wetting regions 752 may have size and shape that are typically determined by a combination of external compressive forces 718, optical stack 730 structure, surface relief of layer 706 adjacent the imaging directional waveguide 1 and molecular forces between the materials of the film 706 and waveguide 1.

In operation, wetting in regions 752 enables guiding of light rays 710 into the film 706 and provides lost and scattered light rays 708. Undesirably, light rays may be lost from the waveguide, and image non-uniformities may be provided.

Surface properties at interfaces in an optical stack will now be described further. The present embodiments achieve reduced damage to optical components through a combination of surface properties for given locations within an optical stack, which will be described herein.

In the present disclosure coefficient of friction is a value that shows the relationship between the force of friction between two surfaces and the normal reaction between the surfaces. The coefficient of friction is shown by $F_f = \mu F_n$ where $F_f$ is the frictional force, $\mu$ is the coefficient of friction, and $F_n$ is the normal force. The coefficient of friction may be either the coefficient of static friction $\mu_s$ or the coefficient of kinetic friction $\mu_k$ where the coefficient of static friction is the friction force between two objects when neither of the objects is moving, for example when the surfaces wet when an external compressive force 718 is applied. The coefficient of kinetic friction $\mu_k$ is the force between two objects when the two surfaces are sliding against each other.

The static coefficient of friction of a surface may for example be characterised by means of measurement of the angle at which a reference puck with a reference surface starts to slide as the test surface is tilted to the angle, providing the coefficient of friction angle. Thus a 'slippery' surface with low static coefficient of friction will have a lower coefficient of friction angle than a 'sticky' surface.

Thus the frictional force for a given external compressive force may be increased or reduced by modification of the surface properties at a given interface.

In the present disclosure, the term wetting refers to optical wetting or optical contact between adjacent solid surfaces of an optical stack resulting from intermolecular interactions when the two are brought together, and does not refer to the presence of liquids in the optical stack.

However, the wettability of a surface may be characterised by measurement of the contact angle of a water drop on a given surface. A surface with a low water drop contact angle may be considered as having low surface energy, and may also exhibit high wetting, and may interact with other surface by means of van der Waals forces. Increasing the wetting of adjacent solid surfaces, may in other words increase the amount of van der Waals interactions, and thus increase the attachment force, increasing the coefficient of friction between the two surfaces when shear forces are applied.

Optical coupling occurs at interfaces to a waveguide at which wetting is present due to the proximity of the surfaces, resulting in the guiding properties being reduced or removed.

In the present disclosure, surface roughness is quantified by the deviations in the direction of the normal vector of a real surface from its ideal form and may be for example the arithmetic average roughness $R_a$ or the root mean squared roughness $R_{rms}$. Further roughness parameters may include ISO roughness grade, maximum height of profile $R_t$ and may further include slope and spacing parameters for example. Surface roughness may be also referred to as degree of asperity.

In the present disclosure, surface hardness is a measure of how resistant the optical components of the present disclosure are to various kinds of permanent shape change when a compressive force is applied.

Various testing methods may be used to characterise surface hardness. In common use is the pencil hardness test, also referred to as the Wolff-Wilborn test, uses the varying hardness values of graphite pencils to evaluate a coating's hardness. Pencils are pushed into the sample and the coating hardness is identified by the trace generated. There are two scales to grade the hardness of a pencil's graphite core. The first is a numerical scale; the higher the number the harder the marking core. As the core becomes softer in the lower numbers it leaves more graphite on the material and a darker mark. The second scale is the HB graphite scale; the "H" represents the hardness while the "B" indicates blackness.

In the present disclosure friability is a measure of the tendency of a solid substance to break into smaller pieces under duress or contact, especially by rubbing. The opposite of friable is indurate.

The structure and operation of FIG. 7 will now be described in further detail.

Figure 15A:
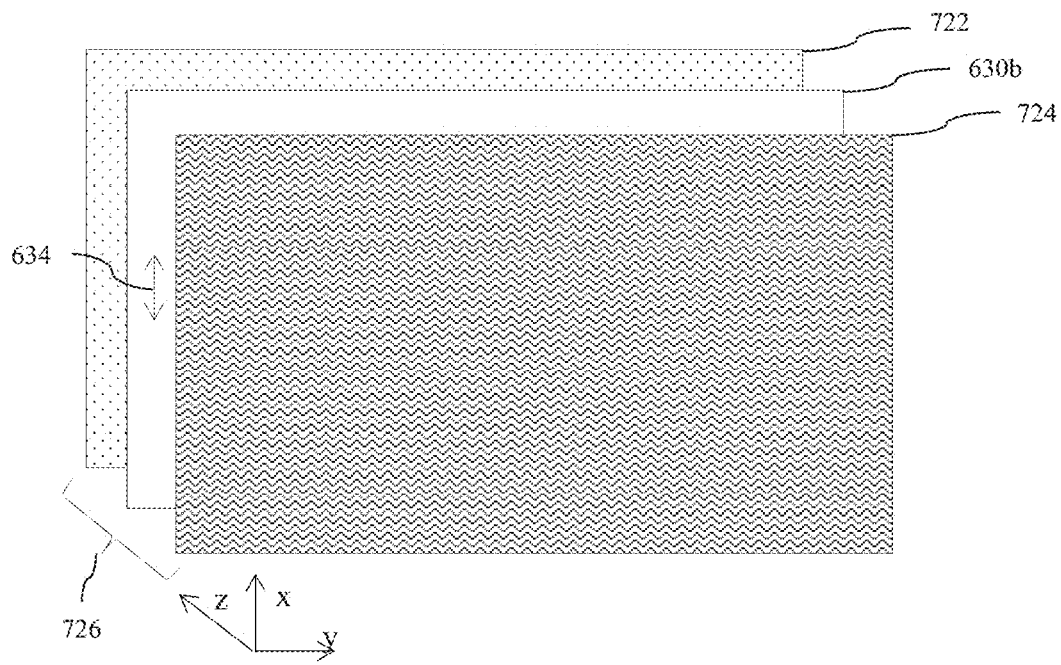
FIG. 15A is a schematic diagram illustrating in perspective front view a stack of optical components comprising an upper waveguide protection element of a directional display apparatus.
Figure 15B:
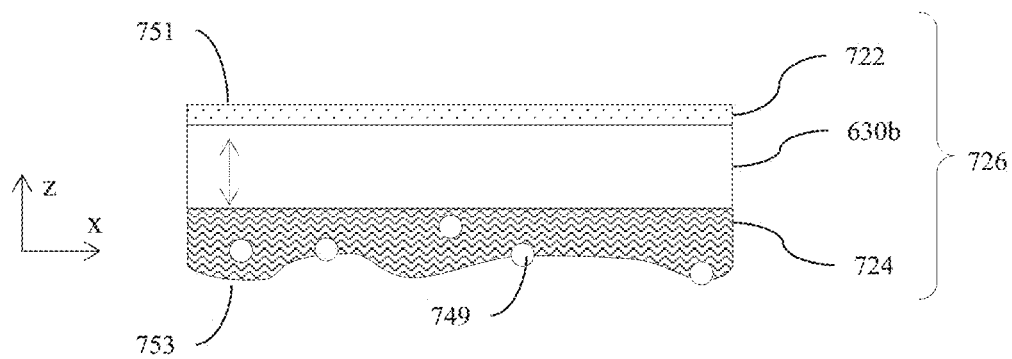
FIG. 15B is a schematic diagram illustrating in side view a stack of optical components comprising an upper waveguide protection element of a directional display apparatus.
Figure 16:
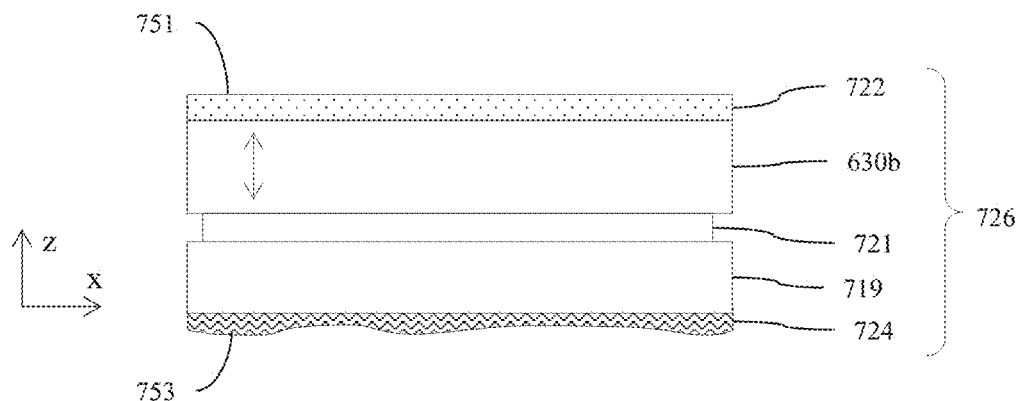
FIG. 16 is a schematic diagram illustrating in side view a further stack of optical components comprising an upper waveguide protection element of a directional display apparatus.

FIG. 15A is a schematic diagram illustrating in perspective front view a stack of optical components comprising an upper waveguide protection element 726 of a directional display apparatus; FIG. 15B is a schematic diagram illustrating in side view a stack of optical components comprising an upper waveguide protection element 726 of a directional display apparatus; and FIG. 16 is a schematic diagram illustrating in side view a further stack of optical components comprising an upper waveguide protection element 726 of a directional display apparatus. Waveguide protection element 728 may be formed in a similar manner to element 726.

At least one layer that may be a polariser, a retarder or a diffuser. As illustrated in FIG. 15B, retarder 630b may be a transparent quarter wave retarder formed in polycarbonate. Plural layers 726, 728 thus may include at least one layer that has an optical function such as retardation.

At least one optical component 726, 728 adjacent the imaging directional waveguide 1 is transparent to at least one operating wavelength of the light sources 15. The operating wavelengths may typically be visible light for display uses but could be also comprise other wavelengths such as infra-red or ultra-violet wavelengths for controlled illumination uses.

The retarder 630b may have first and second transparent acrylate layers 722, 724 formed on its surfaces, for example by means of UV casting. At least one of the optical components 724, 725 adjacent the imaging directional waveguide 1 may comprise a surface 753, 755 produced by embossing process for example UV casting or thermal embossing. One of said layers is a substrate 630b and one or both of the outer layers 722, 724 may be a coating applied to the substrate 630b.

As will be described further herein, the surfaces 751, 753 may be arranged with different surface relief, hardness and surface wettability to achieve reduced damage to waveguide 1 during application of an external compressive force 718. Thus said at least one of the optical components 726, 728 adjacent the imaging directional waveguide 1 may comprise plural layers 724, 630b, 722, the outer layers 722, 724 of which provide said differing surface properties.

A coating could be applied by spray, UV, thermal, or chemical casting, particle deposition, or other known means.

Figure 17:
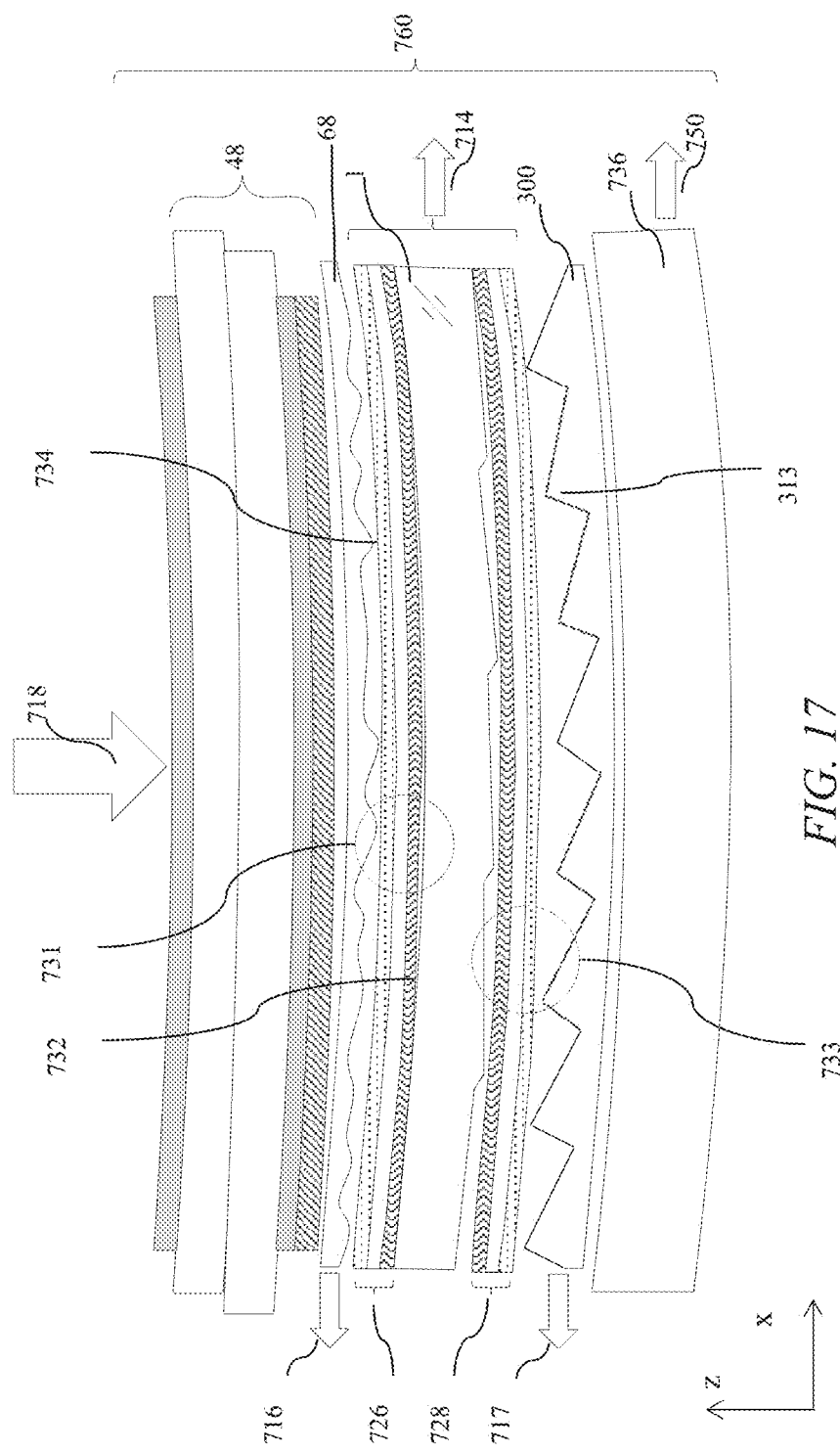
FIG. 17 is a schematic diagram illustrating in a side view the arrangement of FIG. 7 after application of a compressive force.

FIG. 17 is a schematic diagram illustrating in a side view the arrangement of FIG. 7 after application of a compressive force. As illustrated with respect to FIG. 9B, the external compressive force 718 may provide relative movement 714, 716 of the imaging directional waveguide 1 and adjacent optical components 726, 728.

Under external compressive force 718, bending of the optical stack 760 is provided, which achieves relative translation of the optical components of the optical stack 760. In the present embodiments optical components 726, 728 are arranged to translate as shown by relative translation 714 with waveguide 1, whereas the outer components such as diffuser 68 (which may be attached to spatial light modulator 48) and rear reflector 300 have relative translations 716, 717 respectively.

As will be described herein, such relative translations may advantageously achieve reduced damage to the imaging directional waveguide 1, increased lifetime, increased optical quality and reduced cost. The operation of the optical stack 760 when compressive force is applied and removed will now be described.

It would be desirable to reduce damage to the surface 6 of waveguide 1 arising from adjacent surfaces 69 without providing wetting regions 752 when the external compressive force 718 varied.

Figure 18:
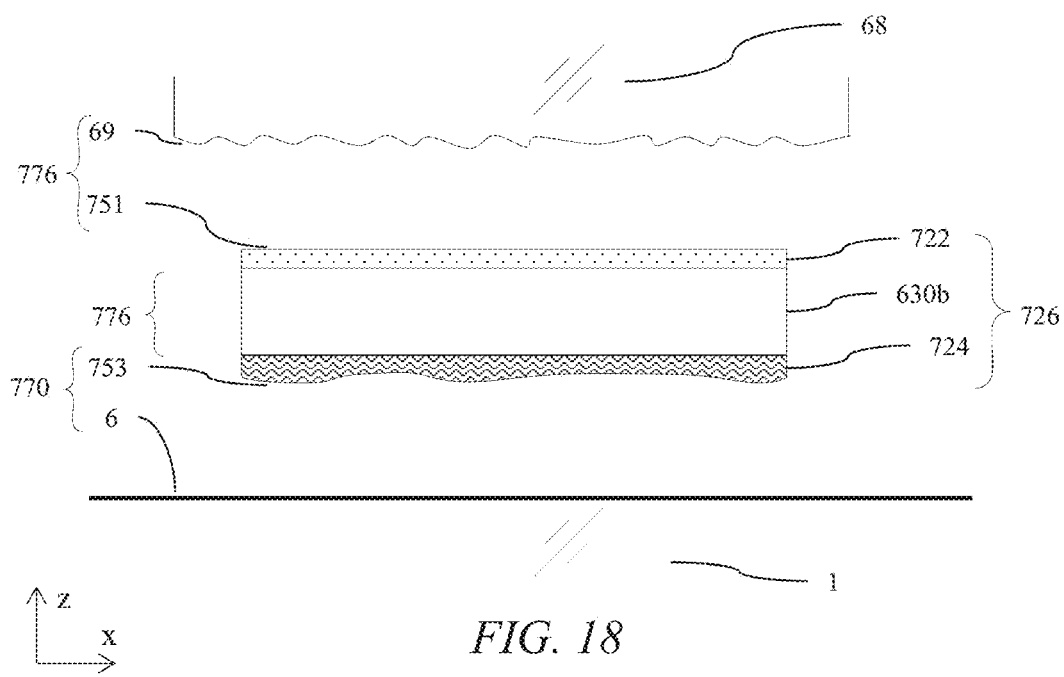
FIG. 18 is a schematic diagram illustrating in a side view the arrangement of an upper optical component with respect to a directional waveguide in a display without an external compressive force.
Figure 19:
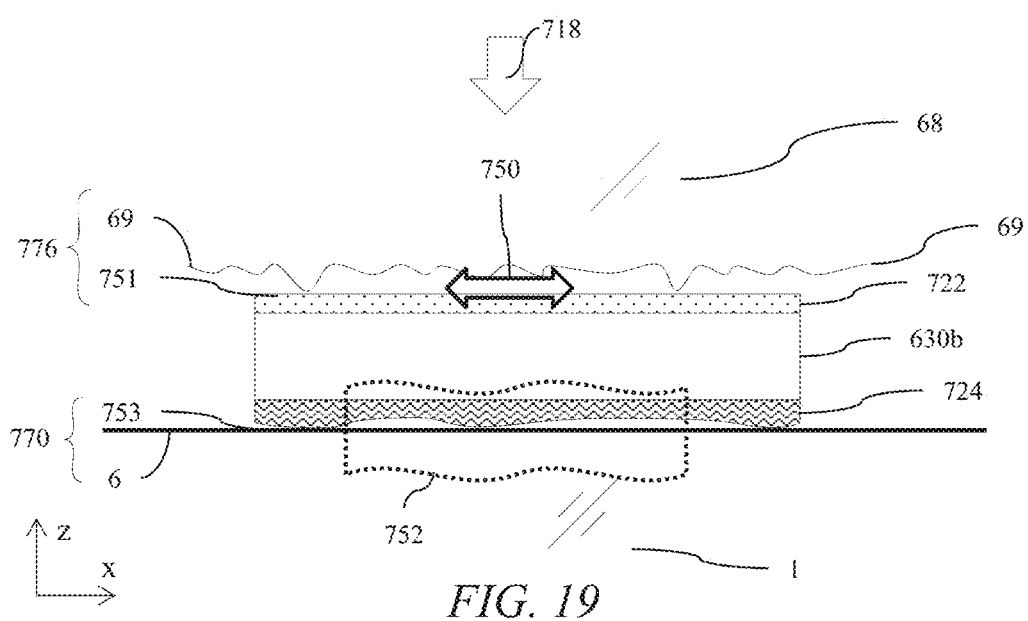
FIG. 19 is a schematic diagram illustrating in a side view the arrangement of an upper optical component with respect to a directional waveguide in a display with an external compressive force.

FIG. 18 is a schematic diagram illustrating in a side view the arrangement of an upper optical component 726 with respect to a directional waveguide 1 in a display without or with a small external compressive force 718; and FIG. 19 is a schematic diagram illustrating in a side view the arrangement of an upper optical component with respect to a directional waveguide in a display with an external compressive force.

The stack 760 may comprise optical component 726 outside the first guide surface 6 of the imaging directional waveguide 1 that includes: an optical component 726 adjacent the imaging directional waveguide 1 having differing surface properties that in the present embodiment are provided by the surfaces 751, 753 of layers 722, 724 arranged on opposite sides of retarder 630b.

FIG. 18 illustrates that when no external compressive force 718 is applied, then no optical coupling is achieved. Advantageously high image quality is provided with high uniformity and no undesirable loss of light.

FIG. 19 illustrates that when an external compressive force 718 is applied then the interface 770 at the surface 6 of the imaging directional waveguide 1 has wetting region 752 that provides high resistance to shear forces in comparison to the interface 776 of the optical component 726 at which relative surface translation 750 (or sliding) takes place.

In operation under repeated external compressive force 718, reduced or no relative translation takes place at interface 770 whereas the interface 776 is arranged to provide relative translation 750 of 751, 69. Thus grinding damage from friability of the materials of the imaging directional waveguide 1 or layer 724 can be reduced.

By way of comparison with the present embodiments, the optical component 726 may be replaced by an optical coat with low friability and high resistance to compressive and shear forces. Such coatings may be expensive and may degrade the surface quality of the waveguide, for example introducing scatter, or optically burying the light extraction features 12.

Advantageously, damage to the imaging directional waveguide 1 during repeated external force 718 can be reduced. Further, material selection for the waveguide can be optimised to provide maximum optical quality for light propagation in the waveguide. Further, lower cost known materials can be used for forming the imaging directional waveguide 1. Further cost is reduced and performance increased in comparison to optical coatings formed on the imaging directional waveguide 1 surface 6.

The structure and operation of the optical component 726 will now be described in further detail.

The optical component 726 adjacent the imaging directional waveguide 1 has a surface 753 at the waveguide interface 770 on one side thereof has a surface 69 that is shaped to prevent optical coupling between the imaging directional waveguide 1 and the optical component 726 adjacent the imaging directional waveguide 1 in the absence of an external compressive force 718 such that an air gap is provided between the imaging directional waveguide 1 and optical component 726. Such shaped sides may for example be provided by a surface relief structure provided on surface 753 of layer 724.

In the present disclosure, wetting refers to optical contact between adjacent solid surfaces 69, 531, resulting from intermolecular interactions when the two are brought together, and does not refer to the use of liquids at the respective interface 770. As illustrated in FIG. 14, such optical coupling undesirably provides light loss and non-uniformities in a directional waveguide.

Waveguide 1 may be formed of an optically transparent polymer such as PMMA that has polar molecules. Surface 6 of the imaging directional waveguide 1 may be substantially smooth to achieve minimal loss of light from light sources 15 propagating from input side 2 to reflective end 4 of the imaging directional waveguide 1.

Layer 724 of the optical component 726 may be formed for example from transparent polymer materials such as UV cured multi-functional acrylate blends, comprising polar molecules. Surface 753 of layer 724 is provided with a roughened surface.

Under compressive force 718 as illustrated in FIG. 19, layer 724 may be brought into physical contact with surface 6 of the imaging directional waveguide 1 by means of a compressive force 718. Intermolecular forces such as van der Waals forces between polar molecules in the imaging directional waveguide 1 and layer 724 may provide some surface wetting in region 752.

On removal of the compressive force 718, it is desirable that the interface 770 de-wets for viewing by an observer without optical coupling.

Surface roughness geometry is known to have a profound effect on the wetting and spreading process for wet regions 752 where bumps interact with the wetting contact line to retard contact line advancing during spread and drag the contact line during receding. When the compressive force 718 is reduced or removed as illustrated in FIG. 18, the interface 770 thus de-wets and optical coupling is removed.

By way of comparison, the layers 722 and 68 may be provided by layers that have low intermolecular wetting properties under an external compressive force. In an illustrative example, the layer 68 may be formed from a multi-functional acrylate that may be similar to the material of layer 724. Layer 722 may be provided by a material that exhibits low intermolecular forces to the material of layer 724.

Thus the coefficient of friction at the interface 770, that may be increased by means of interfacial wetting is higher than the coefficient of friction at the interface 776 at which reduced wetting may be present. The interfaces 770, 776 have different mechanical properties when an external compressive force 718 is applied. In particular, regions 752 provide the interface 770 with higher resistance to shear forces than the interface 776, enabling relative surface translation 750 at said interface 776. In other words, under an external compressive force 718, shear movement may be provided preferentially at interface 776 in comparison to the shear movement at interface 770.

The coefficient of friction may be a function of surface chemistry and profile and may be modified by various means. Examples of coefficient of friction modification techniques may include bulk material selection, corona treatment to electrically charge the surface, chemical slip additives to lubricate the surface, and surface profile manipulation designed to maintain separation of large areas of the adjoining surfaces. This latter technique often involves adding asperities of an advantageous density to a smooth surface to provide adequate separation from an adjacent smooth surface, thereby reducing the magnitude of the molecular forces that would otherwise wet the surfaces together. The degree of added asperities may be quantified by a measure of the roughness of the surface. Through selection of both bulk material and asperity inclusion, a surface may be designed with the property of wetting only under a compressive force. Such a surface will not wet to, and will release from contacting, a specified adjacent surface once a force in a direction to join the two surfaces is removed. To achieve this property, a material may be chosen to form the asperities that possesses a surface energy that is suitably matched to the adjacent surface.

The surface wettability may be partially described by water drop contact angle measurements. Typical measured water drop contact angles for materials of an optical stack are illustrated in TABLE 2.

TABLE 2

| Material | Water Drop Contact Angle/deg |
|---|---|
| Hard Coat Surface | 102 |
| COP Layer | 87 |
| PC Layer | 81 |
| PMMA Layer | 70 |
| Reflector Layer | 67 |
| Acrylate Diffuser Surface | 66 |
| TAC Layer | 61 |

A suitable match may typically be higher in surface energy than the adjacent surface to promote wetting, and may have a water drop contact angle of less than 90°. This material is then formed to create asperities on the surface to promote separation of large areas of the adjacent layers. The asperities must be adequately high, as measured against the surface, to separate the adjacent bulk surfaces. For example the asperities may have a height of more than approximately 0.4 µm to overcome attractive forces to the surface 6 of the imaging directional waveguide 1. Additionally, these asperities must be positionally pitched and shaped such that large contiguous regions of the layers may not make contact. This pitch and shape of asperities is a function of the chemical, such as surface energy, and physical, such as thickness and rigidity, properties of the layer, but may be typically on the order of 5 µm pitch and 1 µm radius peaks.

In the present disclosure, coefficient of friction refers to the ratio between the force necessary to move one layer horizontally over another and the pressure between the two layers. Furthermore, coefficient of friction tends to correlate to surface energy such that higher coefficient of friction and higher surface energy typically result in increased adhesion or wetting. Thus, for example, a large coefficient of friction between surfaces 6, 753 and 8, 755 will act to wet any two adjacent surfaces while an external compressive force 718 is applied. While wetted, the imaging directional waveguide 1 and waveguide protection elements 726, 728 may mechanically join and may move together in unison as a single component. In contrast, a small coefficient of friction between surfaces 69, 751 and 307, 757 will act to maintain mechanical isolation between any two adjacent surfaces and will maintain this isolation while an external compressive force 718 is applied. While mechanically isolated, the waveguide protection elements 726, 728 may be free move with respect to the adjacent components 48, 300.

Thus at least one of the optical components 726, 728 adjacent the imaging directional waveguide 1 may have differing surface properties configured to provide a coefficient of friction at the waveguide interface 770, 772 on one side thereof that is greater than the coefficient of friction at the outer interface 776, 774 on the other side thereof.

Some residual shear movement of the interface 770 may be present. The material of the layer 724 may be provided with a similar hardness to the material of the imaging directional waveguide 1. The materials may further have similar friabilities and no preferential damage to one of other surface 6, 69 may be provided. Advantageously damage due to particulate grinding may be reduced.

The interface 776 may be arranged to be resistant to relatively high compressive and shear forces. The hardness of the layers 68, 722 may be arranged to be similar to reduce relative surface damage. Further, the interface 776 for the surfaces 69, 751 may be arranged to have a low coefficient of friction in comparison to the coefficient of friction of the interface 770. Thus the interface 776 may be more slippery than the interface 770 under the external compressive force.

Damage to the surfaces 69, 751 may change the diffusion properties of the light rays 20 from the waveguide. Advantageously changes are small in comparison to the visual appearance of damage to the waveguide in which guided light is lost.

It would be desirable to minimise damage to the lower surface 8 of the imaging directional waveguide 1 from the rear reflector 300, as illustrated in FIG. 11B.

The operation of optical component 728 at the lower waveguide inner interface 772 and outer interface 774 will now be described.

Figure 20:
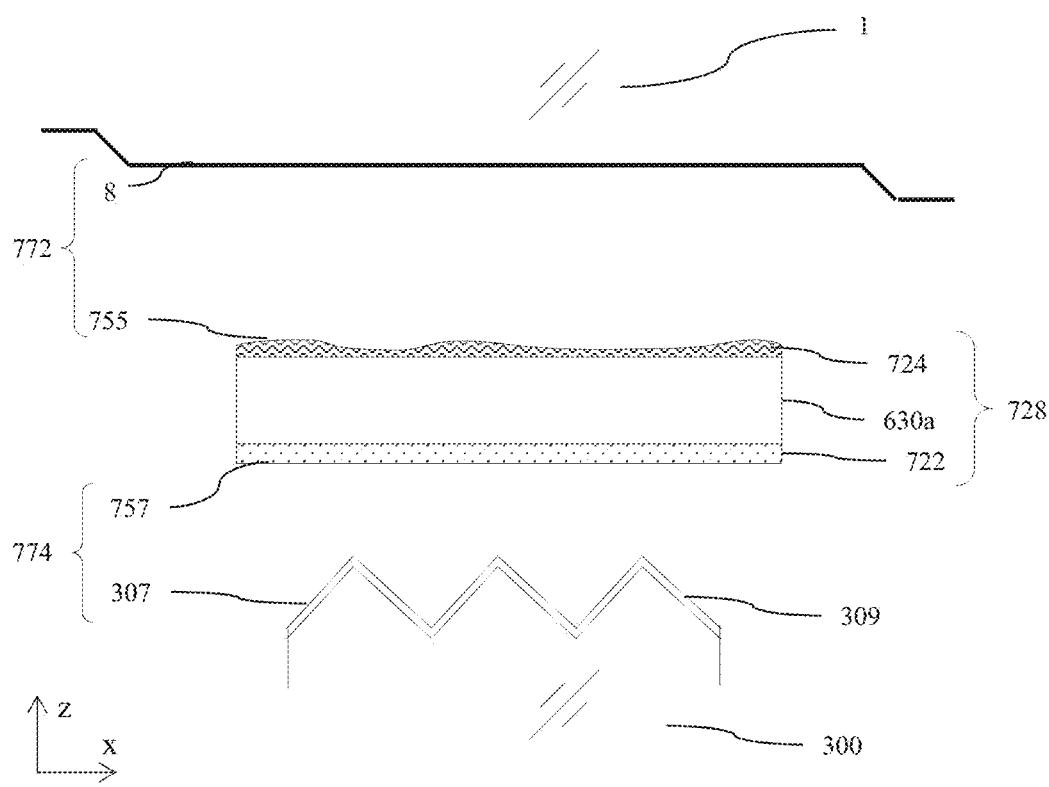
FIG. 20 is a schematic diagram illustrating in a side view the arrangement of a lower optical component with respect to a directional waveguide in a display without an external compressive force.
Figure 21:
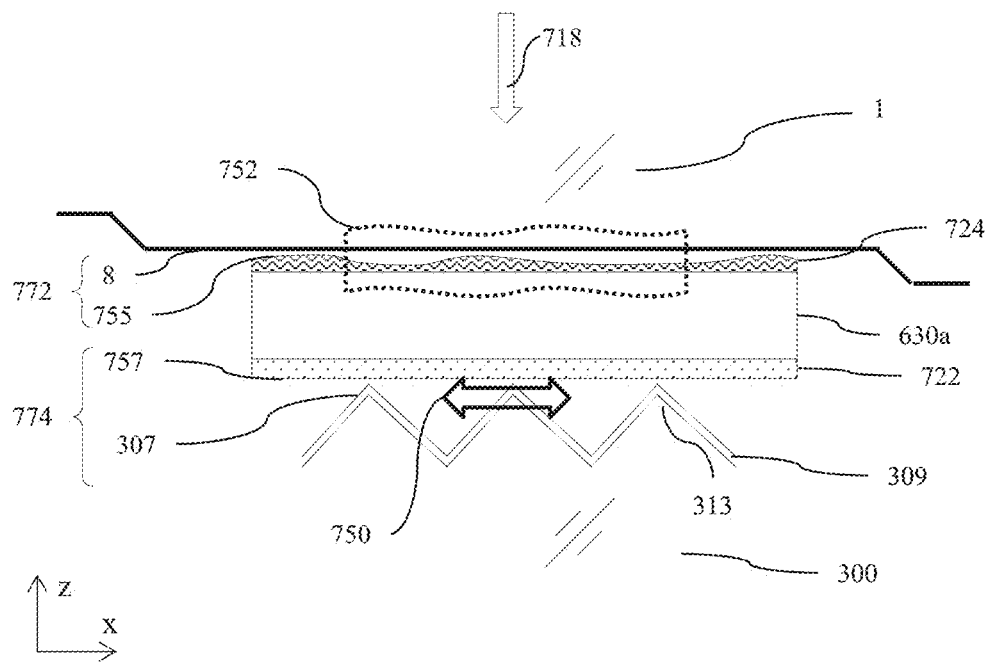
FIG. 21 is a schematic diagram illustrating in a side view the arrangement of a lower optical component with respect to a directional waveguide in a display with an external compressive force.

FIG. 20 is a schematic diagram illustrating in a side view the arrangement of a lower optical component 728 with respect to a directional waveguide 1 in a display without an external compressive force 718; and FIG. 21 is a schematic diagram illustrating in a side view the arrangement of a lower optical component 728 with respect to a directional waveguide 1 in a display with an external compressive force 718.

Advantageously the optical quality of the stack 760 is maintained while damage of waveguide 1 surface 8 may be reduced. Further a separation may be introduced between the imaging directional waveguide 1 and the rear reflector 300 to advantageously reduce the contrast of Moiré between the two surfaces.

The optical stack of FIG. 17 may further comprise a support component 736. It may be desirable to further reduce damage to the imaging directional waveguide 1 by providing control of lateral translation 750 of the support component 736 to the rear reflector 300 under an external compressive force 718.

In other words, layers are provided that achieve reduced damage to the imaging directional waveguide 1 by enabling small relative translation at inner interfaces 770, 772 and high relative translation at outer interfaces 776, 774.

Figure 22:
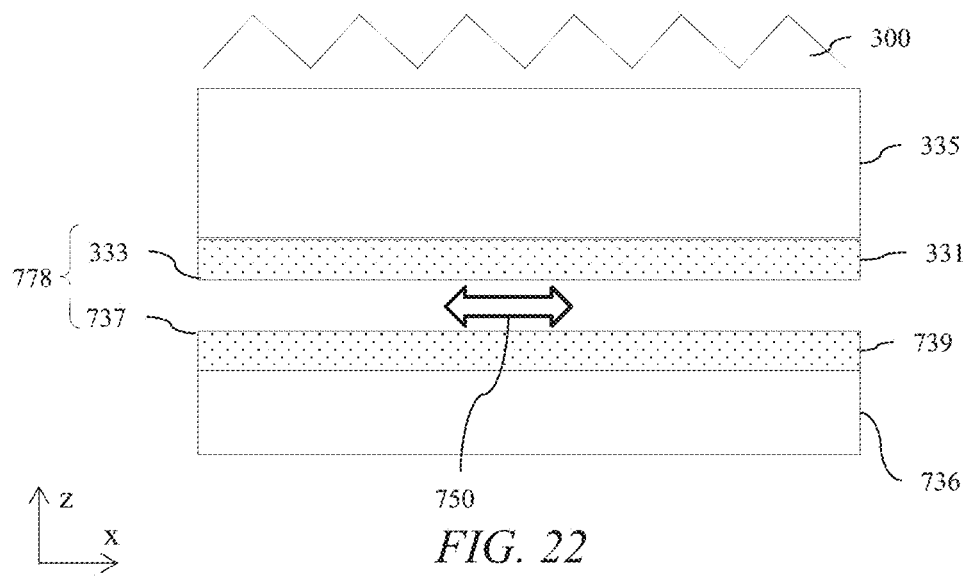
FIG. 22 is a schematic diagram illustrating in a side view the arrangement of a rear reflector with respect to a support component in a display with an external compressive force, further comprising layers with low coefficient of friction.

FIG. 22 is a schematic diagram illustrating in a side view the arrangement of a rear reflector 300 with a low friction interface 778 to a support component 736 in a display with an external compressive force 718 (not shown).

In operation under an external compressive force 718 and resultant shear forces, the rear reflector 300 may translate with respect to the support component 736. At least one of layers 331, 739 may be provided on the rear reflector 300 and/or support component 739 to reduce the coefficient of friction of the interface 778. The layers 331, 739 may for example comprise PTFE layers or other low friction materials.

Additionally the support component 756 may be coated with a low friction coating 739 in addition to or in lieu of low friction coating 331. Since these low friction coatings 331, 739 are outside of the optical stack 760, they may be comprised of non-optically clear materials.

Advantageously shear forces that arise from external compressive force 718 may provide translation of interface 778, and achieve reduced translation of interfaces 770, 772. Further reduced translation may be achieved at interfaces 776, 774 such that the grinding forces at each of the optical interfaces are minimised.

It may be alternatively desirable to provide locking of the rear reflector to the support substrate under an external compressive force 718.

Figure 23:
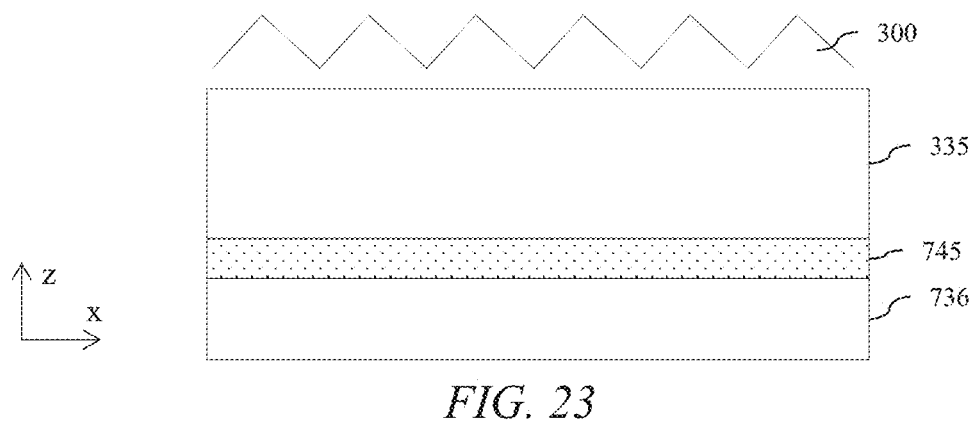
FIG. 23 is a schematic diagram illustrating in a side view the arrangement of a rear reflector adhered to a support component.

FIG. 23 is a schematic diagram illustrating in a side view the arrangement of a rear reflector adhered to a support component. By way of comparison to FIG. 22 it may be desirable to provide interface 778 that is relieved when no compressive force 718 is applied and to provide locking of the rear reflector during an external compressive force.

Adhesive layer 745 may be used to bond the rear reflector 300 to the support substrate 736. Advantageously translation may be localised to the interface 774 at which hard and low friction materials may be conveniently provided, minimising system damage and reducing cost.

Figure 24:
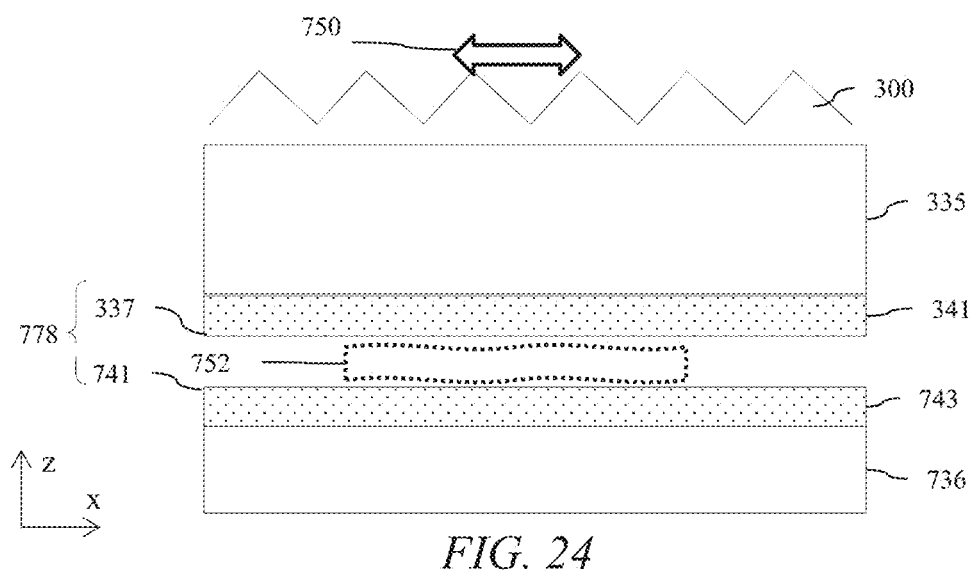
FIG. 24 is a schematic diagram illustrating in a side view the arrangement of a rear reflector with respect to a support component in a display with an external compressive force, further comprising layers with a high coefficient of friction.

FIG. 24 is a schematic diagram illustrating in a side view the arrangement of a rear reflector 300 with respect to a support component 736 in a display with an external compressive force 718, further comprising layers 341, 743 with a high coefficient of friction at interface 778 between surfaces 337, 741.

By way of comparison to FIG. 23, under normal display operation the rear reflector 300 may 'float' and have a flatness that is not distorted by irregularities in the support substrate, advantageously achieving improved optical quality.

Under a compressive force, the rear reflector 300 may be 'locked' to the support substrate 736. Advantageously translation may be localised to the interface 774 at which hard and low friction materials may be conveniently provided, minimising system damage and reducing cost.

An illustrative example of the surface properties of an optical stack of the present embodiments for the arrangement of FIG. 7 is shown in TABLE 3.

TABLE 3

| Interface | Surface | Example material | Example RMS roughness $R_{rms}$/μm | Example water drop contact angle/deg | Example pencil hardness | Example coefficient of friction angle/deg |
|---|---|---|---|---|---|---|
| 776 | Diffuser 68 lower surface 69 | Acrylate | 0.4 | 66 | 4H | <25 |
|  | Optical component 726 upper surface 751 | Acrylate | 0.04 | 102 | 4H |  |

TABLE 3-continued

| Interface | Surface | Example material | Example RMS roughness $R_{rms}$/μm | Example water drop contact angle/deg | Example pencil hardness | Example coefficient of friction angle/deg |
|---|---|---|---|---|---|---|
| 770 | Optical component 726 lower surface 753 | Acrylate | 0.05 | 66 | 2H | >25 |
|  | Waveguide, 1 upper surface 6 | PMMA | 0.025 | 70 | 1H |  |
| 772 | Waveguide, 1 lower surface 8 | PMMA | 0.5 | 70 | 1H | >25 |
|  | Optical component 728 upper surface 755 | Acrylate | 0.05 | 66 | 1H |  |
| 774 | Optical component 728 lower surface 757 | Acrylate | 0.04 | 102 | 9H | <25 |
|  | Rear reflector 300 upper surface 307 | SiOx | 2.5 | 80 | 9H |  |
| 778 | Rear reflector 300 lower surface 307 | PET | 2.5 | 80 | 1H | <25 |
|  | Support component 736 upper layer 739 surface 737 | PTFE | 0.1 | 100 | B |  |

Thus interfaces 770, 772 have similar water drop contact angles, providing wetting under a compressive force 718, and thus reducing movement of the surfaces. By way of comparison the interfaces 776, 774 are provided with different water drop contact angles, reducing the tendency of the two surfaces to wet against each other.

Further high surface translation 750 at interfaces 776, 774 is provided while wetting regions 752 may be provided at interfaces 770, 772. Shear forces are thus reduced at interfaces 770, 772 in comparison to interfaces 776, 774. Advantageously damage to waveguide 1 surfaces may be reduced.

Desirably movement at the interfaces 770, 772 is less than movement at other interfaces in the optical stack 760. However there may remain some small movement at interfaces 770, 772. It would be desirable to minimise damage to the surfaces 6, 8 and 753, 755 when such movement is provided when the surfaces are in contact.

Further the pencil hardness of the interfaces 776, 774 is substantially higher than the pencil hardnesses at the interfaces 770, 772, such that the surfaces are resistant to shear and compressive forces. Advantageously the tendency to damage of the surfaces is substantially reduced under compressive force 718.

Further the surface roughness of the surfaces 751, 757 is substantially lower than the surface roughness of the adjacent surfaces 69, 300. Thus the surfaces 751, 757 may be arranged to slide across diffuser surfaces 69, 300 that have high asperities. Each optical component 726, 728 adjacent the imaging directional waveguide 1 may have a surface 753, 755 at the waveguide interface 770, 772 on one side thereof with an RMS roughness of at least 0.05 μm.

In one illustrative embodiment of the present disclosure a waveguide 1 formed with PMMA may be provided with a surface 6 pencil hardness of 1H and an acrylate diffuser surface 753 of pencil hardness 2H, that is one pencil hardness level difference. Each optical component 726, 728 adjacent the imaging directional waveguide 1 may have a surface 753, 755 at the waveguide interface 770, 772 having a surface hardness of not more than two pencil hardness levels different from the pencil hardness of the imaging directional waveguide 1 surface 6,8, preferably not more than one pencil hardness level different from the pencil hardness of the waveguide surface 6,8 and most preferably the same pencil hardness level as the pencil hardness level of the respective waveguide 1 surface 6,8.

Advantageously the pencil hardness of the surfaces 6,8 waveguide 1 and surfaces 753, 755 of adjacent optical components may be substantially matched, and susceptibility to damage for residual movement at the interface under external compressive force 718 due to hardness differences may be reduced.

In another embodiment, the friability of the material of the imaging directional waveguide 1 at surfaces 6, 8 and the friability of the material of the layers 724, 725 for surfaces 753, 755 respectively may be provided to be similar. The threshold shear force against a reference surface at which the surface breaks into smaller pieces may be similar for the imaging directional waveguide 1 and adjacent optical components 726, 728. The threshold shear force at which the surfaces 6, 8 of the imaging directional waveguide 1 breaks may be greater than the threshold shear forces at which the surfaces 753, 755 break. Thus each optical component 726, 728 adjacent the imaging directional waveguide 1 may have surfaces with a friability that is greater than the friability of the surfaces of the waveguide.

Advantageously the tendency for breakage into smaller pieces of the surfaces at the interfaces 770, 772 may be reduced under shear forces arising from external compressive force 718.

In comparison to the arrangement of FIGS. 11A-11B, relative movement and thus shear forces at the upper and lower inner waveguide interfaces 770, 772 is substantially reduced. Advantageously damage to the surfaces 6, 8 of the imaging directional waveguide 1 may be reduced, increasing optical quality, extending display lifetime and increasing display ruggedness.

It may be desirable to increase the tendency to wet to the surface of the imaging directional waveguide 1 by the optical components 726, 728 to further reduce damage to the surfaces.

The surface properties of at least one of the optical components 726, 728 at the waveguide interface 770, 772 may be provided by the addition of asperity particles to the respective coating layer 724, 725 respectively.

It may be desirable to increase the tendency of the imaging directional waveguide 1 surfaces 6, 8 to wet to adjacent surfaces 753, 755.

Thus the surface properties of at least one of the optical components 726, 728 at the waveguide interface 770, 772 may be provided by the addition of asperity particles 749 to the bulk of the layer 724 as shown for example in FIG. 15B. Thus the surface properties of, at least one of the optical components 726, 728 adjacent the imaging directional waveguide 1, on one side are provided by the addition of asperity particles arranged in a surface coating layer 724, 725 of the optical components 726, 728 respectively.

The asperity particles 749 may provide increased surface area for wetting. Further the asperity particles 749 may be provided by materials with increased surface wetting tendency than the material of the layer 724. For example, the particles 749 may provide increased van der Waals coupling to the surface 1 of the waveguide under an external compressive force 718.

It may desirable to increase the tendency of the outer surfaces to slide with respect to each other under an external compressive force 718.

The outer layer of the optical component 726, 728 at the outer interfaces 776, 774 may comprise a low friction additive or may comprise a coating such as a fluorinated material such as polytetrafluoroethylene (PTFE). Alternatively or additionally at least one of the optical components adjacent the waveguide may have at least one surface that is treated or processed to provide said differing surface properties. The treatment may be by chemical, plasma, flame or corona means. At least one of the optical components adjacent the waveguide has a surface at the waveguide interface on one side thereof that is chemically treated to increase its roughness (or degree of asperity).

It would be desirable to provide an optical stack for a directional backlight with reduced thickness and increased luminance. During operation, light rays 759 as illustrated in FIG. 13 from light source 15 that are transmitted through facet 12 may exit with grazing incidence onto the optical component 728 in FIG. 7. Such light rays may be reflected by Fresnel reflections and are lost at high angles rather than being reflected by the rear reflector 300. Such light loss may be 20% or greater of head on illumination. It would be desirable to reduce this loss by removing the optical component 728.

Further it would be desirable to reduce the thickness of the optical stack 760.

Figure 25:
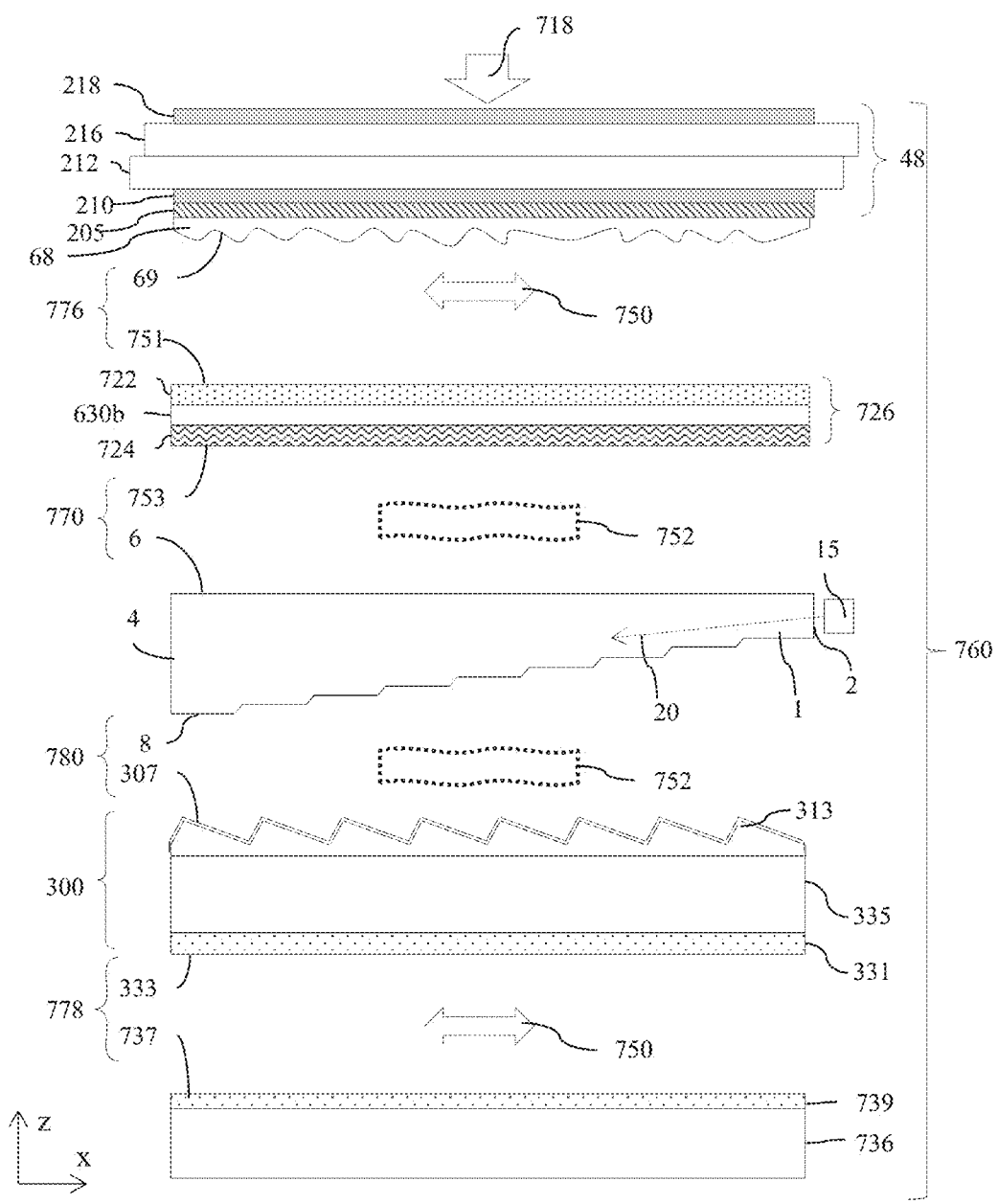
FIG. 25 is a schematic diagram illustrating a side view of a directional display apparatus optical stack comprising a directional waveguide, wherein no optical component is arranged between the waveguide and rear reflector.

FIG. 25 is a schematic diagram illustrating a side view of a directional display apparatus optical stack comprising a directional waveguide, wherein no optical component is arranged between the imaging directional waveguide 1 and rear reflector 300 such that the rear reflector surface 307 may be in contact with the imaging directional waveguide 1 at interface 780 under an external compressive force 718.

Figure 26:
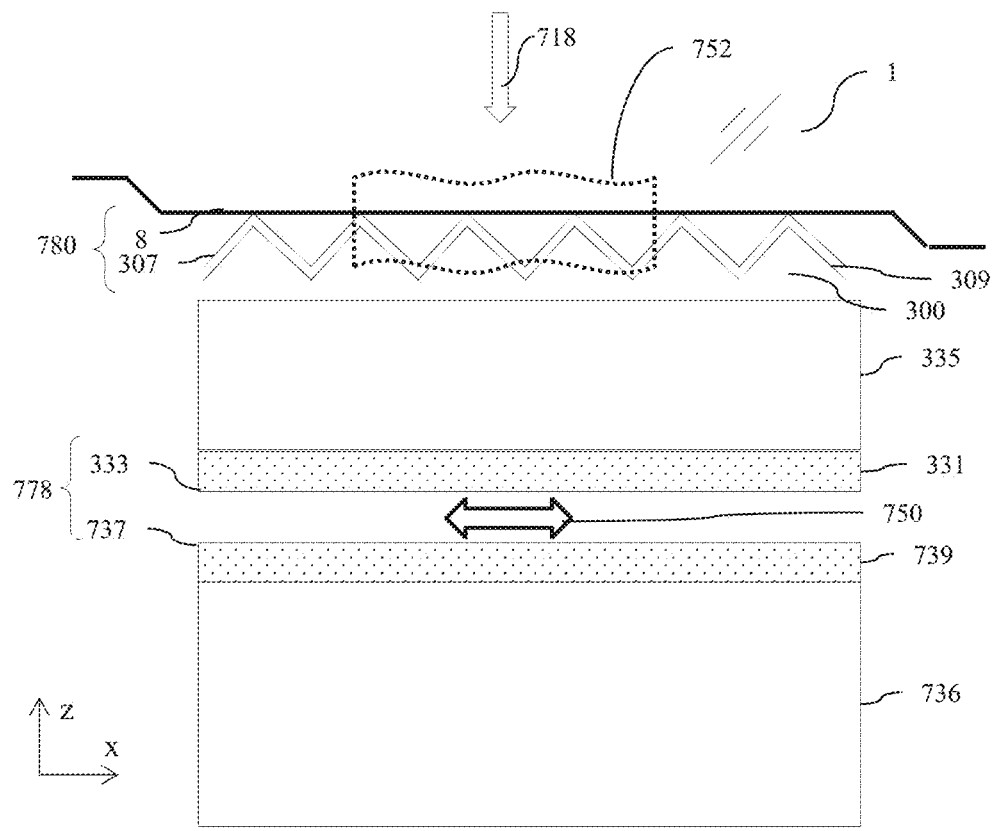
FIG. 26 is a schematic diagram illustrating in a side view the arrangement of a rear reflector with respect to a directional waveguide in a display with an external compressive force.
Figure 27:
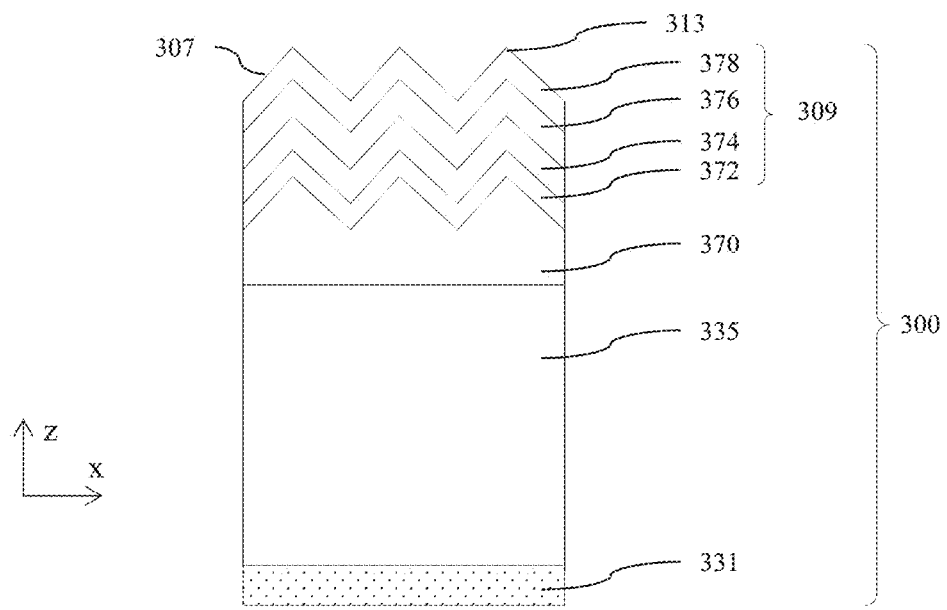
FIG. 27 is a schematic diagram illustrating in a side view a coating stack for a rear reflector.

FIG. 26 is a schematic diagram illustrating in a side view the arrangement of a rear reflector 300 with respect to a directional waveguide 1 in a display with an external compressive force; and FIG. 27 is a schematic diagram illustrating in a side view a coating stack for a rear reflector.

The stack 760 may comprise components 726, 728 outside the second guide surface 8 of the imaging directional waveguide 1 that include: a rear reflector 300 adjacent the imaging directional waveguide 1 and comprising an array of reflective facets 302 arranged to reflect light rays 759 (as illustrated in FIG. 13) that is transmitted through the second guide surface 8 back through the imaging directional waveguide 1 to exit through the first guide surface 6, the rear reflector 300 having said differing surface properties; and a support component 736 outside and adjacent the rear reflector 300, wherein the coefficient of friction at the imaging directional waveguide 1 interface 780 between the imaging directional waveguide 1 and the rear reflector 300 is greater than the coefficient of friction at the outer interface 778 between the rear reflector 300 and the support component 736.

Rear reflector 300 may comprise for example substrate 335, an acrylate microstructure 370 that may be formed by roll UV casting, optionally a metallisation protection layer 372 such as an inorganic material such as SiOx, a metal layer 374 such as aluminium that may be provided by evaporation or sputtering, a further metallisation protection layer 376 such as an inorganic material such as SiOx, and an overcoat layer 378 that may be arranged to have a surface 307 that provides wetting, or high frictional coefficient at interface 780 to waveguide 1 under external compressive force 718. Further the layer 378 may have a hardness that is matched to the hardness of the imaging directional waveguide 1 to minimise damage to the imaging directional waveguide 1 under shear forces arising from compressive force 718.

Shear forces are thus relieved by translation 750 at interface 778 which has a low coefficient of friction between surfaces 333 and 737.

An illustrative example of the surface properties of an optical stack of the present embodiments for the arrangement of FIG. 25 is shown in TABLE 4.

TABLE 4

| Interface | Surface | Example material | Example RMS roughness/μm | Example water drop contact angle/deg | Example pencil hardness |
|---|---|---|---|---|---|
| 776 | Diffuser 68 lower surface 69 | Acrylate | 0.4 | 66 | 4H |
|  | Optical component 726 upper surface 753 | Acrylate | 0.05 | 102 | 4H |
| 770 | Optical component 726 lower surface 753 | Acrylate | 0.05 | 66 | 1H |
|  | Waveguide, 1 upper surface 6 | PMMA | 0.025 | 70 | 1H |
| 780 | Waveguide, 1 lower surface 8 | PMMA | 0.5 | 70 | 1H |
|  | Rear reflector 300 upper surface 307 | Acrylate | 2.5 | 66 | 1H |
| 778 | Rear reflector 300 lower surface 333 | PET | 0.1 | 65 | 1H |
|  | Support component 739 surface 737 | PTFE | 0.1 | 100 | 1H |

Thus in comparison to the arrangement of FIGS. 11A-11B, relative movement and thus shear forces at the upper and lower inner waveguide interfaces 770, 772 is substantially reduced. Advantageously damage to the surfaces 6, 8 of the imaging directional waveguide 1 may be reduced, increasing optical quality, extending display lifetime and increasing display ruggedness. Further display luminance is increased and thickness reduced in comparison to the embodiment of FIG. 7.

Figure 28:
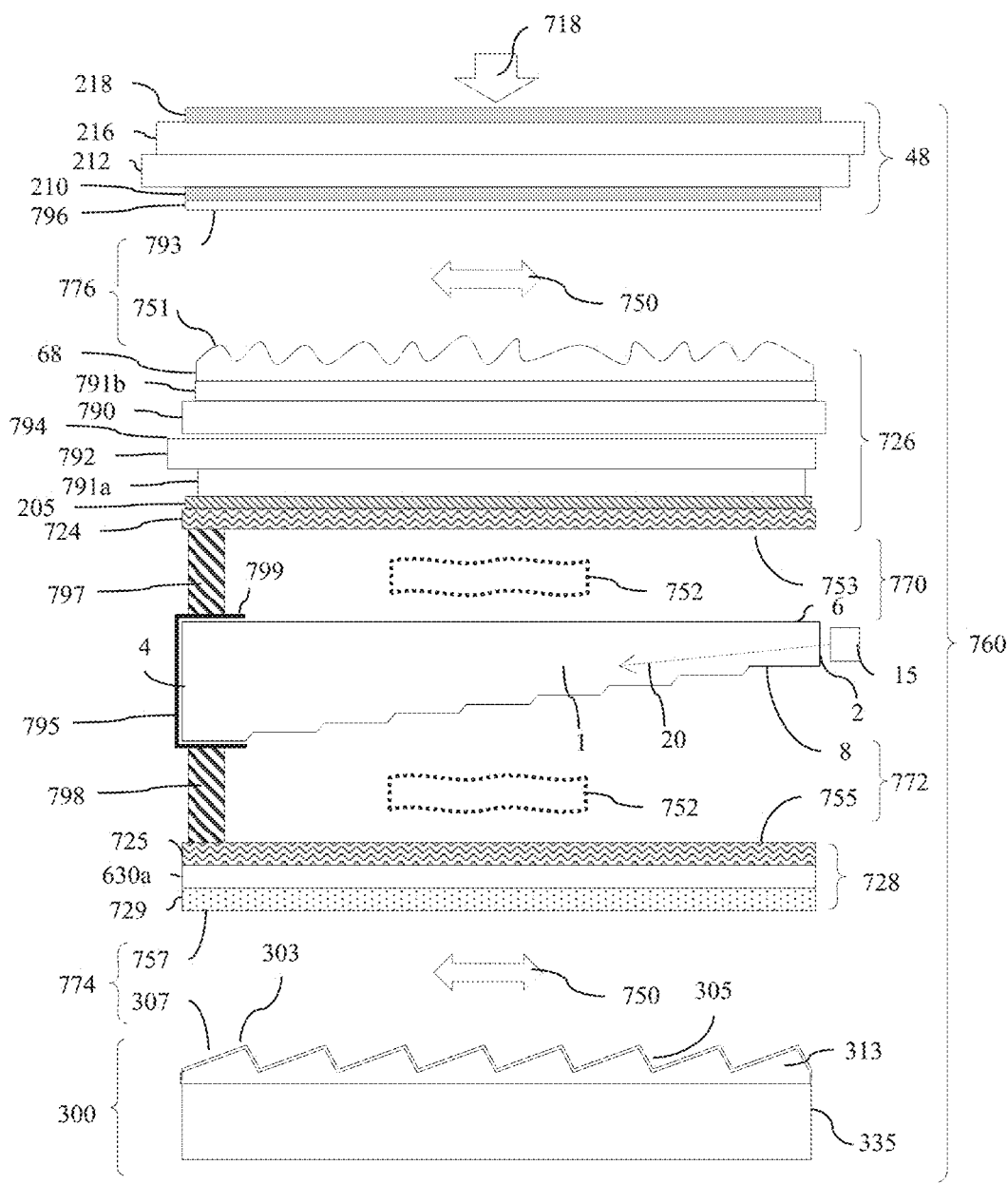
FIG. 28 is a schematic diagram illustrating a side view of a directional display apparatus optical stack comprising a directional waveguide, wherein the optical component that is arranged between the waveguide and spatial light modulator comprises a switchable liquid crystal layer.

FIG. 28 is a schematic diagram illustrating a side view of a directional display apparatus optical stack 760 comprising a directional waveguide 1, wherein the optical component 726 that is arranged between the imaging directional waveguide 1 and spatial light modulator 48 comprises a switchable liquid crystal layer 794 as described in International Appl. No. PCT/US18/31206 filed in the U.S. receiving office May 4, 2018 and incorporated by reference herein in its entirety. Thus one of the optical components 726, 728 comprises a switchable optical retarder that is liquid crystal layer 794.

Optical component 726 thus comprises layer 724 with surface 753 properties arranged to provide (i) high coefficient of friction under an applied compressive load 718 that may be by means of wetting, or optical contact, of surfaces 6, 753 (ii) release from the surface 6 of the imaging directional waveguide 1 when the compressive load is removed (iii) similar hardness and friability characteristics to the material of the imaging directional waveguide 1 to minimise damage for any rubbing that does occur. Layer 724 may further comprise a diffusing function, that may be an asymmetric diffuser with less diffusion in the lateral direction (y-axis) compared to the diffusion in the direction orthogonal to the lateral direction (x-axis).

Layers 791a, 791b may be transparent support substrates. Substrates 790, 792 may be liquid crystal cell support substrates and may further comprise alignment layers, spacers electrodes and addressing means. Diffuser 68 may be arranged on the upper surface of the component 726.

Spatial light modulator 48 may comprise an optional layer 796 on the lower surface of polariser 210 such that the spatial light modulator lower surface 793 has the properties of high damage resistance, low coefficient of friction and reduced wetting sensitivity. In an illustrative example the surfaces 793, 751 may be provided with a silicon oxide coating with 9H pencil hardness and surface energy arranged to minimise wetting in cooperation with the roughness of diffuser 68 surface and surface 793.

In the present embodiments it is desirable to minimise movement of the imaging directional waveguide 1 with respect to the optical components 726, 728. The layers 726, 728 may be further fixed to the imaging directional waveguide 1 by means of fixing means 797, 798, such as tape that is provided between the layer 724 and reflective material 799 that is arranged at the reflective end of the imaging directional waveguide 1. Advantageously relative component movement during an applied compressive force 718 can be further reduced.

Advantageously a privacy display that can be viewed with low image visibility from a wide range of viewing angles may be provided. The display has low sensitivity to damage from external applied compressive force 718 and has extended lifetime and improved uniformity.

Other embodiment of switchable privacy displays may be provided with collimating directional waveguides rather than the imaging waveguide 1 of the previous embodiments. Collimating directional waveguides provide a fixed narrow cone angle in at least one direction and may be susceptible to surface damage during assembly and handling due to light loss outside the fixed narrow cone angle. In comparison to the imaging waveguides 1 of the present embodiments collimating directional waveguides do not provide optical windows, that is images of the light sources at an input side.

It would be desirable to reduce image defects and extend lifetime for displays comprising further types and arrangements of collimating directional waveguides.

Figure 29:
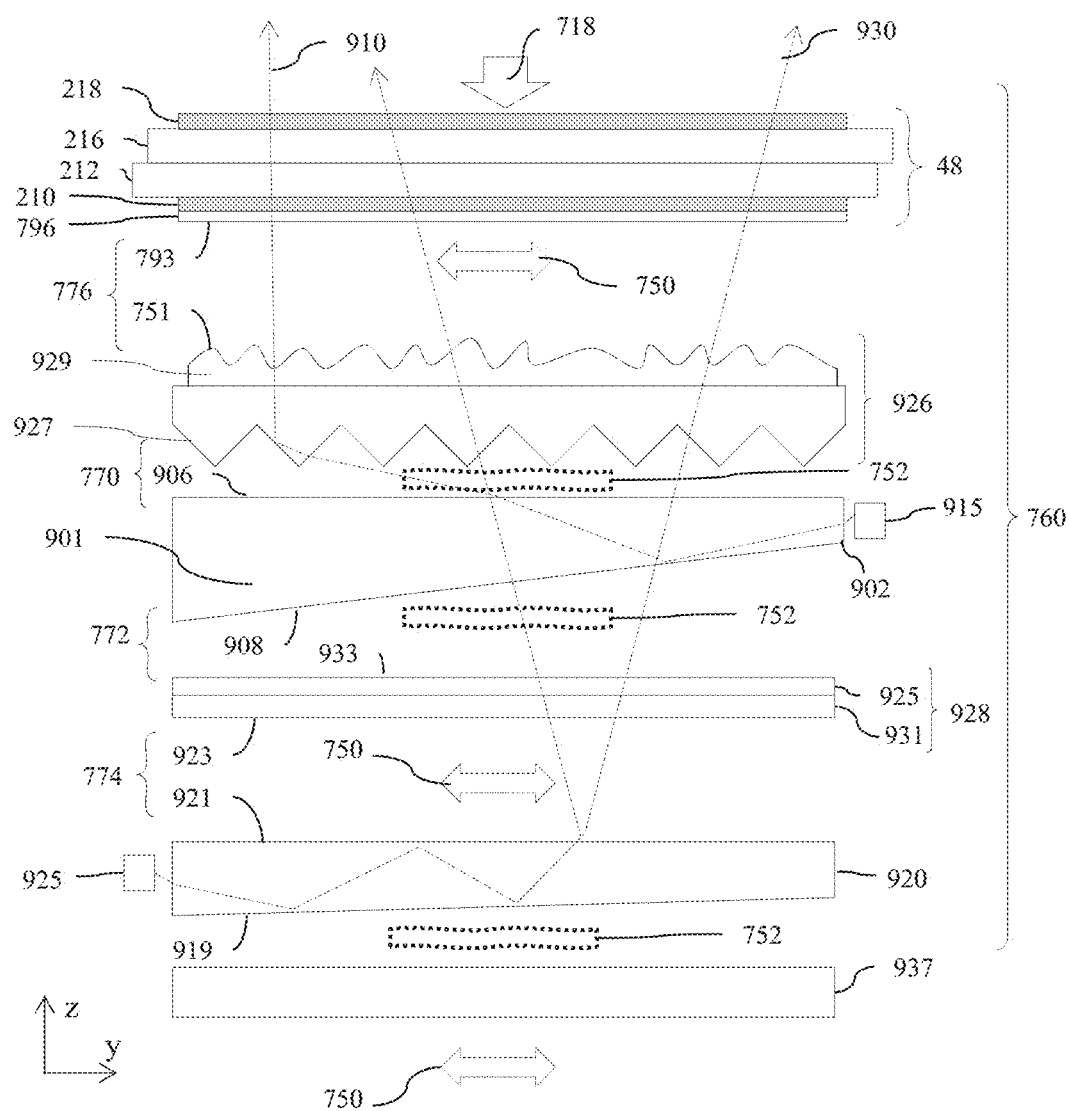
FIG. 29 is a schematic diagram illustrating a side view of a directional display apparatus optical stack comprising a collimating directional waveguide and a wide angle waveguide.

FIG. 29 is a schematic diagram illustrating a side view of a directional display apparatus optical stack 760 comprising a collimating directional waveguide 901 and a wide angle waveguide 920. In operation collimating directional waveguide 901 is illuminated on side 902 by light source 915. The collimating directional waveguide is provided with a taper that has a cross sectional shape that increases in width for light propagating in the waveguide in a direction away from the light sources at the input end. The tapered waveguide may alternatively or additionally be provided by tapered light redirecting micro structures as will be described in FIG. 30. Light rays 910 that leak from the upper surface 906 and are incident on prism array 926. Prism array 927 deflects grazing incidence light rays 910 towards the normal direction, providing a narrow light cone angle in the lateral direction (y-z plane) that may be partially diffused by diffuser 929. The direction of the ray 910 is substantially independent of the location of the light source 915 on the input side 902 and the collimating directional waveguide 901 does not image the source 915 in comparison to imaging waveguide 1 that provides optical windows.

Thus a directional backlight may comprise a waveguide 920 further comprises a taper, the waveguide being arranged to deflect input light rays 910 guided through the waveguide 920 from the light sources 915 to exit through the first guide surface 906. Thus one of the optical components 726 comprises a prism array 927 arranged to deflect light rays 910 that exit through the first guide surface 906 of the waveguide 901.

Damage to surfaces 906, 908 undesirably directs light rays outside the narrow cone of the privacy mode of operation and degrades the uniformity of the dark state in the privacy mode of operation.

To provide a wide angle mode of operation, a second wide angle waveguide 920 may be provided. Wide angle waveguide 920 is provided with microstructures (not shown) on the surfaces 921, 919 to provide scattered light for light rays 930 from light sources 925. As the waveguide 920 provides light over a wide viewing angular range, damage to surfaces 919, 921 of the waveguide 920 may be less visible in operation in comparison to damage to the surfaces 906, 908 of the waveguide 901. For example, the upper surface of the waveguide 920 may be provided with a rough surface that is insensitive to damage of its optical diffusion characteristics for wide mode operation. Such a surface may be suitable to provide one side of an interface that has translation 750 under an applied external force.

Layer 928 that may comprise for an example a diffuser layer 925 on a support substrate 931 may be provided between the collimating directional waveguide 901 and wide angle waveguide 920.

In the present embodiments, interfaces 770, 772 may be provided with higher coefficients of friction in comparison to the interfaces 774, 776 as described elsewhere for imaging waveguide 1. In the presence of an applied external compressive force 718, interfaces 776 are arranged to provide movement 750 whereas interfaces 770, 772 are arranged to provide wetting regions 752, to minimise movement during an applied compressive force, reducing damage.

Advantageously a switchable privacy backlight may be provided with reduced damage by an external compressive force, increasing uniformity and lifetime.

Figure 30:
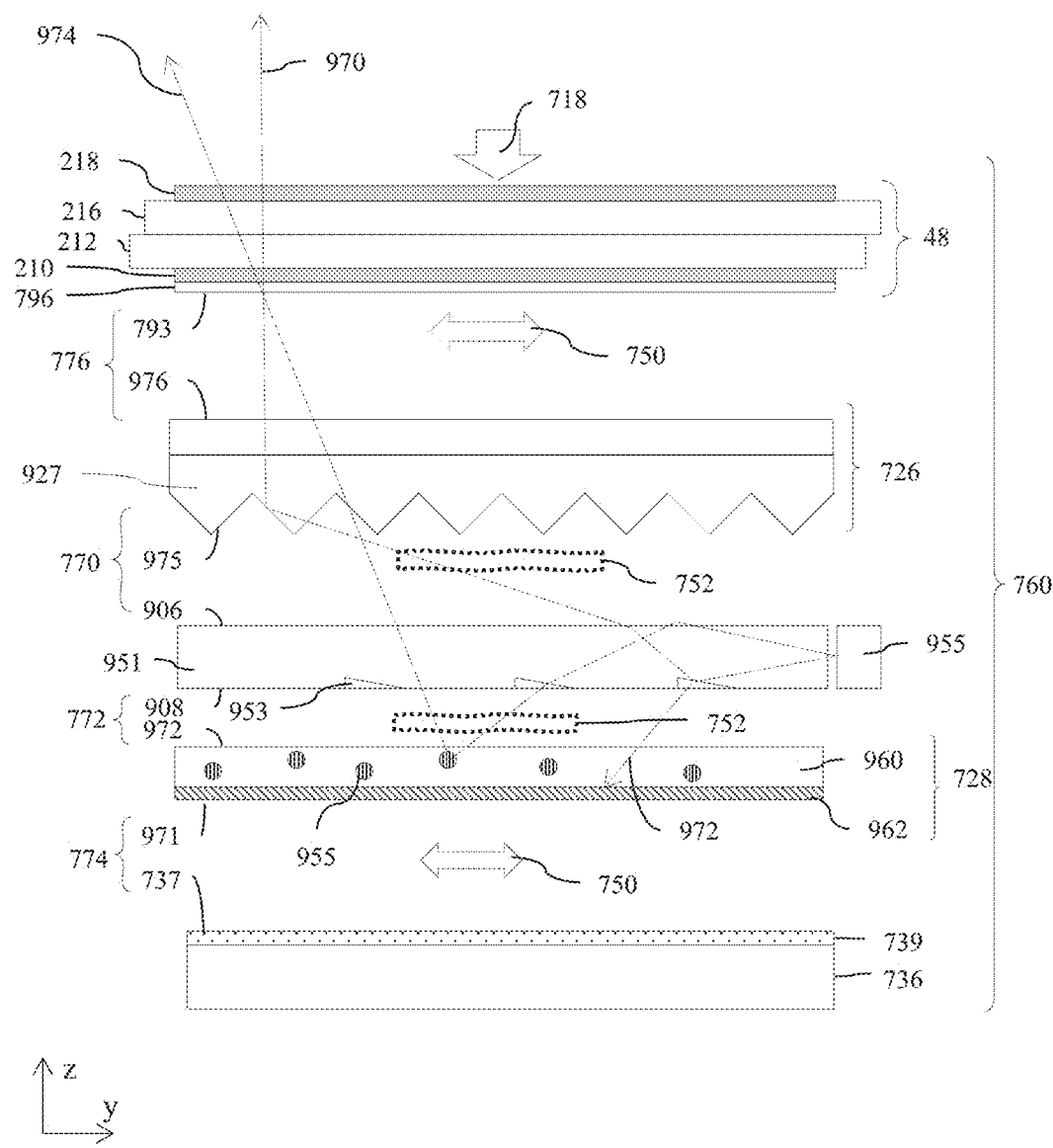
FIG. 30 is a schematic diagram illustrating a side view of a directional display apparatus optical stack comprising a collimating directional waveguide and switchable diffuser, in accordance with the present disclosure.

FIG. 30 is a schematic diagram illustrating a side view of a directional display apparatus optical stack comprising a collimating directional waveguide 951 and switchable diffuser. Collimating directional waveguide 951 may be provided with microstructures 953 that couple some light rays 970 from light source 955 into the vertical direction by means of reflection at prism array 726. The microstructures operate in a similar manner to the single tapered waveguide of FIG. 29, thus the at least one tapered waveguide comprises an array of tapered microstructures 953.

The backlight may further incorporate a switchable diffuser layer 960 comprising polymer dispersed liquid crystal (PDLC) 955. In a narrow angle mode of operation, the liquid crystal is arranged to transmit light rays 972 that are transmitted through microstructures 953. Light rays 972 are absorbed by absorbing layer 962 and thus not output through the spatial light modulator 48.

In a wide angle mode of operation, the liquid crystal molecules in the PDLC 955 are switched to provide a scattering function with the surrounding medium and thus light rays 974 are scattered to a wide range of viewing positions.

Damage to surfaces 908, 906 may undesirably provide non uniformities in the privacy mode of operation, particularly for off-axis viewing locations seen by a snooper.

In the present embodiments, interfaces 770, 772 may be provided with higher coefficients of friction in comparison to the interfaces 774, 776 as described elsewhere for imaging waveguide 1. In the presence of an applied external compressive force 718, interfaces 776 are arranged to provide movement 750 whereas interfaces 770, 772 are arranged to provide wetting regions 752, to minimise movement during an applied compressive force, reducing damage. Thus the surface energy, friability, roughness, coefficient of friction and other surface properties of surfaces 737, 971, 972, 908, 906, 975, 976, 793 may be provided to achieve reduced damage to applied compressive force of the waveguide 951.

Advantageously a switchable privacy backlight may be provided with reduced damage by an external compressive force, increasing uniformity and lifetime.

Embodiments related to autostereoscopic display and other types of directional display will now be further described. In comparison to the privacy display embodiments above, autostereoscopic displays have optical windows of reduced FWHM, and so have high sensitivity to damage to the directional waveguide. Advantageously the present embodiments can achieve increased resistance to damage.

Time multiplexed autostereoscopic displays can advantageously improve the spatial resolution of autostereoscopic display by directing light from all of the pixels of a spatial light modulator to a first viewing window in a first time slot, and all of the pixels to a second viewing window in a second time slot. Thus an observer with eyes arranged to receive light in first and second viewing windows will see a full resolution image across the whole of the display over multiple time slots. Time multiplexed displays can advantageously achieve directional illumination by directing an illuminator array through a substantially transparent time multiplexed spatial light modulator using directional optical elements, wherein the directional optical elements substantially form an image of the illuminator array in the window plane.

The uniformity of the viewing windows may be advantageously independent of the arrangement of pixels in the spatial light modulator. Advantageously, such displays can provide observer tracking displays which have low flicker, with low levels of cross talk for a moving observer.

To achieve high uniformity in the window plane, it is desirable to provide an array of illumination elements that have a high spatial uniformity. The illuminator elements of the time sequential illumination system may be provided, for example, by pixels of a spatial light modulator with size approximately 100 micrometers in combination with a lens array. However, such pixels suffer from similar difficulties as for spatially multiplexed displays. Further, such devices may have low efficiency and higher cost, requiring additional display components.

High window plane uniformity can be conveniently achieved with macroscopic illuminators, for example, an array of LEDs in combination with homogenizing and diffusing optical elements that are typically of size 1 mm or greater. However, the increased size of the illuminator elements means that the size of the directional optical elements increases proportionately. For example, a 16 mm wide illuminator imaged to a 65 mm wide viewing window may require a 200 mm back working distance. Thus, the increased thickness of the optical elements can prevent useful application, for example, to mobile displays, or large area displays.

Addressing the aforementioned shortcomings, optical valves as described in commonly-owned U.S. Pat. No. 9,519,153 advantageously can be arranged in combination with fast switching transmissive spatial light modulators to achieve time multiplexed autostereoscopic illumination in a thin package while providing high resolution images with flicker free observer tracking and low levels of cross talk. Described is a one dimensional array of viewing positions, or windows, that can display different images in a first, typically horizontal, direction, but contain the same images when moving in a second, typically vertical, direction.

Conventional non-imaging display backlights commonly employ optical waveguides and have edge illumination from light sources such as LEDs. However, it should be appreciated that there are many fundamental differences in the function, design, structure, and operation between such conventional non-imaging display backlights and the imaging directional backlights discussed in the present disclosure.

Generally, for example, in accordance with the present disclosure, imaging directional backlights are arranged to direct the illumination from multiple light sources through a display panel to respective multiple viewing windows in at least one axis. Each viewing window is substantially formed as an image in at least one axis of a light source by the imaging system of the imaging directional backlight. An imaging system may be formed between multiple light sources and the respective window images. In this manner, the light from each of the multiple light sources is substantially not visible for an observer's eye outside of the respective viewing window.

In contradistinction, conventional non-imaging backlights or light guiding plates (LGPs) are used for illumination of 2D displays. See. e.g., Kälil Käläntär et al., *Backlight Unit With Double Surface Light Emission*, J. Soc. Inf. Display, Vol. 12, Issue 4, pp. 379-387 (December 2004). Non-imaging backlights are typically arranged to direct the illumination from multiple light sources through a display panel into a substantially common viewing zone for each of the multiple light sources to achieve wide viewing angle and high display uniformity. Thus non-imaging backlights do not form viewing windows. In this manner, the light from each of the multiple light sources may be visible for an observer's eye at substantially all positions across the viewing zone. Such conventional non-imaging backlights may have some directionality, for example, to increase screen gain compared to Lambertian illumination, which may be provided by brightness enhancement films such as BEF™ from 3M. However, such directionality may be substantially the same for each of the respective light sources. Thus, for these reasons and others that should be apparent to persons of ordinary skill, conventional non-imaging backlights are different to imaging directional backlights. Edge lit non-imaging backlight illumination structures may be used in liquid crystal display systems such as those seen in 2D Laptops, Monitors and TVs. Light propagates from the edge of a lossy waveguide which may include sparse features; typically local indentations in the surface of the guide which cause light to be lost regardless of the propagation direction of the light.

As used herein, an optical valve is an optical structure that may be a type of light guiding structure or device referred to as, for example, a light valve, an optical valve directional backlight, and a valve directional backlight ("v-DBL"). In the present disclosure, optical valve is different to a spatial light modulator (even though spatial light modulators may be sometimes generally referred to as a "light valve" in the art). One example of an imaging directional backlight is an optical valve that may employ a folded optical system. Light may propagate substantially without loss in one direction through the optical valve, may be incident on an imaging reflector, and may counter-propagate such that the light may be extracted by reflection off tilted light extraction features, and directed to viewing windows as described in U.S. Pat. No. 9,519,153, which is herein incorporated by reference in its entirety.

Additionally, as used herein, a stepped waveguide imaging directional backlight may be at least one of an optical valve. A stepped waveguide is a waveguide for an imaging directional backlight comprising a waveguide for guiding light, further comprising: a first light guiding surface; and a second light guiding surface, opposite the first light guiding surface, further comprising a plurality of light guiding features interspersed with a plurality of extraction features arranged as steps.

In operation, light may propagate within an exemplary optical valve in a first direction from an input surface to a reflective side and may be transmitted substantially without loss. Light may be reflected at the reflective side and propagates in a second direction substantially opposite the first direction. As the light propagates in the second direction, the light may be incident on light extraction features, which are operable to redirect the light outside the optical valve. Stated differently, the optical valve generally allows light to propagate in the first direction and may allow light to be extracted while propagating in the second direction.

The optical valve may achieve time sequential directional illumination of large display areas. Additionally, optical elements may be employed that are thinner than the back working distance of the optical elements to direct light from macroscopic illuminators to a window plane. Such displays may use an array of light extraction features arranged to extract light counter propagating in a substantially parallel waveguide.

Thin imaging directional backlight implementations for use with LCDs have been proposed and demonstrated by 3M, for example U.S. Pat. No. 7,528,893; by Microsoft, for example U.S. Pat. No. 7,970,246 which may be referred to herein as a "wedge type directional backlight;" by RealD, for example U.S. Pat. No. 9,519,153 which may be referred to herein as an "optical valve" or "optical valve directional backlight," all of which are herein incorporated by reference in their entirety.

The present disclosure provides stepped waveguide imaging directional backlights in which light may reflect back and forth between the internal faces of, for example, a stepped waveguide which may include a first side and a first set of features. As the light travels along the length of the stepped waveguide, the light may not substantially change angle of incidence with respect to the first side and first set of surfaces and so may not reach the critical angle of the medium at these internal faces. Light extraction may be advantageously achieved by a second set of surfaces (the step "risers") that are inclined to the first set of surfaces (the step "treads"). Note that the second set of surfaces may not be part of the light guiding operation of the stepped waveguide, but may be arranged to provide light extraction from the structure. By contrast, a wedge type imaging directional backlight may allow light to guide within a wedge profiled waveguide having continuous internal surfaces. The optical valve is thus not a wedge type imaging directional backlight.

Figure 31A:
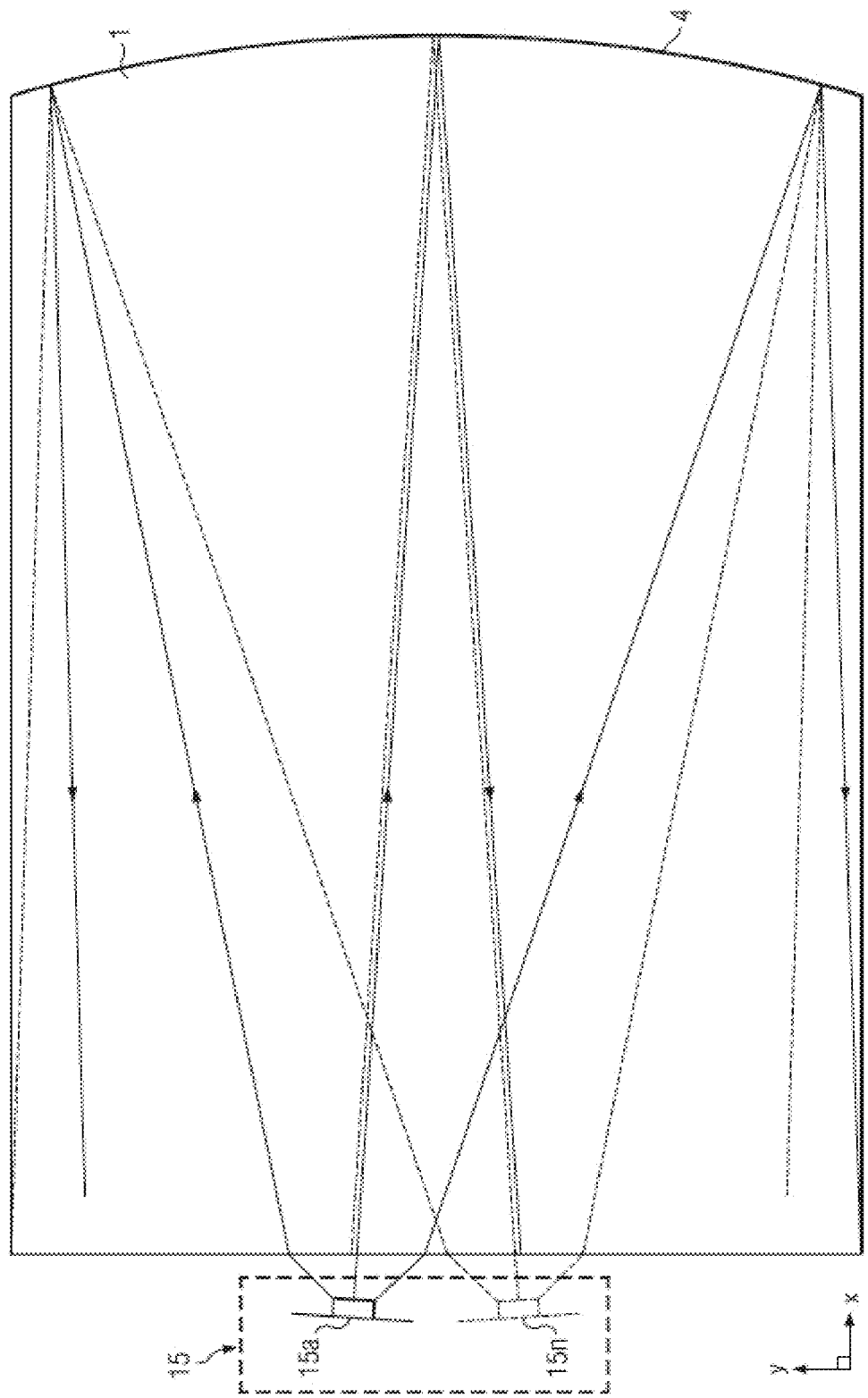
FIG. 31A is a schematic diagram illustrating a front view of light propagation in one embodiment of a directional display device.
Figure 31B:
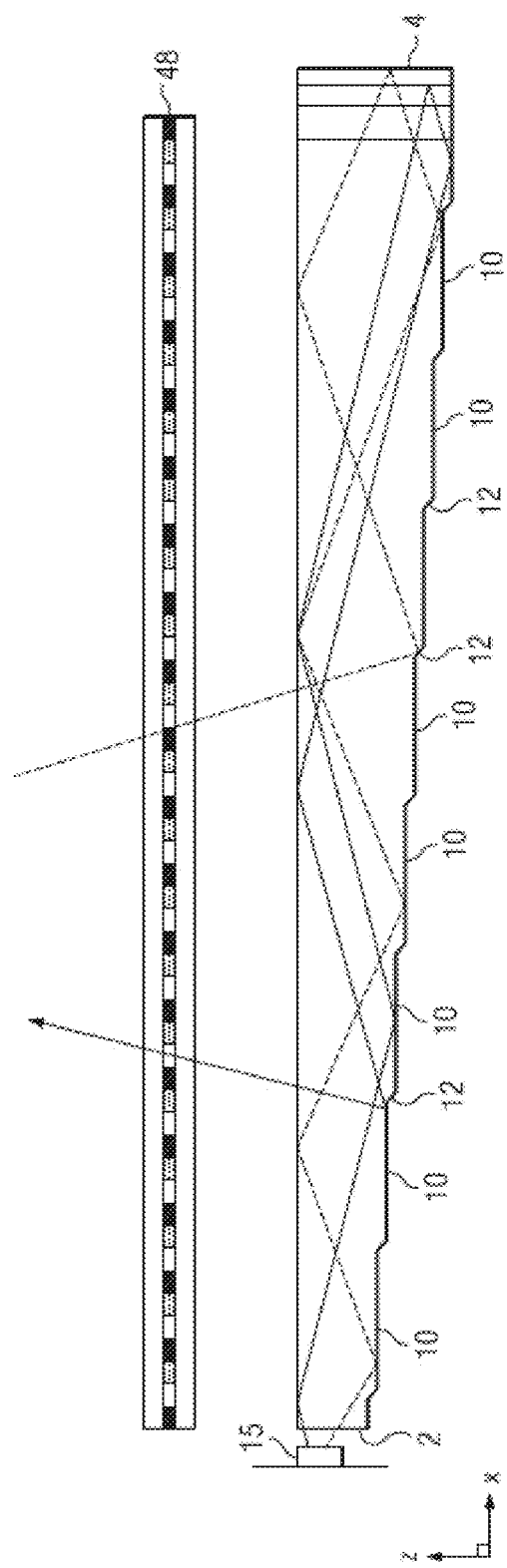
FIG. 31B is a schematic diagram illustrating a side view of light propagation in one embodiment of the directional display device of FIG. 31A.

FIG. 31A is a schematic diagram illustrating a front view of light propagation in one embodiment of a directional display device, and FIG. 31B is a schematic diagram illustrating a side view of light propagation in the directional display device of FIG. 31A.

FIG. 31A illustrates a front view in the xy plane of a directional backlight of a directional display device, and includes an illuminator array 15 which may be used to illuminate a stepped waveguide 1. Illuminator array 15 includes illuminator elements 15a through illuminator element 15n (where n is an integer greater than one). In one example, the stepped waveguide 1 of FIG. 31A may be a stepped, display sized waveguide 1. Illumination elements 15a through 15n are light sources that may be light emitting diodes (LEDs). Although LEDs are discussed herein as illuminator elements 15a-15n, other light sources may be used such as, but not limited to, diode sources, semiconductor sources, laser sources, local field emission sources, organic emitter arrays, and so forth. Additionally, FIG. 31B illustrates a side view in the xz plane, and includes illuminator array 15, SLM 48, extraction features 12, guiding features 10, and stepped waveguide 1, arranged as shown. The side view provided in FIG. 31B is an alternative view of the front view shown in FIG. 31A. Accordingly, the illuminator array 15 of FIGS. 31A and 31B corresponds to one another and the stepped waveguide 1 of FIGS. 31A and 31B may correspond to one another.

Further, in FIG. 31B, the stepped waveguide 1 may have an input end 2 that is thin and a reflective end 4 that is thick. Thus the imaging directional waveguide 1 extends between the input end 2 that receives input light and the reflective end 4 that reflects the input light back through the imaging directional waveguide 1. The length of the input end 2 in a lateral direction across the waveguide is greater than the height of the input end 2. The illuminator elements 15a-15n are disposed at different input positions in a lateral direction across the input end 2.

The imaging directional waveguide 1 has first and second, opposed guide surfaces extending between the input end 2 and the reflective end 4 for guiding light forwards and back along the imaging directional waveguide 1. The second guide surface has a plurality of light extraction features 12 facing the reflective end 4 and arranged to reflect at least some of the light guided back through the imaging directional waveguide 1 from the reflective end from different input positions across the input end in different directions through the first guide surface that are dependent on the input position.

In this example, the light extraction features 12 are reflective facets, although other reflective features could be used. The light extraction features 12 do not guide light through the waveguide, whereas the intermediate regions of the second guide surface intermediate the light extraction features 12 guide light without extracting it. Those regions of the second guide surface are planar and may extend parallel to the first guide surface, or at a relatively low inclination. The light extraction features 12 extend laterally to those regions so that the second guide surface has a stepped shape which may include the light extraction features 12 and intermediate regions. The light extraction features 12 are oriented to reflect light from the light sources, after reflection from the reflective end 4, through the first guide surface.

The light extraction features 12 are arranged to direct input light from different input positions in the lateral direction across the input end in different directions relative to the first guide surface that are dependent on the input position. As the illumination elements 15a-15n are arranged at different input positions, the light from respective illumination elements 15a-15n is reflected in those different directions. In this manner, each of the illumination elements 15a-15n directs light into a respective optical window in output directions distributed in the lateral direction in dependence on the input positions. The lateral direction across the input end 2 in which the input positions are distributed corresponds with regard to the output light to a lateral direction to the normal to the first guide surface. The lateral directions as defined at the input end 2 and with regard to the output light remain parallel in this embodiment where the deflections at the reflective end 4 and the first guide surface are generally orthogonal to the lateral direction. Under the control of a control system, the illuminator elements 15a-15n may be selectively operated to direct light into a selectable optical window. The optical windows may be used individually or in groups as viewing windows.

The SLM 48 extends across the waveguide and modulates the light output therefrom. Although the SLM 48 may a liquid crystal display (LCD), this is merely by way of example and other spatial light modulators or displays may be used including LCOS, DLP devices, and so forth, as this illuminator may work in reflection. In this example, the SLM 48 is disposed across the first guide surface of the waveguide and modulates the light output through the first guide surface after reflection from the light extraction features 12.

The operation of a directional display device that may provide a one dimensional array of viewing windows is illustrated in front view in FIG. 31A, with its side profile shown in FIG. 31B. In operation, in FIGS. 31A and 31B, light may be emitted from an illuminator array 15, such as an array of illuminator elements 15a through 15n, located at different positions, y, along the surface of thin end side 2, x=0, of the stepped waveguide 1. The light may propagate along +x in a first direction, within the stepped waveguide 1, while at the same time, the light may fan out in the xy plane and upon reaching the far curved end side 4, may substantially or entirely fill the curved end side 4. While propagating, the light may spread out to a set of angles in the xz plane up to, but not exceeding the critical angle of the guide material. The extraction features 12 that link the guiding features 10 of the bottom side of the stepped waveguide 1 may have a tilt angle greater than the critical angle and hence may be missed by substantially all light propagating along +x in the first direction, ensuring the substantially lossless forward propagation.

Continuing the discussion of FIGS. 31A and 31B, the curved end side 4 of the stepped waveguide 1 may be made reflective, typically by being coated with a reflective material such as, for example, silver, although other reflective techniques may be employed. Light may therefore be redirected in a second direction, back down the guide in the direction of −x and may be substantially collimated in the xy or display plane. The angular spread may be substantially preserved in the xz plane about the principal propagation direction, which may allow light to hit the riser edges and reflect out of the guide. In an embodiment with approximately 45 degree tilted extraction features 12, light may be effectively directed approximately normal to the xy display plane with the xz angular spread substantially maintained relative to the propagation direction. This angular spread may be increased when light exits the stepped waveguide 1 through refraction, but may be decreased somewhat dependent on the reflective properties of the extraction features 12.

In some embodiments with uncoated extraction features 12, reflection may be reduced when total internal reflection (TIR) fails, squeezing the xz angular profile and shifting off normal. However, in other embodiments having silver coated or metallized extraction features, the increased angular spread and central normal direction may be preserved. Continuing the description of the embodiment with silver coated extraction features, in the xz plane, light may exit the stepped waveguide 1 approximately collimated and may be directed off normal in proportion to the y-position of the respective illuminator element 15a-15n in illuminator array 15 from the input edge center. Having independent illuminator elements 15a-15n along the input edge 2 then enables light to exit from the entire first light directing side 6 and propagate at different external angles, as illustrated in FIG. 31A.

Figure 32A:
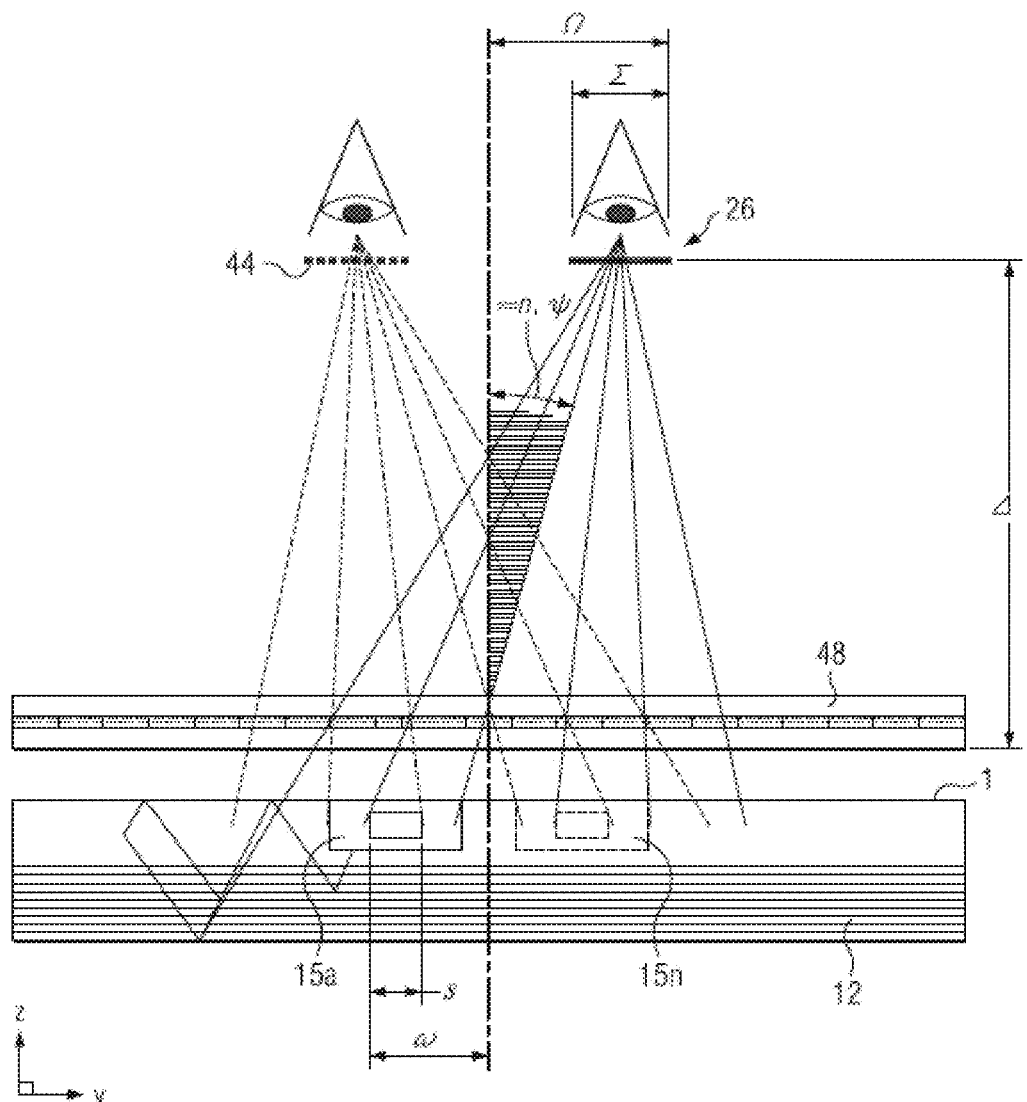
FIG. 32A is a schematic diagram illustrating in a top view of light propagation in another embodiment of a directional display device.
Figure 32B:
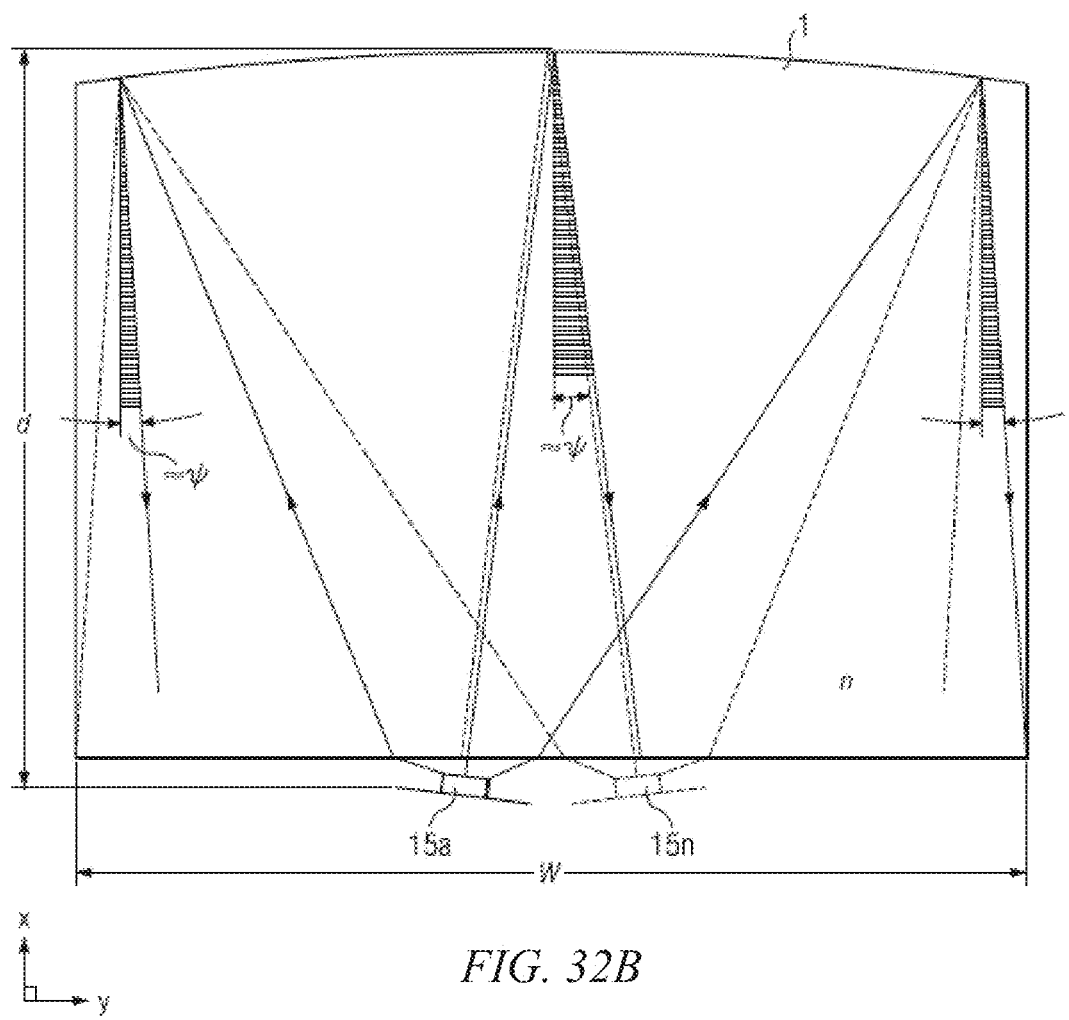
FIG. 32B is a schematic diagram illustrating light propagation in a front view of the directional display device of FIG. 32A.
Figure 32C:
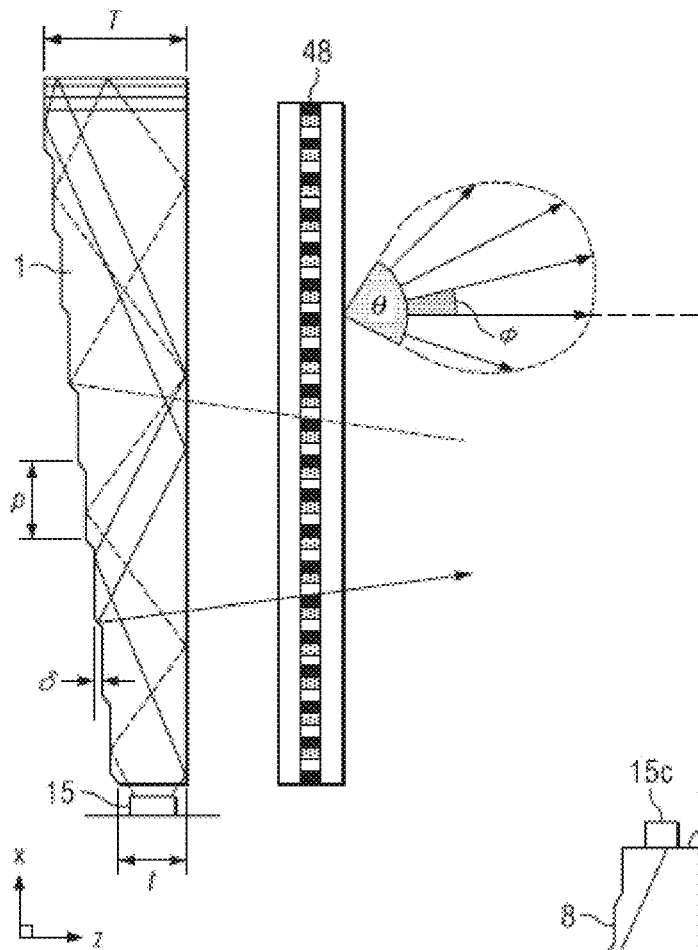
FIG. 32C is a schematic diagram illustrating light propagation in a side view of the directional display device of FIG. 32A.

Illuminating a spatial light modulator (SLM) 48 such as a fast liquid crystal display (LCD) panel with such a device may achieve autostereoscopic 3D as shown in top view or yz-plane viewed from the illuminator array 15 end in FIG. 32A, front view in FIG. 32B and side view in FIG. 32C. FIG. 32A is a schematic diagram illustrating in a top view, propagation of light in a directional display device, FIG. 32B is a schematic diagram illustrating in a front view, propagation of light in a directional display device, and FIG. 32C is a schematic diagram illustrating in side view propagation of light in a directional display device. As illustrated in FIGS. 32A, 32B, and 32C, a stepped waveguide 1 may be located behind a fast (e.g., greater than 100 Hz) LCD panel SLM 48 that displays sequential right and left eye images. In synchronization, specific illuminator elements 15a through 15n of illuminator array 15 (where n is an integer greater than one) may be selectively turned on and off, providing illuminating light that enters right and left eyes substantially independently by virtue of the system's directionality. In the simplest case, sets of illuminator elements of illuminator array 15 are turned on together, providing a one dimensional viewing window 26 or an optical pupil with limited width in the horizontal direction, but extended in the vertical direction, in which both eyes horizontally separated may view a left eye image, and another viewing window 44 in which a right eye image may primarily be viewed by both eyes, and a central position in which both the eyes may view different images. In this way, 3D may be viewed when the head of a viewer is approximately centrally aligned. Movement to the side away from the central position may result in the scene collapsing onto a 2D image.

The reflective end 4 may have positive optical power in the lateral direction across the imaging directional waveguide 1. In other words, the reflective end may have positive optical power in a direction extending between sides of the waveguide that extend between the first and second guide surfaces and between the input end and the reflective end. The light extraction features 12 may have positive optical power in a direction between sides of the waveguide that extend between the first and second guide surfaces 6, 8 and between the input end 2 and the reflective end.

The imaging directional waveguide 1 may further comprising a reflective end 4 for reflecting input light from the light sources back along the imaging directional waveguide 1, the second guide surface 8 being arranged to deflect the reflected input light through the first guide surface 6 as output light, and the imaging directional waveguide 1 being arranged to image the light sources 15a-n so that the output light from the light sources is directed into respective optical windows 26a-n in output directions that are distributed laterally in dependence on the input positions of the light sources.

In embodiments in which typically the reflective end 4 has positive optical power, the optical axis may be defined with reference to the shape of the reflective end 4, for example being a line that passes through the centre of curvature of the reflective end 4 and coincides with the axis of reflective symmetry of the end 4 about the x-axis. In the case that the reflecting surface 4 is flat, the optical axis may be similarly defined with respect to other components having optical power, for example the light extraction features 12 if they are curved, or the Fresnel lens 62 described below. The optical axis 238 is typically coincident with the mechanical axis of the imaging directional waveguide 1. In the present embodiments that typically comprise a substantially cylindrical reflecting surface at end 4, the optical axis 238 is a line that passes through the centre of curvature of the surface at end 4 and coincides with the axis of reflective symmetry of the side 4 about the x-axis. The optical axis 238 is typically coincident with the mechanical axis of the imaging directional waveguide 1. The cylindrical reflecting surface at end 4 may typically comprise a spherical profile to optimize performance for on-axis and off-axis viewing positions. Other profiles may be used.

Figure 33:
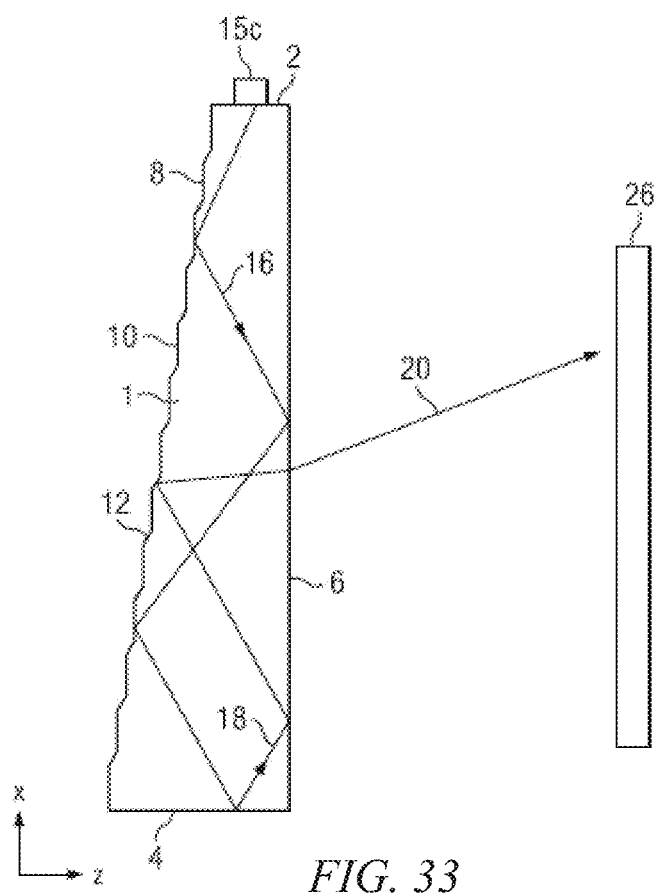
FIG. 33 is a schematic diagram illustrating in a side view of a directional display device.

FIG. 33 is a schematic diagram illustrating in side view a directional display device. Further, FIG. 33 illustrates additional detail of a side view of the operation of a stepped waveguide 1, which may be a transparent material. The stepped waveguide 1 may include an illuminator input side 2, a reflective side 4, a first light directing side 6 which may be substantially planar, and a second light directing side 8 which includes guiding features 10 and light extraction features 12. In operation, light rays 16 from an illuminator element 15c of an illuminator array 15 (not shown in FIG. 33), that may be an addressable array of LEDs for example, may be guided in the stepped waveguide 1 by means of total internal reflection by the first light directing side 6 and total internal reflection by the guiding feature 10, to the reflective side 4, which may be a mirrored surface. Although reflective side 4 may be a mirrored surface and may reflect light, it may in some embodiments also be possible for light to pass through reflective side 4.

Continuing the discussion of FIG. 33, light ray 18 reflected by the reflective side 4 may be further guided in the stepped waveguide 1 by total internal reflection at the reflective side 4 and may be reflected by extraction features 12. Light rays 18 that are incident on extraction features 12 may be substantially deflected away from guiding modes of the stepped waveguide 1 and may be directed, as shown by ray 20, through the side 6 to an optical pupil that may form a viewing window 26 of an autostereoscopic display. The width of the viewing window 26 may be determined by at least the size of the illuminator, output design distance and optical power in the side 4 and extraction features 12. The height of the viewing window may be primarily determined by the reflection cone angle of the extraction features 12 and the illumination cone angle input at the input side 2. Each viewing window 26 represents a range of separate output directions with respect to the surface normal direction of the spatial light modulator 48 that intersect with a plane at the nominal viewing distance.

Figure 34A:
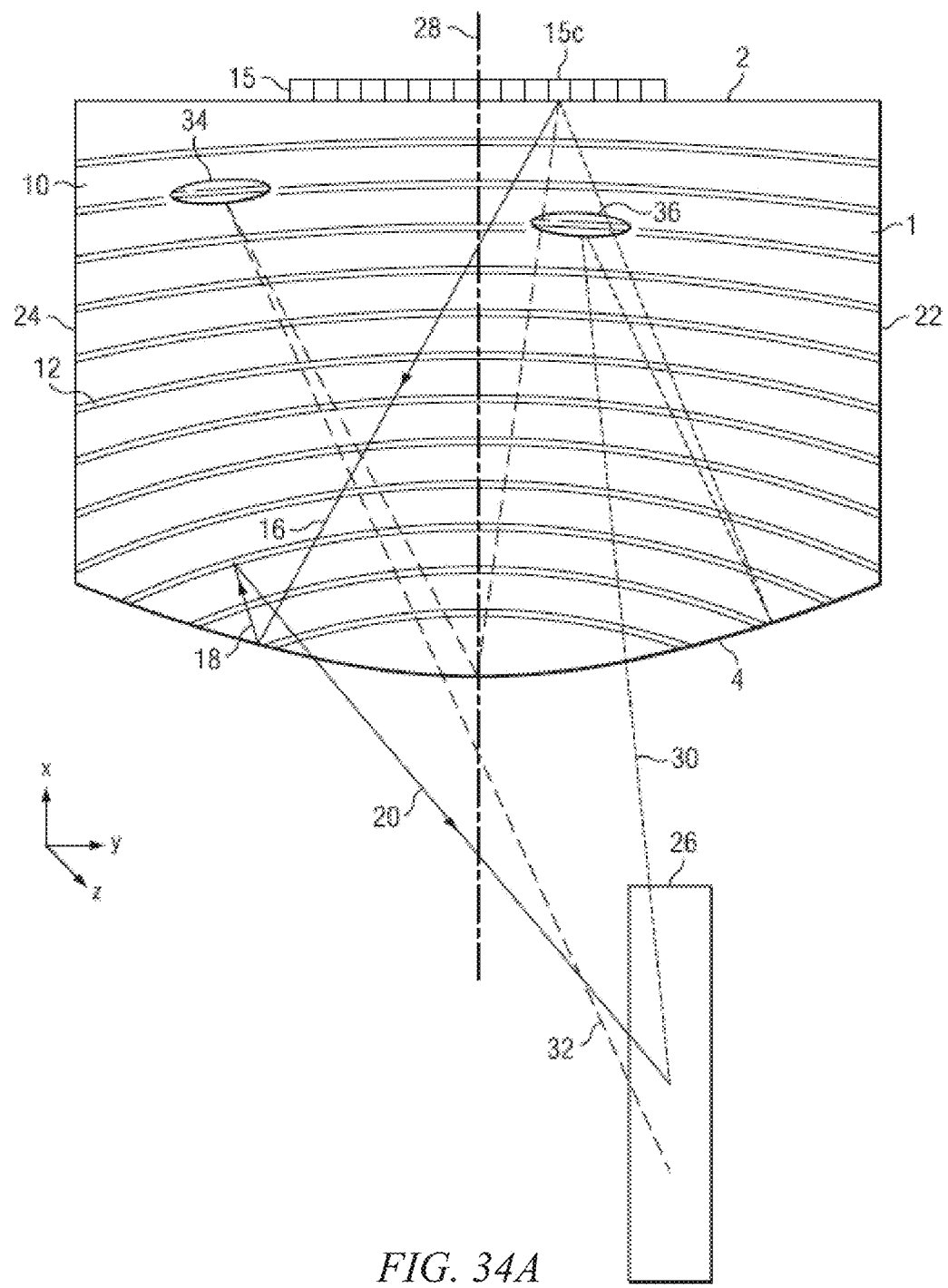
FIG. 34A is schematic diagram illustrating in a front view, generation of a viewing window in a directional display device including curved light extraction features.

FIG. 34A is a schematic diagram illustrating in front view a directional display device which may be illuminated by a first illuminator element and including curved light extraction features. Further, FIG. 34A shows in front view further guiding of light rays from illuminator element 15c of illuminator array 15, in the stepped waveguide 1. Each of the output rays are directed towards the same viewing window 26 from the respective illuminator 14. Thus light ray 30 may intersect the ray 20 in the window 26, or may have a different height in the window as shown by ray 32. Additionally, in various embodiments, sides 22, 24 of the imaging directional waveguide 1 may be transparent, mirrored, or blackened surfaces. Continuing the discussion of FIG. 34A, light extraction features 12 may be elongate, and the orientation of light extraction features 12 in a first region 34 of the light directing side 8 (light directing side 8 shown in FIG. 33, but not shown in FIG. 34A) may be different to the orientation of light extraction features 12 in a second region 36 of the light directing side 8.

Figure 34B:
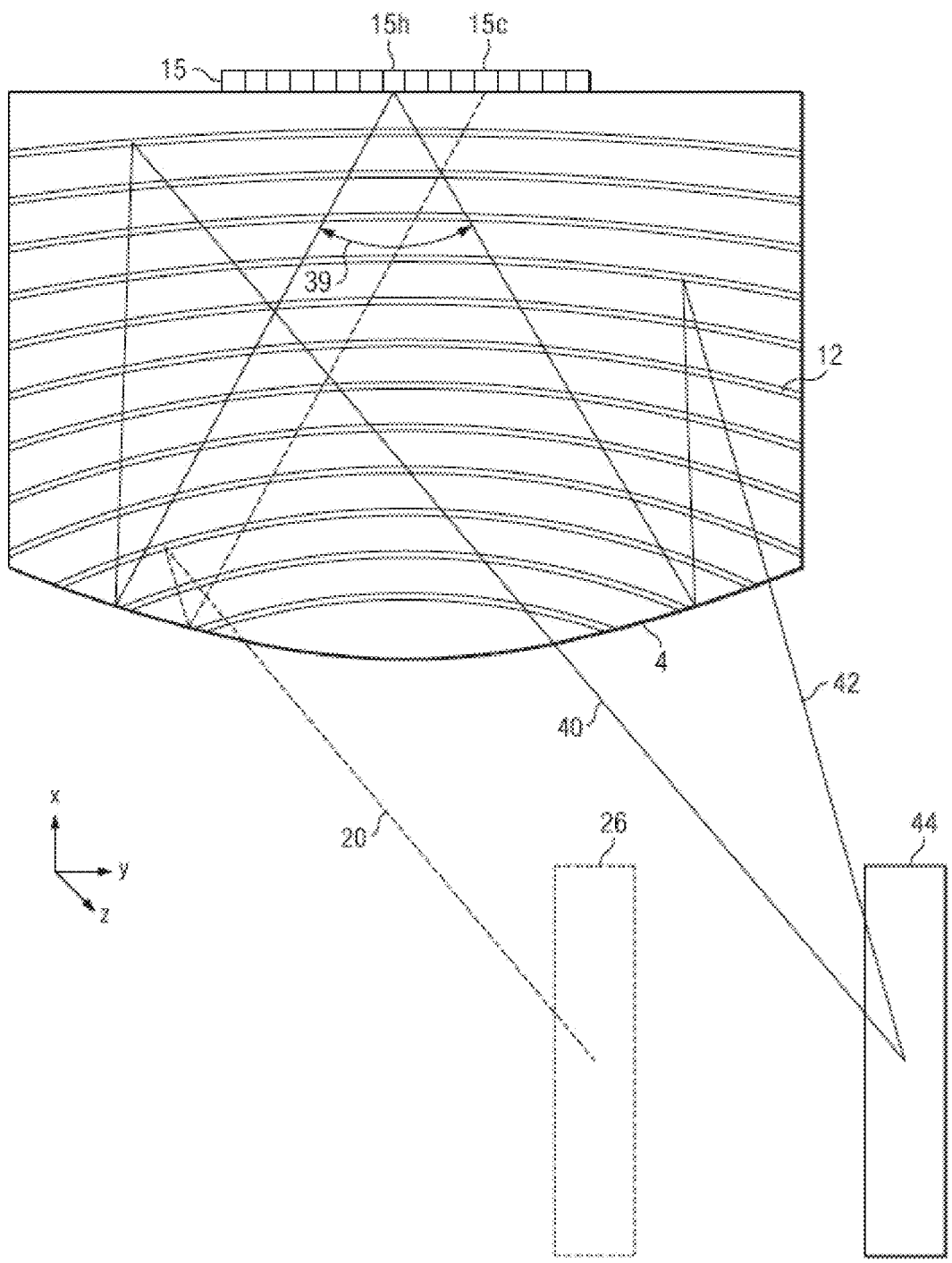
FIG. 34B is a schematic diagram illustrating in a front view, generation of a first and a second viewing window in a directional display device including curved light extraction features.

FIG. 34B is a schematic diagram illustrating in front view an optical valve which may illuminated by a second illuminator element. Further, FIG. 34B shows the light rays 40, 42 from a second illuminator element 15h of the illuminator array 15. The curvature of the reflective end on the side 4 and the light extraction features 12 cooperatively produce a second viewing window 44 laterally separated from the viewing window 26 with light rays from the illuminator element 15h.

Advantageously, the arrangement illustrated in FIG. 34B may provide a real image of the illuminator element 15c at a viewing window 26 in which the real image may be formed by cooperation of optical power in reflective side 4 and optical power which may arise from different orientations of elongate light extraction features 12 between regions 34 and 36, as shown in FIG. 34A. The arrangement of FIG. 34B may achieve improved aberrations of the imaging of illuminator element 15c to lateral positions in viewing window 26. Improved aberrations may achieve an extended viewing freedom for an autostereoscopic display while achieving low cross talk levels.

Figure 35:
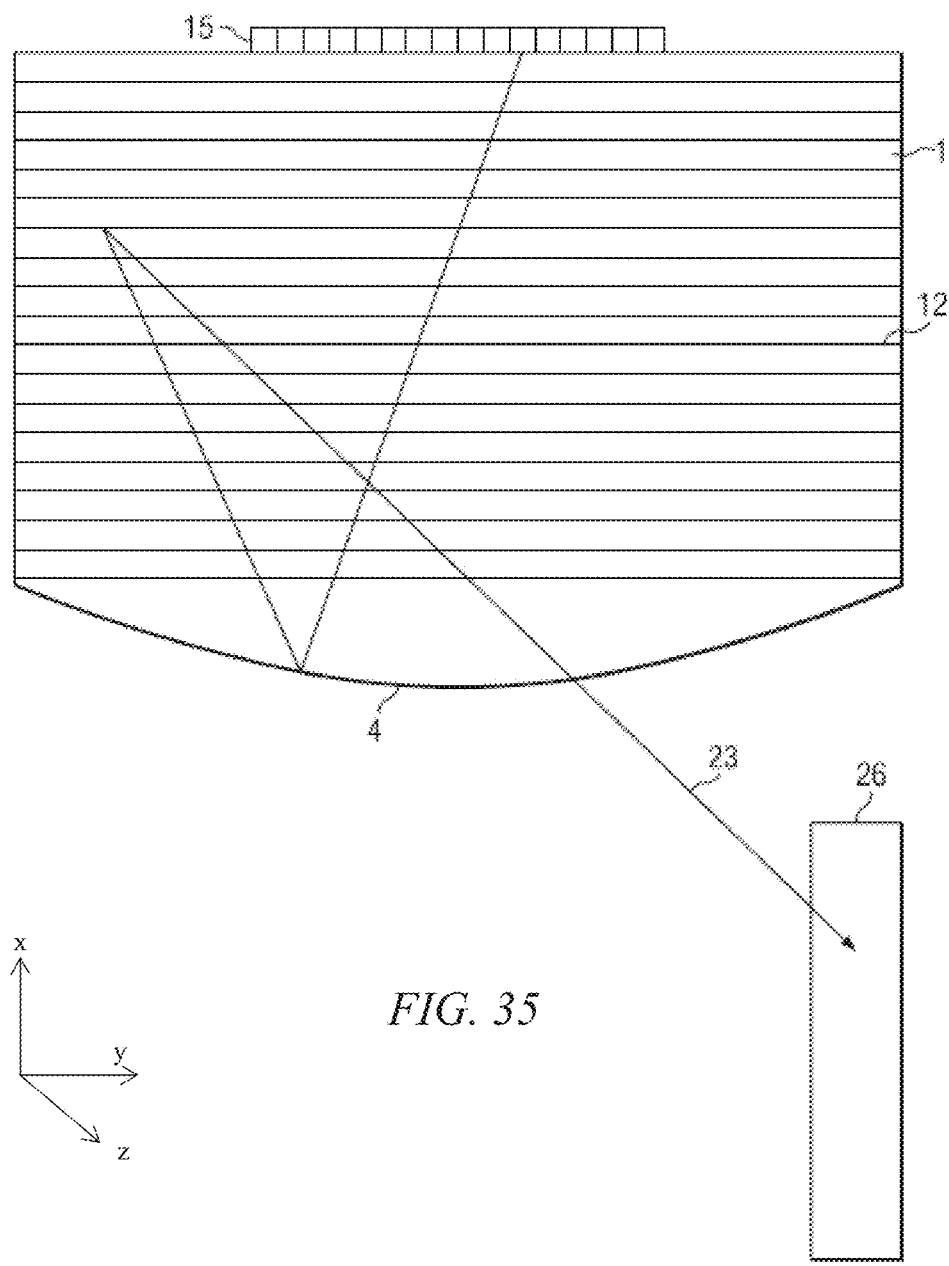
FIG. 35 is a schematic diagram illustrating generation of a first viewing window in a directional display device including linear light extraction features.

FIG. 35 is a schematic diagram illustrating in front view an embodiment of a directional display device having substantially linear light extraction features. Further, FIG. 35 shows a similar arrangement of components to FIG. 31A (with corresponding elements being similar), with one of the differences being that the light extraction features 12 are substantially linear and parallel to each other. Advantageously, such an arrangement may provide substantially uniform illumination across a display surface and may be more convenient to manufacture than the curved extraction features of FIG. 34A and FIG. 34B.

Figure 36A:
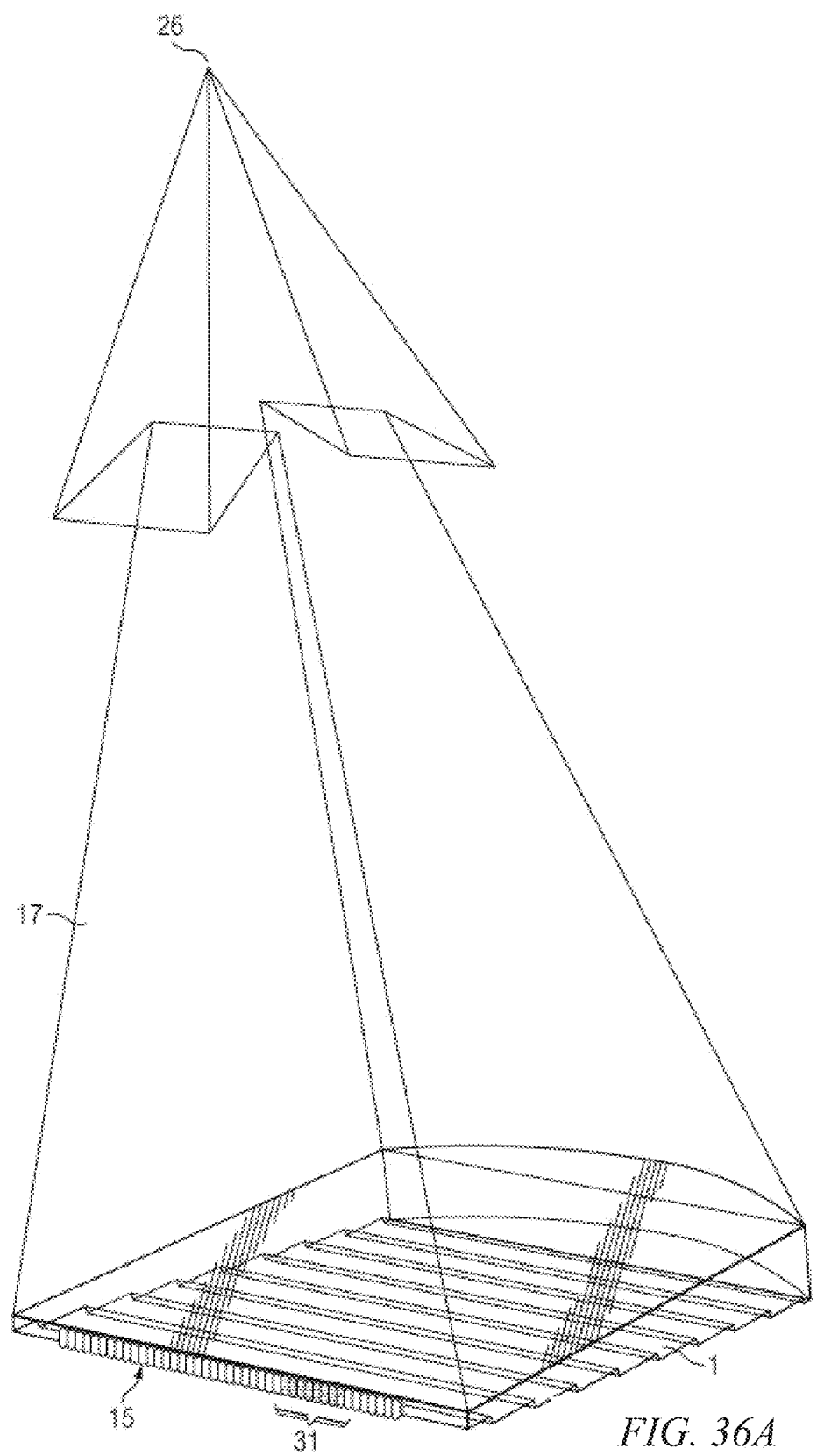
FIG. 36A is a schematic diagram illustrating one embodiment of the generation of a first viewing window in a time multiplexed directional display device in a first time slot.
Figure 36B:
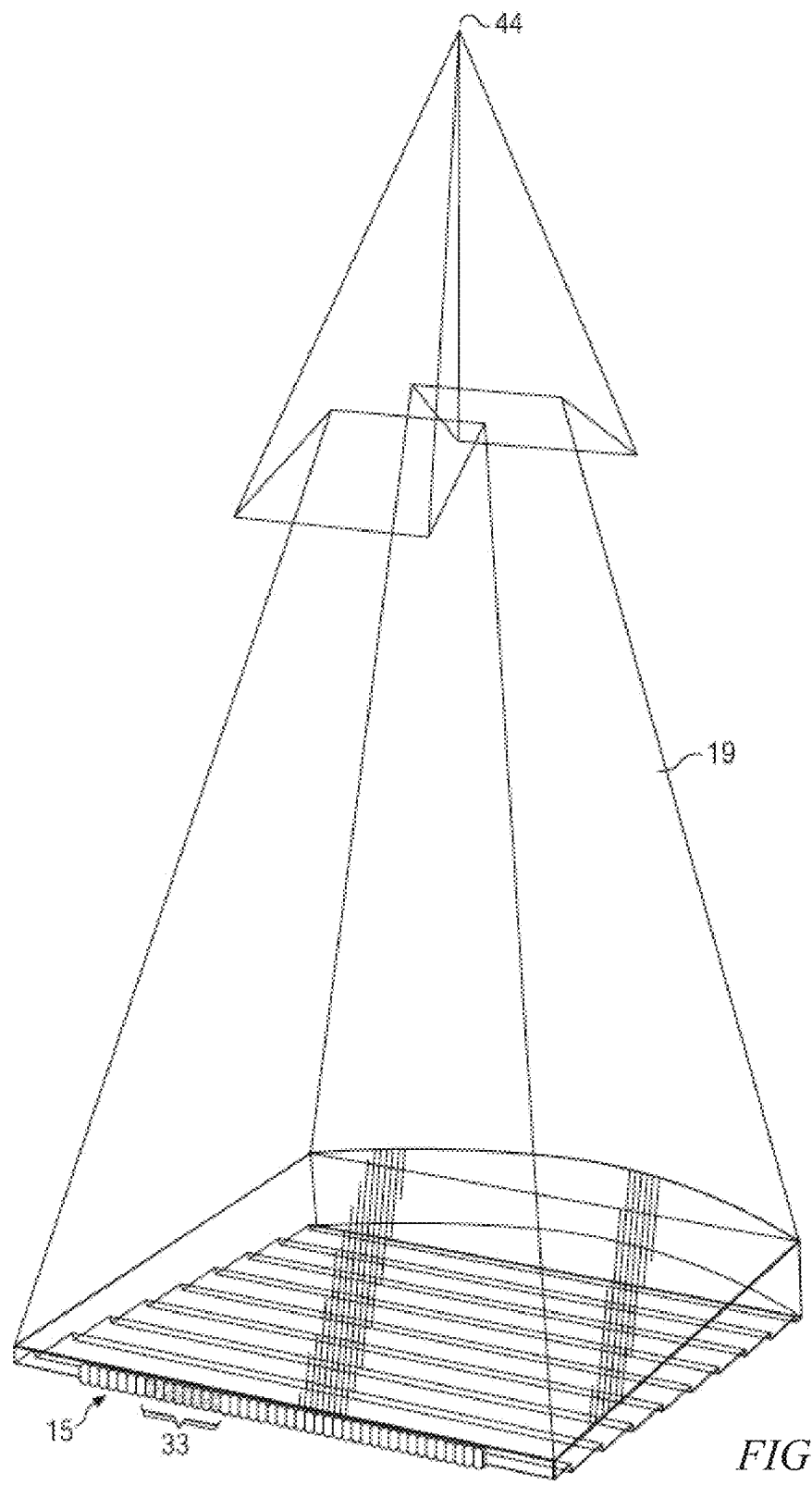
FIG. 36B is a schematic diagram illustrating another embodiment of the generation of a second viewing window in a time multiplexed directional display device in a second time slot.
Figure 36C:
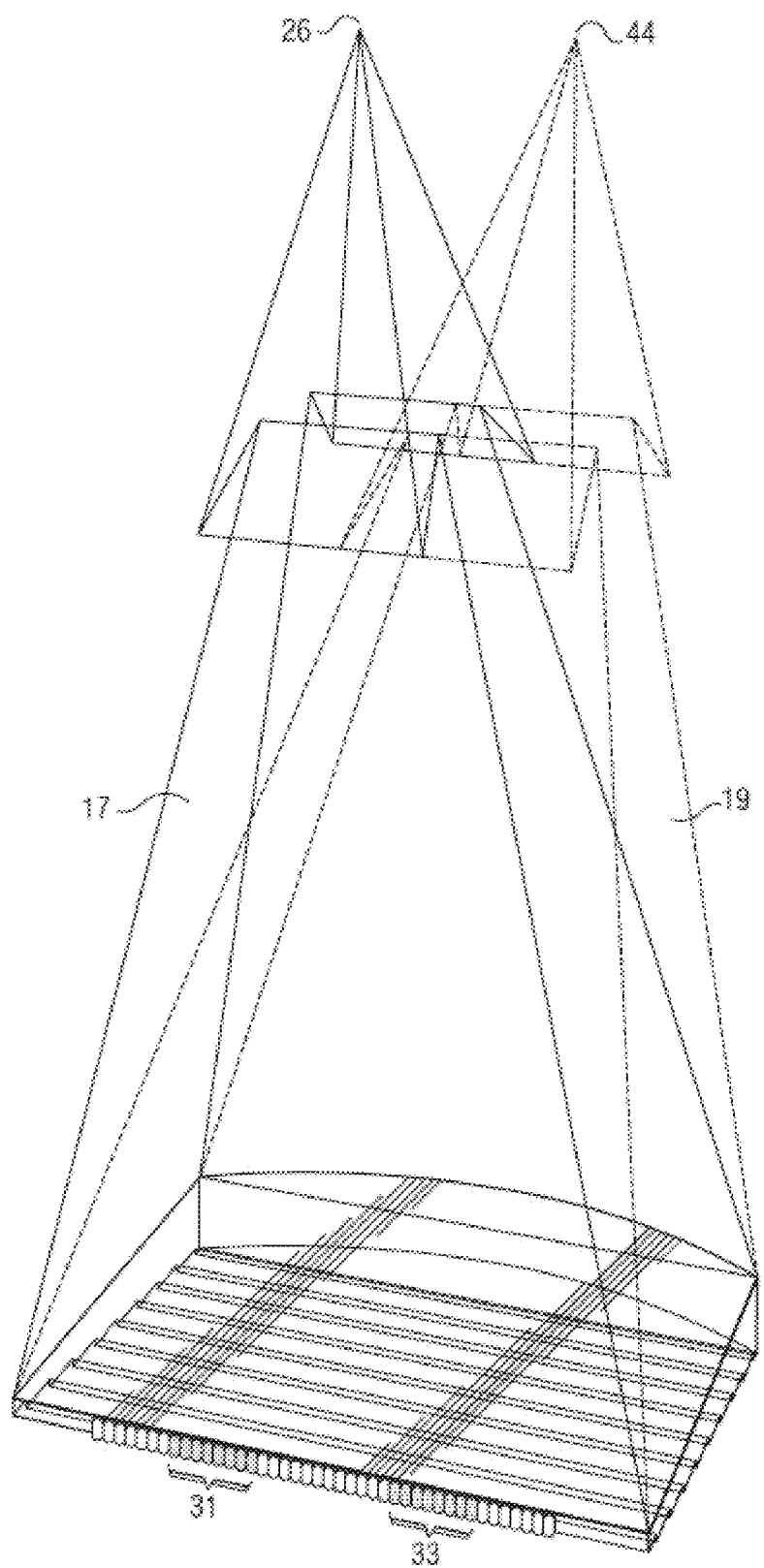
FIG. 36C is a schematic diagram illustrating another embodiment of the generation of a first and a second viewing window in a time multiplexed directional display device.

FIG. 36A is a schematic diagram illustrating one embodiment of the generation of a first viewing window in a time multiplexed imaging directional display device in a first time slot, FIG. 36B is a schematic diagram illustrating another embodiment of the generation of a second viewing window in a time multiplexed imaging directional backlight apparatus in a second time slot, and FIG. 36C is a schematic diagram illustrating another embodiment of the generation of a first and a second viewing window in a time multiplexed imaging directional display device. Further, FIG. 36A shows schematically the generation of illumination window 26 from stepped waveguide 1. Illuminator element group 31 in illuminator array 15 may provide a light cone 17 directed towards a viewing window 26. FIG. 36B shows schematically the generation of illumination window 44. Illuminator element group 33 in illuminator array 15 may provide a light cone 19 directed towards viewing window 44. In cooperation with a time multiplexed display, windows 26 and 44 may be provided in sequence as shown in FIG. 36C. If the image on a spatial light modulator 48 (not shown in FIGS. 36A, 36B, 36C) is adjusted in correspondence with the light direction output, then an autostereoscopic image may be achieved for a suitably placed viewer. Similar operation can be achieved with all the directional backlights described herein. Note that illuminator element groups 31, 33 each include one or more illumination elements from illumination elements 15a to 15n, where n is an integer greater than one.

Figure 37:
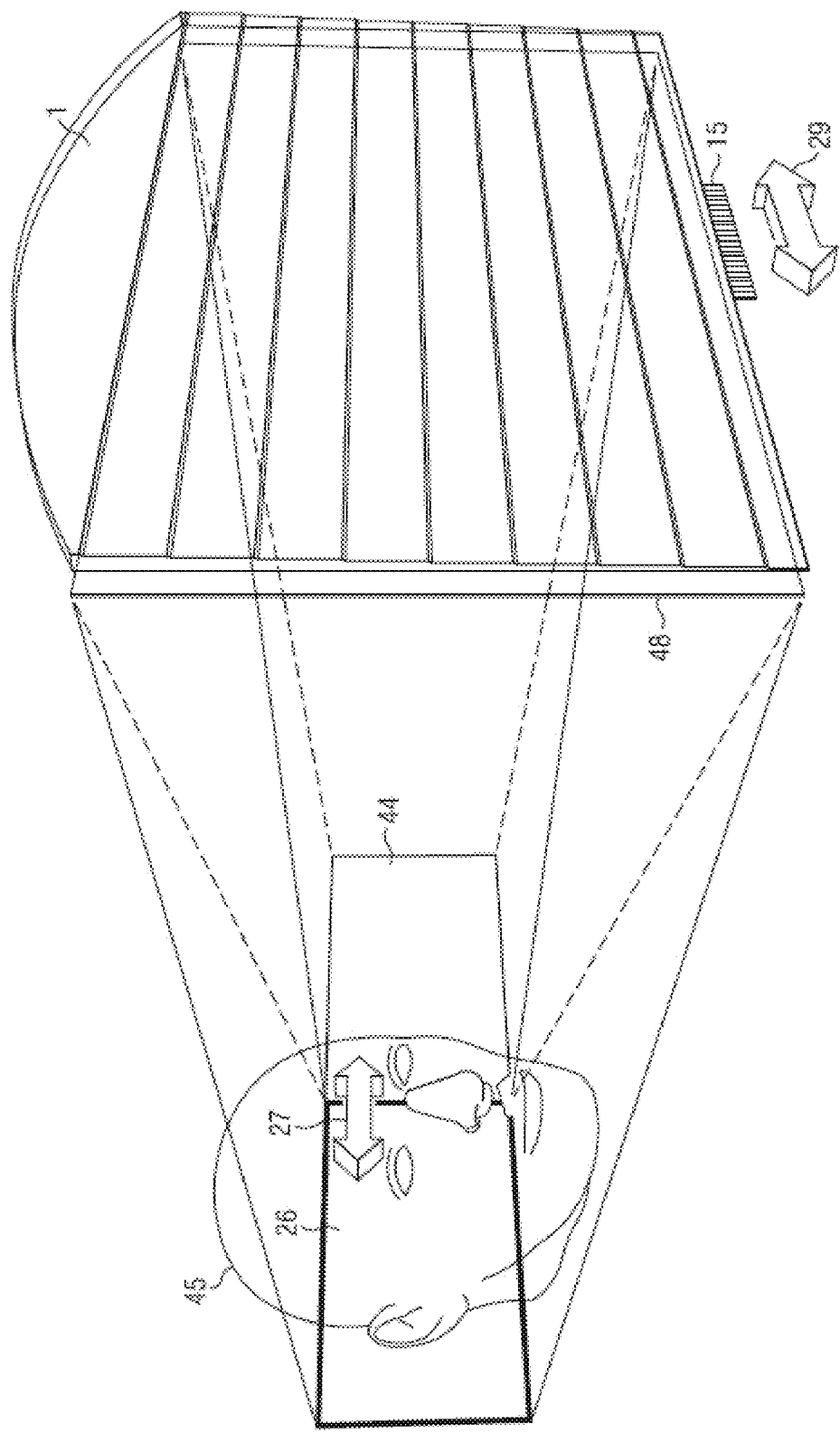
FIG. 37 is a schematic diagram illustrating an observer tracking autostereoscopic directional display device.

FIG. 37 is a schematic diagram illustrating one embodiment of an observer tracking autostereoscopic directional display device. As shown in FIG. 37, selectively turning on and off illuminator elements 15a to 15n along axis 29 provides for directional control of viewing windows. The head 45 position may be monitored with a camera, motion sensor, motion detector, or any other appropriate optical, mechanical or electrical means, and the appropriate illuminator elements of illuminator array 15 may be turned on and off to provide substantially independent images to each eye irrespective of the head 45 position. The head tracking system (or a second head tracking system) may provide monitoring of more than one head 45, 47 (head 47 not shown in FIG. 37) and may supply the same left and right eye images to each viewers' left and right eyes providing 3D to all viewers. Again similar operation can be achieved with all the directional backlights described herein.

Figure 38:
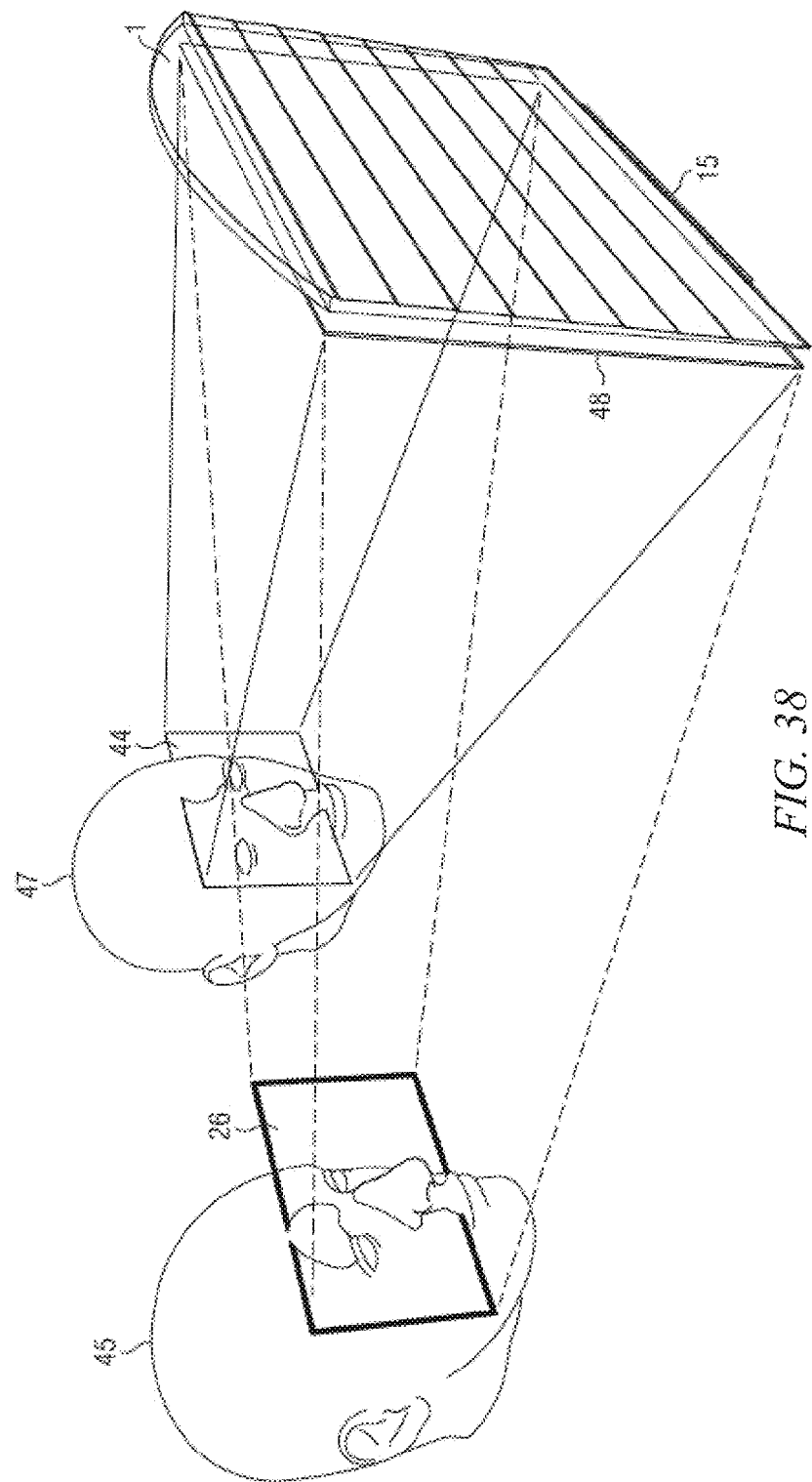
FIG. 38 is a schematic diagram illustrating a multi-viewer directional display device.

FIG. 38 is a schematic diagram illustrating one embodiment of a multi-viewer directional display device as an example including an imaging directional backlight. As shown in FIG. 38, at least two 2D images may be directed towards a pair of viewers 45, 47 so that each viewer may watch a different image on the spatial light modulator 48. The two 2D images of FIG. 38 may be generated in a similar manner as described with respect to FIG. 37 in that the two images would be displayed in sequence and in synchronization with sources whose light is directed toward the two viewers. One image is presented on the spatial light modulator 48 in a first phase, and a second image is presented on the spatial light modulator 48 in a second phase different from the first phase. In correspondence with the first and second phases, the output illumination is adjusted to provide first and second viewing windows 26, 44 respectively. An observer with both eyes in window 26 will perceive a first image while an observer with both eyes in window 44 will perceive a second image.

Figure 39:
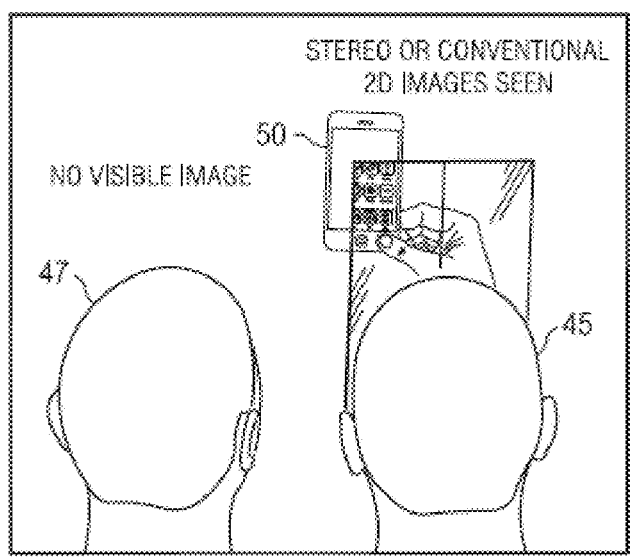
FIG. 39 is a schematic diagram illustrating a privacy directional display device.

FIG. 39 is a schematic diagram illustrating a privacy directional display device which includes an imaging directional backlight. 2D display systems may also utilize directional backlighting for security and efficiency purposes in which light may be primarily directed at the eyes of a first viewer 45 as shown in FIG. 39. Further, as illustrated in FIG. 39, although first viewer 45 may be able to view an image on device 50, light is not directed towards second viewer 47. Thus second viewer 47 is prevented from viewing an image on device 50. Each of the embodiments of the present disclosure may advantageously provide autostereoscopic, dual image or privacy display functions.

Figure 40:
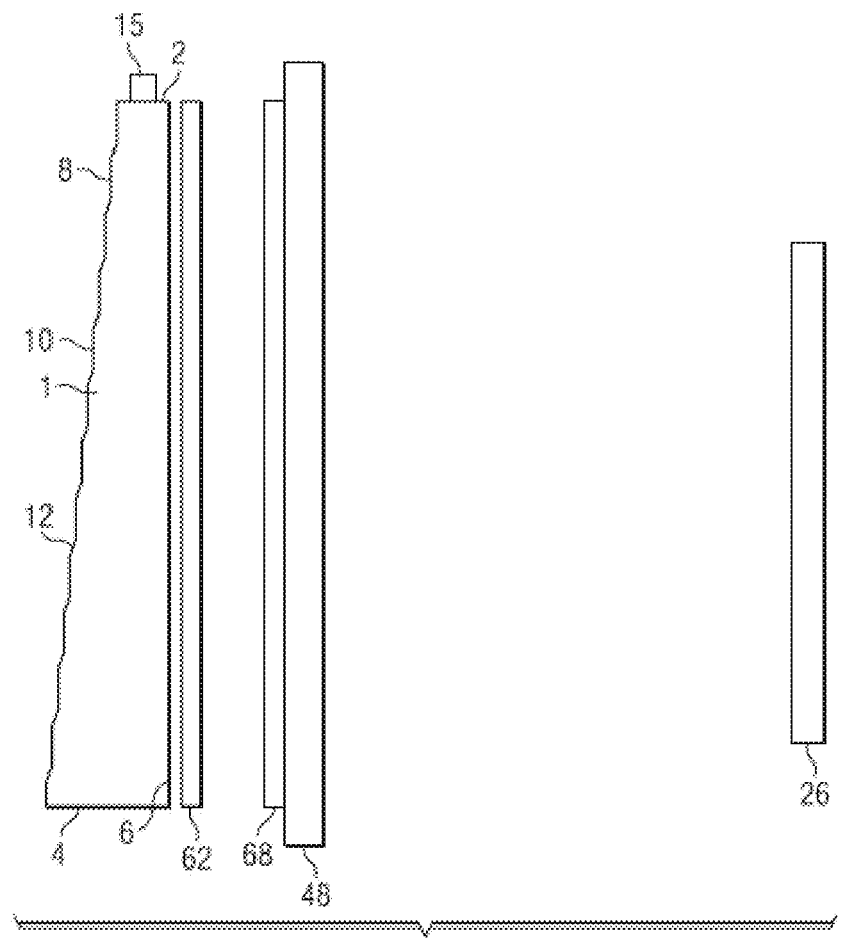
FIG. 40 is a schematic diagram illustrating in side view, the structure of a time multiplexed directional display device.

FIG. 40 is a schematic diagram illustrating in side view the structure of a time multiplexed directional display device as an example including an imaging directional backlight. Further, FIG. 40 shows in side view an autostereoscopic directional display device, which may include the stepped waveguide 1 and a Fresnel lens 62 arranged to provide the viewing window 26 in a window plane 106 at a nominal viewing distance from the spatial light modulator for a substantially collimated output across the stepped waveguide 1 output surface. A vertical diffuser 68 may be arranged to extend the height of the window 26 further. The light may then be imaged through the spatial light modulator 48. The illuminator array 15 may include light emitting diodes (LEDs) that may, for example, be phosphor converted blue LEDs, or may be separate RGB LEDs. Alternatively, the illuminator elements in illuminator array 15 may include a uniform light source and spatial light modulator arranged to provide separate illumination regions. Alternatively the illuminator elements may include laser light source(s). The laser output may be directed onto a diffuser by means of scanning, for example, using a galvo or MEMS scanner. In one example, laser light may thus be used to provide the appropriate illuminator elements in illuminator array 15 to provide a substantially uniform light source with the appropriate output angle, and further to provide reduction in speckle. Alternatively, the illuminator array 15 may be an array of laser light emitting elements. Additionally in one example, the diffuser may be a wavelength converting phosphor, so that illumination may be at a different wavelength to the visible output light.

A further wedge type directional backlight is generally discussed by U.S. Pat. No. 7,660,047 which is herein incorporated by reference in its entirety. The wedge type directional backlight and optical valve further process light beams in different ways. In the wedge type waveguide, light input at an appropriate angle will output at a defined position on a major surface, but light rays will exit at substantially the same angle and substantially parallel to the major surface. By comparison, light input to a stepped waveguide of an optical valve at a certain angle may output from points across the first side, with output angle determined by input angle. Advantageously, the stepped waveguide of the optical valve may not require further light re-direction films to extract light towards an observer and angular non-uniformities of input may not provide non-uniformities across the display surface.

There will now be described some waveguides, directional backlights and directional display devices that are based on and incorporate the structures of FIGS. 31 to 40 above. Except for the modifications and/or additional features which will now be described, the above description applies equally to the following waveguides, directional backlights and display devices, but for brevity will not be repeated. The waveguides described below may be incorporated into a directional backlight or a directional display device as described above. Similarly, the directional backlights described below may be incorporated into a directional display device as described above.

Figure 41:
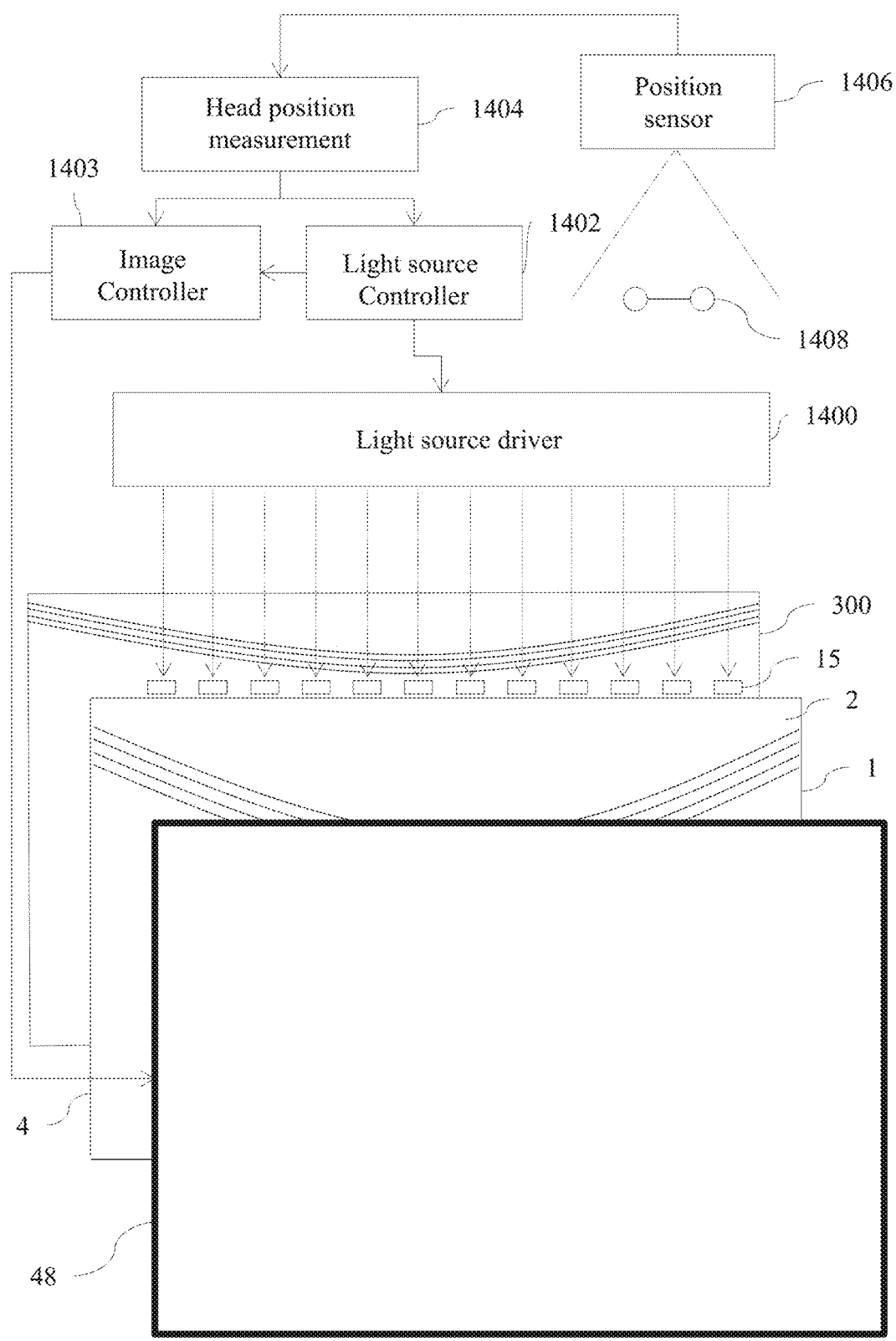
FIG. 41 is a schematic diagram illustrating a directional display apparatus comprising a directional display device and a control system.

FIG. 41 is a schematic diagram illustrating a directional display apparatus comprising a directional display device and a control system. The arrangement and operation of the control system will now be described and may be applied, with changes as necessary, to each of the display devices disclosed herein. The directional backlight comprises a waveguide 1 and an array 15 of illumination elements 15a-15n arranged as described above. The control system is arranged to selectively operate the illumination elements 15a-15n to direct light into selectable viewing windows.

The reflective end 4 converges the reflected light. Fresnel lens 62 may be arranged to cooperate with reflective end 4 to achieve viewing windows at a viewing plane. Transmissive spatial light modulator 48 may be arranged to receive the light from the directional backlight. The image displayed on the SLM 48 may be presented in synchronization with the illumination of the light sources of the array 15.

The control system may comprise a sensor system arranged to detect the position of the observer 99 relative to the display device. The sensor system comprises a position sensor 1406, such as a camera arranged to determine the position of an observer 1408; and a head position measurement system 1404 that may for example comprise a computer vision image processing system. The position sensor 1406 may comprise known sensors including those comprising cameras and image processing units arranged to detect the position of observer faces. Position sensor 1406 may further comprise a stereo sensor arranged to improve the measure of longitudinal position compared to a monoscopic camera. Alternatively position sensor 1406 may comprise measurement of eye spacing to give a measure of required placement of respective arrays of viewing windows from tiles of the directional display.

The control system may further comprise an illumination controller and an image controller 1403 that are both supplied with the detected position of the observer supplied from the head position measurement system 1404.

The illumination controller comprises an LED controller 1402 arranged to determine which light sources of array 15 should be switched to direct light to respective eyes of observer 1408 in cooperation with waveguide 1; and an LED driver 1400 arranged to control the operation of light sources of light source array 15 by means of drive lines 1407. The illumination controller 74 selects the illuminator elements 15 to be operated in dependence on the position of the observer detected by the head position measurement system 72, so that the viewing windows 26 into which light is directed are in positions corresponding to the left and right eyes of the observer 99. In this manner, the lateral output directionality of the imaging directional waveguide 1 corresponds with the observer position.

The image controller 1403 is arranged to control the SLM 48 to display images. To provide an autostereoscopic display, the image controller 1403 and the illumination controller may operate as follows. The image controller 1403 controls the SLM 48 to display temporally multiplexed left and right eye images and the LED controller 1402 operates the light sources 15 to direct light into viewing windows in positions corresponding to the left and right eyes of an observer synchronously with the display of left and right eye images. In this manner, an autostereoscopic effect is achieved using a time division multiplexing technique. In one example, a single viewing window may be illuminated by operation of light source 1409 (which may comprise one or more LEDs) by means of drive line 1410 wherein other drive lines are not driven as described elsewhere.

The head position measurement system 1404 detects the position of an observer relative to the display device. The LED controller 1402 selects the light sources 15 to be operated in dependence on the position of the observer detected by the head position measurement system 1404, so that the viewing windows into which light is directed are in positions corresponding to the left and right eyes of the observer. In this manner, the output directionality of the imaging directional waveguide 1 may be achieved to correspond with the viewer position so that a first image may be directed to the observer's right eye in a first phase and directed to the observer's left eye in a second phase.

Thus a directional display apparatus may comprise a directional display device and a control system arranged to control the light sources 15a-n.

Figure 42A:
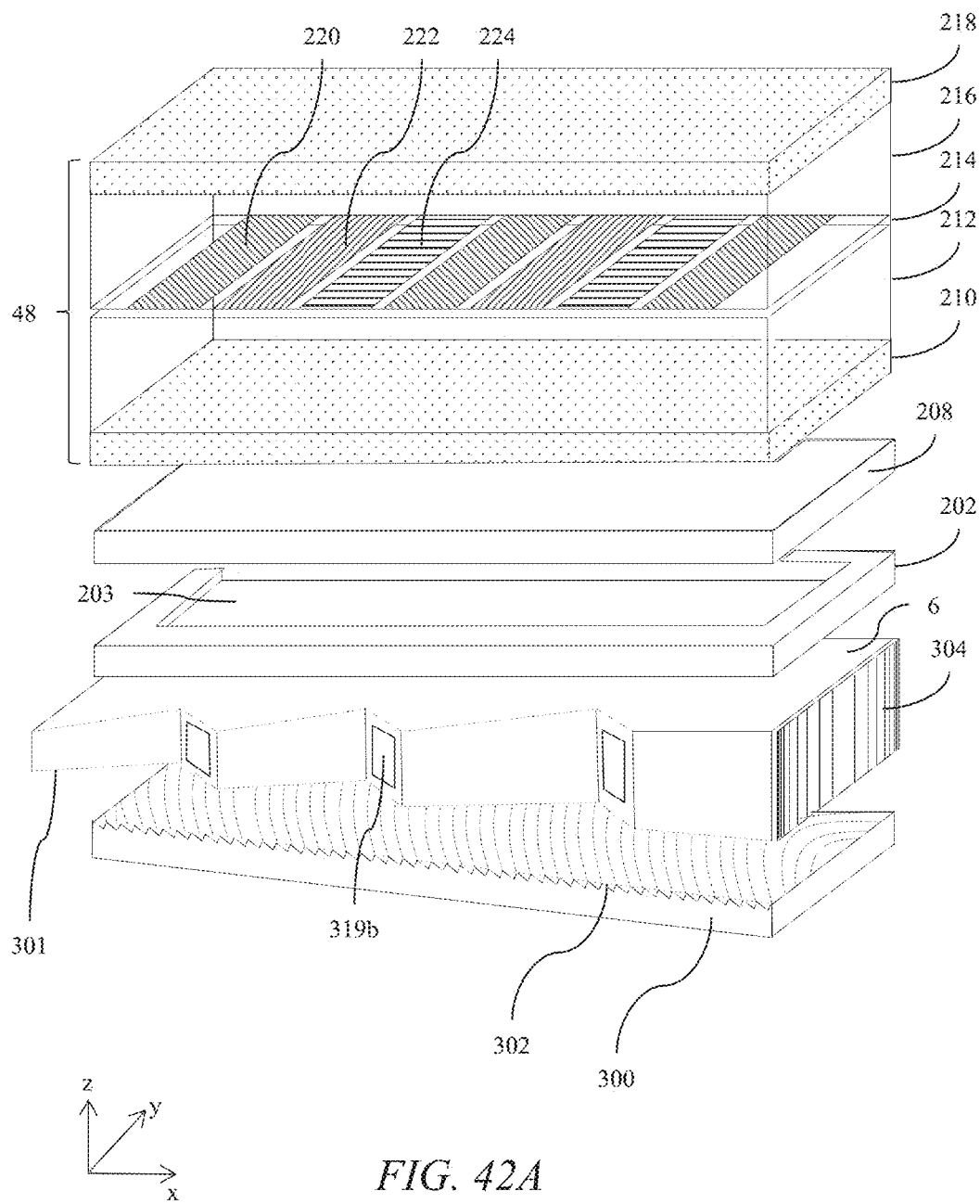
FIG. 42A is a schematic diagram illustrating a perspective view of a directional display apparatus optical stack comprising a directional waveguide with light input at a side that is adjacent a reflective side.

FIG. 42A is a schematic diagram illustrating a perspective view of a directional display apparatus optical stack comprising a directional waveguide with light input at a side that is adjacent a reflective side as described elsewhere in U.S. Patent Publ. No. 2016-0349444, entitled "Wide angle imaging directional backlights," filed May 26, 2016 and incorporated by reference herein in its entirety. Waveguide 301 comprises input sides 322, 324 with aligned light sources 317a-n and 319a-n on respective sides. End 302 opposite reflective end 304 may be arranged to be absorbing or reflective to provide low levels of cross talk or increased efficiency respectively.

Figure 42B:
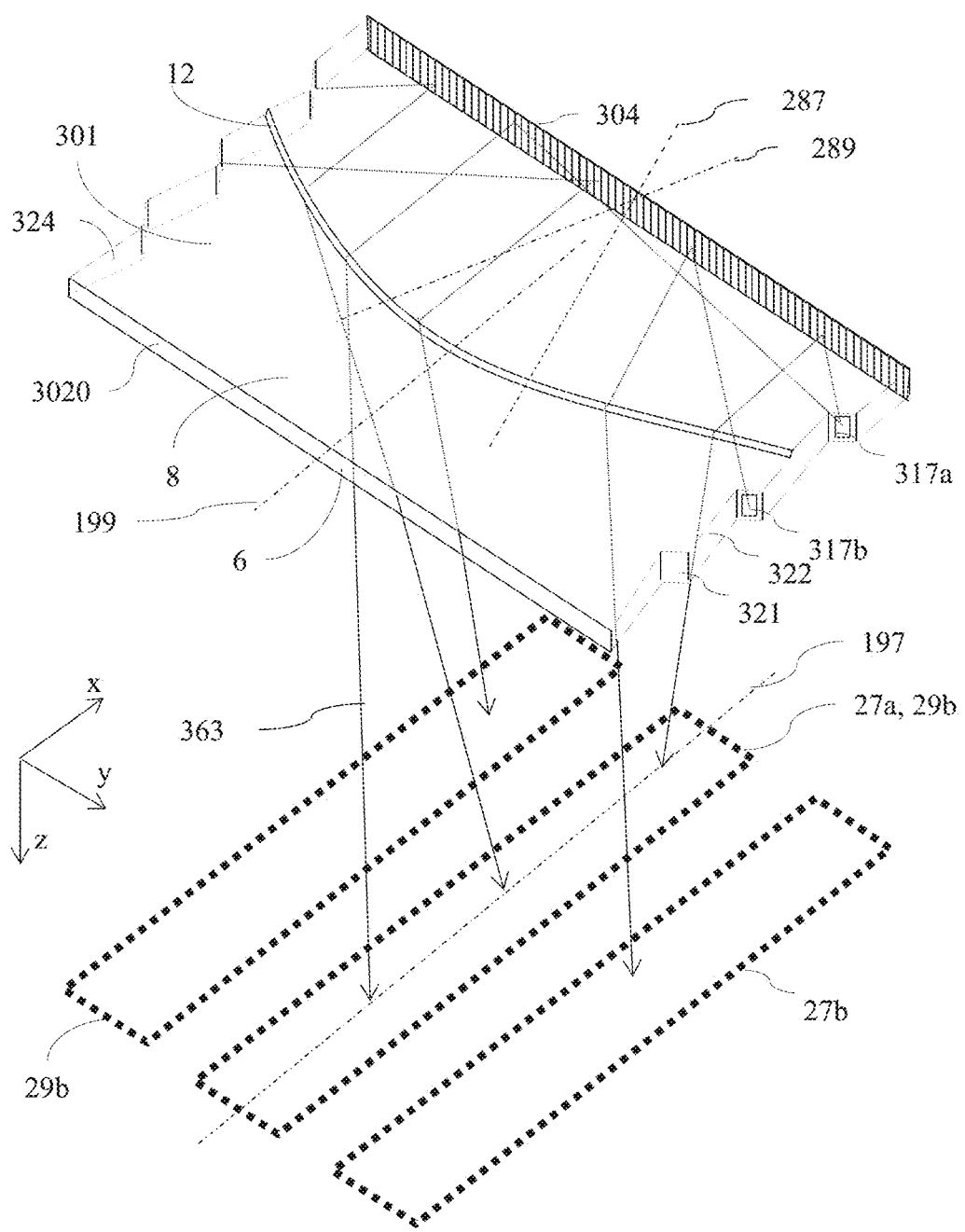
FIG. 42B is a schematic diagram illustrating a perspective view of the formation of optical windows by a directional display apparatus comprising a directional waveguide with light input at a side that is adjacent a reflective side.

FIG. 42B is a schematic diagram illustrating a perspective view of the formation of optical windows by a directional display apparatus comprising a directional waveguide with light input at a side that is adjacent a reflective side. Light sources 317a-n and 319a-n at input facets 321 are arranged to provide optical windows 27a-n and 29a-n respectively about an axis 197. Fresnel mirror 304 is arranged with first and second optical axes 287, 289. The input surface may thus be a side surface 322 of the waveguide 301 extending away from the reflective end 304 towards a thinner end 3020.

A directional backlight thus comprises a first guide surface 6 arranged to guide light by total internal reflection and the second guide surface 8 comprising a plurality of light extraction features 12 oriented to direct light guided along the imaging directional waveguide 1, 301 in directions allowing exit through the first guide surface 6 as the output light and intermediate regions 10 between the light extraction features 12 that are arranged to guide light along the imaging directional waveguide 1, 301.

Considering the arrangements of FIGS. 42A-B, the second guide surface 6 may have a stepped shape in which said light extraction features 12 are facets between the intermediate regions 10. The light extraction features 12 may have positive optical power in a direction between the side surfaces 22, 24 or 322, 324 of the imaging directional waveguide 1, 301 that extend between the first and second guide surfaces 6,8. The reflective end 4, 304 may have positive optical power in a direction extending between the sides 22, 24 or 322, 324 of the reflective end 4, 304 that extend between the first and second guide surfaces 6, 8.

Thus all sides 2, 4, 6, 8, 22, 24 provide reflections to achieve uniform illumination and low cross talk in privacy mode of operation. If features are applied to many areas of the surface then non-uniformities may be provided due to the spatial location of the waveguide extraction loss at the features.

Thus a directional display device may comprise a waveguide wherein the input surface 322 is a surface of a side of the imaging directional waveguide 1 extending away from the reflective end 304.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A directional backlight comprising:
   at least two light sources;
   a directional waveguide including an input end extending in a lateral direction along a side of the directional waveguide, and opposed first and second guide surfaces extending across the directional waveguide from the input end, the light sources disposed along the input end to project light into the directional waveguide, the directional waveguide configured to deflect input light to exit through the first guide surface;
   a plurality of optical components coupled to the directional waveguide to form a stack; and
   a support component coupled to the stack,
   wherein directional waveguide interfaces are defined between the directional waveguide and the optical components adjacent the directional waveguide, outer interfaces are defined between the optical components or between the optical components and the support component, and the coefficient of friction at the directional waveguide interfaces is greater than the coefficient of friction at an at least one outer interface on each side of the directional waveguide in the stack.

2. A directional backlight according to claim 1, wherein at least one optical component adjacent the directional waveguide is transparent to at least one operating wavelength of the light sources.

3. A directional backlight according to claim 1, wherein each optical component adjacent the directional waveguide has a surface at the directional waveguide interface on one side thereof that is shaped to prevent optical coupling between the directional waveguide and the optical component adjacent the directional waveguide in the absence of an external compressive force.

4. A directional backlight according to claim 1, wherein each optical component adjacent the directional waveguide has a surface at the directional waveguide interface on one side thereof with an RMS roughness of at least 0.05 micrometres.

5. A directional backlight according to claim 1, wherein the surface properties of at least one of the optical components at the directional waveguide interfaces are provided by the addition of asperity particles to the respective coating.

6. A directional backlight according to claim 1, wherein the surface properties of at least one of the optical components at the directional waveguide interfaces are provided by the addition of asperity particles to the bulk of the substrate.

7. A directional backlight according to claim 1, wherein the surface properties of, at least one of the optical components adjacent the directional waveguide, on one side are provided by the addition of asperity particles arranged in a surface coating layer of the optical components.

8. A directional backlight according to claim 1, wherein said at least one of the optical components adjacent the directional waveguide comprises a surface formed by an embossing process.

9. A directional backlight according to claim 1, wherein the outer layer of the optical component at the outer interface comprises a low friction additive or coating.

10. A directional backlight according to claim 1, wherein the stack comprises optical components outside the second guide surface of the directional waveguide that include:
    an optical component adjacent the directional waveguide;
    a rear reflector outside said optical component adjacent the directional waveguide and comprising an array of reflective facets arranged to reflect light that is transmitted through the second guide surface back through the directional waveguide to exit through the first guide surface; and
    a support component outside and adjacent the rear reflector, wherein both (i) the coefficient of friction at the directional waveguide interfaces and (ii) the coefficient of friction at the outer interface between the optical component adjacent the directional waveguide and the rear reflector are greater than the coefficient of friction at the outer interface between the rear reflector and the support component.

11. A directional backlight according to claim 1, wherein each optical component adjacent the directional waveguide has a surface at the directional waveguide interface having a surface hardness of not more than two pencil hardness levels different from the pencil hardness of the directional waveguide surface, preferably not more than one pencil hardness level different from the pencil hardness of the directional waveguide surface and most preferably the same pencil hardness level as the pencil hardness of the directional waveguide surface.

12. A directional backlight according to claim 1, wherein at least one of the optical components adjacent the directional waveguide has differing surface properties, which are provided with a coefficient of friction at the directional waveguide interface on one side thereof that is greater than the coefficient of friction at the outer interface on the other side thereof.

13. A directional backlight according to claim 12, wherein said at least one of the optical components adjacent the directional waveguide has at least one surface that is treated or processed to provide said differing surface properties, and wherein said treatment is by chemical, plasma, flame or corona means.

14. A directional backlight according to claim 12, wherein said at least one of the optical components adjacent the directional waveguide has a surface at the directional waveguide interface on one side thereof that is chemically treated to increase its roughness.

15. A directional backlight according to claim 12, wherein the stack comprises optical components outside the first guide surface of the directional waveguide that include:
 an optical component adjacent the directional waveguide having said differing surface properties.

16. A directional backlight according to claim 12, wherein the stack comprises optical components outside the second guide surface of the directional waveguide that include:
 an optical component adjacent the directional waveguide having said differing surface properties; and
 a rear reflector comprising an array of reflective facets arranged to reflect light that is transmitted through the second guide surface back through the directional waveguide to exit through the first guide surface.

17. A directional backlight according to claim 12, wherein the stack comprises components outside the second guide surface of the directional waveguide that include:
 a rear reflector adjacent the directional waveguide and comprising an array of reflective facets arranged to reflect light that is transmitted through the second guide surface back through the directional waveguide to exit through the first guide surface, the rear reflector having said differing surface properties; and
 a support component outside and adjacent the rear reflector, wherein the coefficient of friction at the directional waveguide interface between the directional waveguide and the rear reflector is greater than the coefficient of friction at the outer interface between the rear reflector and the support component.

18. A directional backlight according to claim 12, wherein said at least one of the optical components adjacent the directional waveguide comprises plural layers, the outer layers of which provide said differing surface properties.

19. A directional backlight according to claim 18, wherein one of said layers is a substrate and one or both of the outer layers is a coating applied to the substrate.

20. A directional backlight according to claim 18, wherein said plural layers include at least one layer that has an optical function, and wherein said at least one layer that has an optical function that is a polariser, a retarder or a diffuser.

* * * * *